(12) United States Patent
Leitermann

(10) Patent No.: US 7,080,068 B2
(45) Date of Patent: Jul. 18, 2006

(54) AUTOMATIC SEARCH METHOD

(76) Inventor: Thomas Leitermann, Kazmairstrasse 47, Münich 80339 (DE)

( * ) Notice: Subject to any disclaimer, the term of this patent is extended or adjusted under 35 U.S.C. 154(b) by 299 days.

(21) Appl. No.: 10/312,230

(22) PCT Filed: Jun. 27, 2001

(86) PCT No.: PCT/DE01/02356

§ 371 (c)(1),
(2), (4) Date: Aug. 15, 2003

(87) PCT Pub. No.: WO02/01407

PCT Pub. Date: Jan. 3, 2002

(65) Prior Publication Data

US 2004/0030692 A1    Feb. 12, 2004

(30) Foreign Application Priority Data

Jun. 28, 2000    (DE) ................................ 100 31 351

(51) Int. Cl.
*G06F 17/30* (2006.01)

(52) U.S. Cl. ..................... 707/3; 707/4; 707/6; 707/10; 707/104.1; 704/8; 704/9; 704/10; 715/500; 715/514

(58) Field of Classification Search ................ 707/1–6, 707/10, 101–103 R, 104.1, 203; 704/2, 8, 704/9, 10; 715/500, 501, 514, 526
See application file for complete search history.

(56) References Cited

U.S. PATENT DOCUMENTS

| 5,297,039 A | * | 3/1994 | Kanaegami et al. ........... 707/5 |
| 5,864,848 A | * | 1/1999 | Horvitz et al. ................. 707/6 |
| 5,873,056 A | * | 2/1999 | Liddy et al. ................... 704/9 |
| 5,893,092 A |   | 4/1999 | Driscoll |
| 5,926,811 A | * | 7/1999 | Miller et al. ................... 707/5 |
| 6,052,693 A | * | 4/2000 | Smith et al. ............. 707/104.1 |
| 6,088,692 A | * | 7/2000 | Driscoll ........................ 707/5 |
| 6,502,065 B1 | * | 12/2002 | Imanaka et al. ................ 704/9 |

(Continued)

FOREIGN PATENT DOCUMENTS

DE    198 11 524 A1    11/1998

(Continued)

OTHER PUBLICATIONS

International Search Report for PCT/DE01/02356, Dec. 13, 2002.

(Continued)

*Primary Examiner*—Apu Mofiz
*Assistant Examiner*—Jacques Veillard
(74) *Attorney, Agent, or Firm*—C. Dean Domingue; Robert L. Waddell; Ted A. Anthony

(57) ABSTRACT

An automatic search method for documents stored in a data processing system is presented. The method involves preselecting large amounts of data automatically thereby enabling the user to find relevant information easily. The task of comparing search string and document content is assigned to the user who does not need to formulate any query statement but browses the documents by comparing their representatives and choosing the ones which fit the query statement. Search terms comprise representatives of the documents, extracts of the documents, or synonyms of the extracts which function as nodes of the semantic network wherein the edges are set up by various relations between the search objects, as for example, detailing relations, thesaurus relations, and combining relations. Movements along the edges are simulated by retrievals of the data storage resulting in new nodes presented to the user in a viewing device of the system.

13 Claims, 66 Drawing Sheets

U.S. PATENT DOCUMENTS 6,687,689 B1 * 2/2004 Fung et al. .................... 707/3
6,691,107 B1 * 2/2004 Dockter et al. ................ 707/3
6,757,692 B1 * 6/2004 Davis et al. .............. 707/104.1
6,810,376 B1 * 10/2004 Guan et al. .................... 704/9

FOREIGN PATENT DOCUMENTS

| DE | 199 14 326 A1 | 10/2000 |
| --- | --- | --- |
| EP | 0 601 759 A1 | 6/1994 |

OTHER PUBLICATIONS

O.A. (2pgs.) of DE PTO dated May 10, 2001, issued in priority doc. DE 100 31 351.5.

* cited by examiner

Fig. 12
case a)
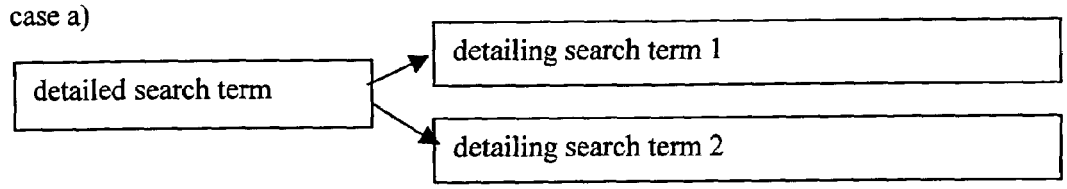
case b)
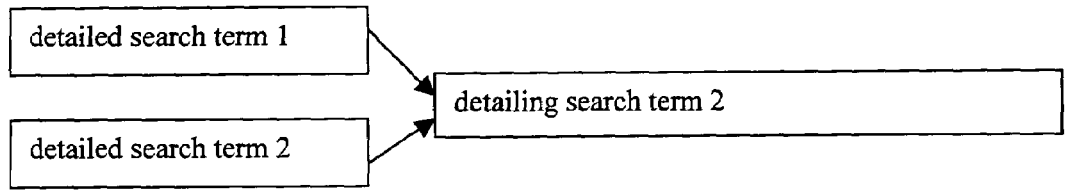

Fig. 30

| process: | detail | limitate | enlarge | specialize | generalize | combine | |
|---|---|---|---|---|---|---|---|
| effect | | | | | | exclude | include |
| Thematic range of search / Amount of covered aspects | << | < | >> | << | >> | < / << | << |
| Amount of relevant documents (results) | << | << | >> | << | >> | < / << | << |

<<: reduce considerably
>>: increase considerably
<: reduce little / side effect
< / <<: reduce little / considerably

Fig. 31 overviewing search mode – general part

| | 1 | 2 | 3 | 4 | 5 | 6 | 7 | 8 |
|---|---|---|---|---|---|---|---|---|
| | expert articles | regulations | tools | product information | contacts | training | events |

News

| job market human ress. | statics of Unemployed | labor law | | contract of labor | - directory | | | fair for alumni |
| | | | | | 1. subject | | 1.2. subject | lecture on Poland |
| import, export | essay on country xy | import laws for country xy | | application form for visa | 2. subject | | 1.3. subject | |
| | | | | | 3. subject | | 1.4. subject | business plan contest |
| founding subventions | guideline for subventions | corporate law | | application form for subv. | 4. subject | | course for founders | |
| | | | | | 5. subject | | | |
| finance assurance | essay on expected decreas of interest rate | judgement about payments | | application form of life insurance | 6. subject | | learn CD-ROM "stock exchange" | open day at stock exchange |
| | | | | | 7. subject | | | |
| | | | | | 8. subject | | | |
| controlling accounting | controlling of small companies | HGB 3.book with comments | | calculation examples | 9. subject | | training on controlling | |
| | | | | | subject-related detail-search | | | |
| | | | | | update results | | | |

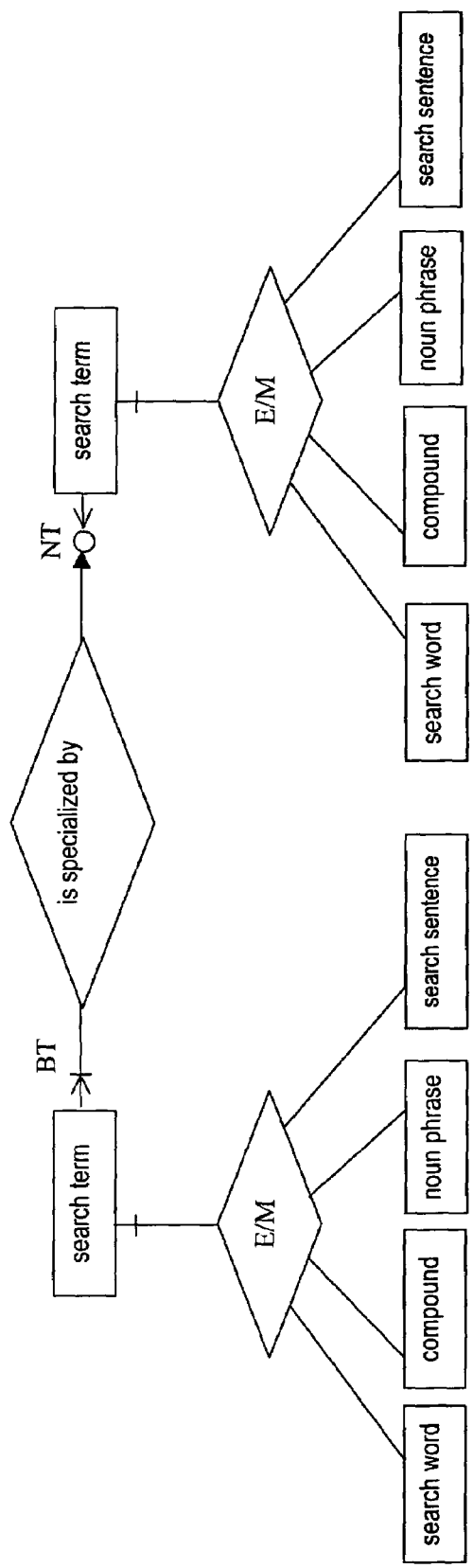
Fig. 47
Explanations for fig. 48 to 51
E/M: exclusive/mandatory
A entity must be one, but not more than of the sub-entities
cardinality notations:
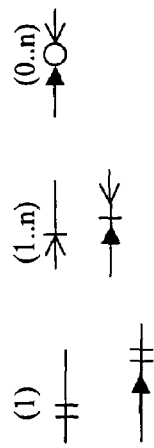

Fig.53 attribute directory

| attribute type | attribute content | attribute name | Data object nr. | cardina-lity | attribute function |
|---|---|---|---|---|---|
| vibible attributes | document | [Dokument] | 6 | 1 | final search result |
| | search term name | [ST_Name] | 1-4 | 1 | name or content of search term |
| | context of search term | [context] | 1,2 | 0,1 | Displays context to the user in which the search term is used in. The specification is necessary to discern homonyms. |
| RELATIONS — detailing | search text e.g.: | | 5 | 1 | search text is detailing the search word. All search sentences are derived from search text. |
| | title | [title] | | | |
| | abstract | [abstract] | | | |
| | table of content | [contents] | | | |
| | details considering the document | | | | contrary to search text details considering the document are non-thematic. They give detailed and explicit on information on characteristics of a document (e.g. biographic characteristics) which are classification features and encoded into the document class {Doc_cl}. |
| | date of publication | [date] | | | |
| | price | [price] | | | |
| | author/editor | [author] | | | |
| | text size | [text_size] | | | |
| | Info-/document type | [Doc_type] | | | |
| | doc_ID of detailing document | [Dok_V] | | | Doc_ ID in document DB (if document stored in DB), else link to document file (if document profile stored as file in directory); attribute visible |
| | ST_IDs of detailing compound | [Con_K] | 1 | 0..n | search terms detailing a given search term |
| | ST_IDs of detailing noun phrase | [Con_B] | 1.2 | | |
| | ST_IDs of detailing search sentence | [Con_S] | 1,2,3 | | |
| | Dok_Prof_IDs of detailing document profile | [Con_D] | 4 | 1..n | Doc_Prof_ID in IndexDB (if document profile stored in DB), else filename of index file (if document profile stored in file) |
| Thesaurus | ST_IDs of sub-ordinated search terms | [NT] | 1-4 | 0..n | search terms having a thesaurus relation to a given search term |
| | ST_IDs of associated search terms | [RT] | | | |
| | ST_IDs of super-ordinated search terms | [BT] | | | |
| combining primary key | identifier of document | [Dok_ID] | 1-4 | 1..n | primary key in document_DB (if document stored in DB), else file name of document file (if document stored in file) |
| | | | 5,6 | 1 | also: primary key of ressource_DB /-file |
| | identifier of search term | [ST_ID] | 1-4 | 1 | attribute is primary key of search list file and thesaurus_DB/-file |
| | identifier of document profile | [Doc_Prof_ID] | 5 | | attribute in ressource_DB /-file and primary key in Index_DB (if document profile stored in DB), else filename of index file (if document profile stored in file) |
| limitation criteria (1-4) | document class of documents which are conneted to the object (document-related attribute) | [Doc_cl] | 1-4 | 1..n | document class contains details considering the document in coded and classified form. If used in search terms or document profiles the attribute characterizes documents related to these. Moreover they define constraints not related to the subject to select search terms by Doc_cl zu (limitations-criteria). Used in document profiles and documents functioning as key for grouping of homogenous structured objects and storing in same storing units (directory, (DB-)files). |
| | | | 5,6: facultative | 1 | |
| distribution key (1-6) | subject area of search term (search term related attribute) | [interest_area] | 1-4 | 1..n | subject area is the only key for grouping search terms. It is an additional key for grouping document profiles and documents. The groups resulting from grouping document profiles and documents intersect, because these objects are assigned to multiple subject areas (unlike assignments concerning the document class). |
| | | | 5,6: facultative | | |

Fig. 54

| Search list file(Interest_area) |||||||||| 
|---|---|---|---|---|---|---|---|---|---|
| rec_ID | create_date | ST_Name | context | ST_ID | NT | RT | BT | Con_K | Doc_cl |
| xxx | xxx | seach word | xxx | xxx | xxx | xxx | xxx | xxx | xxx |
| xxx | xxx | compound | xxx | xxx | xxx | xxx | xxx | xxx | xxx | record - related attributes     data object related attributes

Fig. 55

| Thesaurus database /-file |||||||||||| 
|---|---|---|---|---|---|---|---|---|---|---|---|
| rec_ID | ST_Name | context | ST_ID | NT | RT | BT | Con_K | Con_B | Con_S | Con_D | (Interest_area) | Doc_cl |
| xxxx | seach word | xxx | xxx | xxx | xxx | xxx | xxx | xxx | xxx | | xxx | xxx |
| xxxx | compound | xxx | xxx | xxx | xxx | xxx | | xxx | xxx | | xxx | xxx |
| xxxx | noun phrase | | xxx | xxx | xxx | xxx | | | xxx | | xxx | xxx |
| xxxx | Search sentences | | xxxx | xxx | xxx | xxx | | | | xxx | xxx | xxx | record - related attributes     data object related attributes

Fig. 56

| Ressource_DB/-file |||| 
|---|---|---|---|
| rec_ID | ST_ID/ Doc_Prof_ID | Doc_ID | (Doc_cl) |
| xxx | xxx | xxx | xxx |
| xxx | xxx | xxx | xxx | record - related attributes | data object related attributes

Fig. 57

| Document profile_DB/-file ||||||||||||
|---|---|---|---|---|---|---|---|---|---|---|---|
| rec_ID | Doc_Prof_ID | title | abstract | contents | date | price | author | text_size | Doc_type | Doc_V | (Doc_cl) |
| xxxx | xxx | xxx | xxx | xxx | xxx | xxx | xxx | xxx | xxx | xxx | xxx | record - related attributes | data object related attributes

Fig. 58

Fig. 61 searched information (obligatory)

☐ new information   ☑ archived information subject area (obligatory)

☑ business administration   ☐ computer science   ☐ Geographie limitation characteristics (optional)

price

☐ 0-3 DM   ☐ 0-5 DM   ☐ 0-11 DM textsize

☐ 1 page   ☐ 2-3 pages   ☐ 3-6 pages   ☐ 7-12 pages

[ start / proceed search ]

File

Data source data flow ⟶ information transfered by data flow control flow ------▶ processes

| | |
|---|---|
| 2.1 | limitate |
| 2.2 | combine |
| 2.3 | specialize |
| 2.4 | enlarge |
| 2.5 | generalize |
| 2.6 | detail (compounds) |
| 2.7 | Reload |
| 2.8 | detail (noun phrases) |
| 2.9 | detail (search sentences) |
| 2.10 | detail (document profiles) | conditions

1: selection attribute [Con_K]
2: selection attribute [Con_B]
3: selection attribute [Con_S]
4: selection attribute [Con_D]

actions:

1 limitate
2 combine
3 specialize
4 enlarge
5 generalize
6 detail
7 include
8 exclude

AUTOMATIC SEARCH METHOD

BACKGROUND OF THE INVENTION

The invention refers to an automatic search method for documents stored in a data processing system.

For the first time the emergence of the internet enables everybody to access a huge amount of information. The fast rise of the amount of information supplied by the internet however hampers user to find the relevant information. Search engines in use so far retrieve through a query combining query terms by logical operators texts containing the combinations of the search terms.

Even the present amount of the internet's information generates result lists of more than 1000 results. It is nearly impossible for the user to evaluate the displayed results properly. Moreover, duplicates or repeatedly displayed items happen in the same result list because documents are accessible by various uniform resource locators or because documents are not retrieved according to unified rules.

The mentioned invention intends to generate a method for automatic search for documents stored in a data processing system. It preselects even big amounts of data automatically enabling the user to find relevant information easily. The system is designed 'futureproof' that means capable to handle further growing amounts of information accessible through internet. In conventional information retrieval systems users formulates query terms, which are compared with each document or its representative (assigned classification, keyword). This comparison has so far been optimized by system engineers from both sides. On the one hand, the representation of the document was improved, on the other hand the procedure of the comparison and the representation of the search strings have been improved.

BRIEF SUMMARY OF THE INVENTION

The invention realizes a new approach assigning the task of comparing search string and document content to the user.

The user however does not need to formulate any query statement but basically browses the documents by comparing their representatives and choosing the ones which fit.

The representatives of the documents, extracts of the documents or synonyms of the extracts are called search terms. They function as nodes of a semantic network whereas the edges are set up by various relations (detailing relations: connections of shorter with longer search objects, thesaurus relations, combining relations) between the search objects.

A semantic network is defined as a set of semantic concepts arranged in form of a network and functioning as nodes. The semantic concepts or nodes are joined by edges rendered by relations of meaning or by concept relations.

The semantic network is stored as knowledge base of the system in a data storage (preferably implemented by a data base) with search objects respectively nodes as objects and the relations between the search terms respectively the edges as attributes.

Movements along the edges are simulated by retrievals of the data storage resulting in new nodes presented to the user in a viewing device of the system.

The data pool of the method is organized such that the user approaches after several selections a set of documents. The user starts at a general search term passing more and more special search objects and ending at document profiles, which are the most direct representatives of those documents, which are related to the document.

As a further peculiarity the data pool supports setting up domains defined as personalized parts of the general data pool (called external data in the following), accessible only for authorized users in a personalized part of the data storage or in a separate data storage assigned to the authorized user (called internal data in the following). A separate data storage is set up by copying the documents and their representatives to the data storage accessed only by the user owning the domain.

Thus, all search-infrastructure of a document is transferred in a way it can be retrieved in the domain as well as in the general data storage. Domains are set up for instance by archiving.

The invention displays representatives of documents in a manner suitable for information retrieval to the user by computers and database systems (as data storage) and supports the navigation of the user in a semantic network.

It list preferred that text extracts applying to more than one document are displayed only once. Thus, duplicates and repeated items are avoided.

It list preferred that extracts applying to more than one document are connected to each document so that several documents can be accessed by a single common representative.

According to the invention it is preferred that in the course of the search process the queries get more and more specific so that less documents are represented. The representations however get wider. Thus, the same amount of information has to be processed by the user getting the right information on less relevant documents.

It is preferred that in any case the query comprises search objects in form of search terms or directories designed as matrices or network plans connected logically to document profiles and via these to documents. Therefore, the user gets the favourite access to information (it is assured that the user is extensively informed on relevant documents).

It is preferred that in case of adding documents to the data storage or removing documents from the data storage the logical connections between search objects and documents and document profiles are adapted, whereas the search objects remain the same. Therefore, the user can easily survey if new information is generated in certain special fields, for example, a patent retrieval on special fields of technics can be repeated regularly so that only new publicated documents are retrieved.

The function of the document profiles as surrogates for the documents themselves are to deliver all information necessary for the search process so that data and information transfer between system components and user is minimized. According to the invention, they comprise extracts of the document (the longest ones which are directly connected to the document profiles), details about the document itself, details concerning the system and a link to the document.

Furthermore, it is preferred that search objects are connected with each other hierarchical. If a user chooses one or more search objects, the data processing system selects and displays connected, longer search objects on a viewing device giving more detailed information on the represented document and containing the search objects chosen by the user.

The user can choose one or more of the subordinated, more detailed search objects and execute further search processes. Again, as a result, even more detailed search objects are displayed on the viewing device.

Furthermore, it is preferred that search terms belonging together because of their content are connected via one or more of the following relations: superordinated, related or subordinated search term. Connections taking into consideration these relations support users to carry out successful retrieval even without remembering all specialist terms.

The search process is further supported by merging of synonyms into a single search object.

The search is moreover improved by constraints not concerning the subject. They can be defined by the user and set parameters restricting the results of the complete search process. Such constraints make it possible to retrieve for example patent documents published before a priority date.

Further objects and advantages of this invention will be apparent form the following detailed description of a presently preferred embodiment, which is illustrated schematically in the accompanying drawings.

BRIEF DESCRIPTION OF THE SEVERAL VIEWS OF THE DRAWINGS

FIG. 12 possible types of ratio between detailed and detailing search term.

FIG. 30 actions to change the subject range;
FIG. 31 an application example of internet retrieval (screenshot in Netscape));
FIG. 47 model of the subordinating relation;
FIG. 53 list of preferred attributes of the attributes of the search objects;
FIG. 54 depiction of search list database/-file according to the invention in form of a table;
FIG. 55 depiction of thesaurus database/-file according to the invention in form of a table;
FIG. 56 depiction of resource database/-file according to the invention in form of a table;
FIG. 57 depiction of index database/-file according to the invention in form of a table;
FIG. 58 example for document profile according to the invention;
FIG. 61 example user interface for displaying and defining constraints not concerning the subject according to the invention.

DETAILED DESCRIPTION OF THE PREFERRED EMBODIMENTS

The complete system to which the invention is applied contains documents, which can be searched and copied free of charge or in return for payment on an internal or external server.

Figure 1:
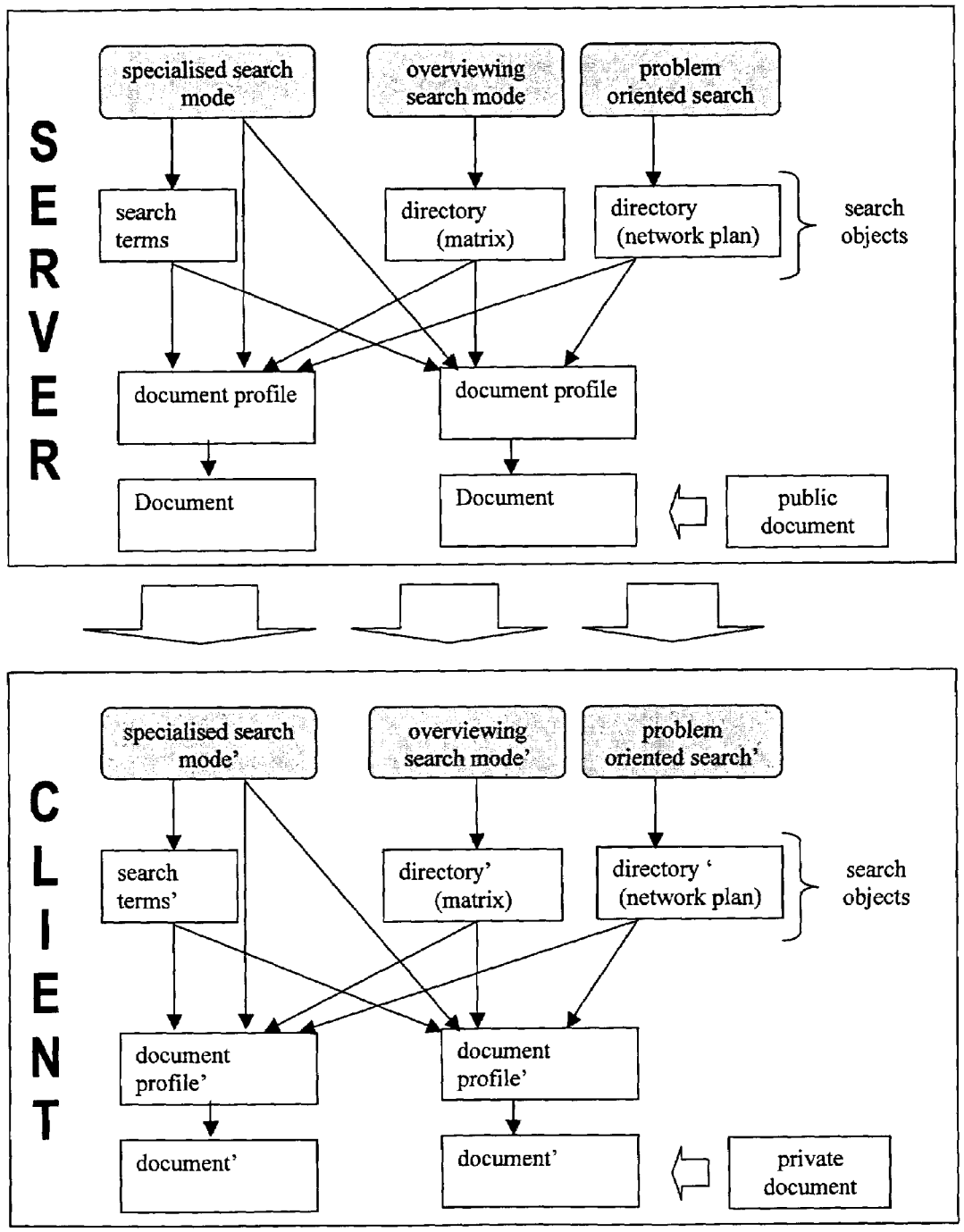
FIG. 1 a model of the entire system.

Each document has a document profile giving access to the document. The complete system is depicted in FIG. 1

Documents can be accessed by three search modes: specialised search mode, overviewing search mode and problem oriented search mode. Each mode uses its own search objects supporting the process.

The specialised search mode uses search terms consisting of text extracts or their synonyms or allows direct access to document profiles and documents. It is preferably implemented by database queries rendering document profiles either directly or indirectly via intermediary search terms.

The overviewing search mode uses directories in form of a matrix, the problem oriented search mode directories in form of network plans each giving access to the document profiles stored in a data base and documents. The connection between these objects and the document profiles to be retrieved are fixed so that results are predefined.

All search objects—search terms, directories in form of a matrix and directories in form of network plans have something in common: they are all subject related as well as connected to document profiles representing documents containing the same topic. However, amount and degree of specificity of search terms are by far higher than those of directories.

Compared to document and document profiles search object are quite static. By the time they have to be changed by far less than the documents stored in the system. New documents entail new connections to known search objects but not necessarily new search objects. Therefore users are enabled to run search routines retrieving latest documents assigned to favorable search terms periodically.

Search for New, Public Information

The search for new and public information is generally performed on a (internet)-server as illustrated in FIG. 1.

Search for Archived/Personalized Private Information

At retrieval of a document the document and all connected objects to retrieve the document (document profile, search objects) are transferred to a client related data storage (transferred component are flagged by apostrophes) so that the search process for that special document can be reproduced for the client system in the same way as for the server system.

New documents can be recorded either by the server system (public document) and be at the disposal of all clients or by a client system (private document) and be only at the disposal of the same client. Each client is able to set up an individual domain comprising documents and search structures defined by the user.

The invention is used together with further components so that three parts can be used altogether:
1. document management system
2. system for automatic retrieval according to the invention
3. e-commerce system The document management system records new documents and generates search objects.

In order to integrate public and private documents and retrieve together the client comprises a document management tool, which has an interface to the server based document management system to use its resources. The tool also enables the user to set up his own search objects for private documents.

The system for automatic retrieval according to the invention is an instrument by which the user can access all objects. Server and client version have the same features (the interfaces differ however according to e.g. different database systems).

The e-commerce system supports the download of documents as soon as online payment has been done. Moreover, it generates user profiles containing performed download actions and search routines. It is only implemented on servers.

A document is defined as information product usable independent from other documents, for example complete essays, records from a database containing facts or complete software programs.

Document profiles are representatives of the documents retrieved on behalf of the documents. They contain all necessary meta information and a link on a resource in the internet or on any document server connected by any type of network. They give full details of a document to a user to help him deciding whether to download a document.

Documents tell the user what a document contains whereas it tells the system how to find it. It contains the following details:
1. details considering the subject, for example title or abstract (subject related, visible for the user)
2. details considering the document, for example date of publication, price, author (not subject related, invisible for the user)

3. details considering the system, for example document identification, (not subject related, invisible for the user)
4. a link to the document Details described in topic 1 and 2 are relevant for the user, the details described in topic 3 and 4 only for the system. The last topic also serves for the postprocessing of the retrieval.

The type and amount of details considering the system are identical among document types and subtypes, however details considering the subject and details considering the document vary considerably.

Various types of document profiles represent different types of documents/information and their structure. They are:
1. expert articles
2. (explanations, translations: without document profile)
3. descriptions of training and education offers
4. events
5. tools, templates
6. product information, markets
7. experts, contacts, addresses
8. acts, regulations and their subtypes.

Search text includes parts of the text of a document helpful as search criteria. The invention imitates the procedure of a reader searching for information and displays him important parts of the text (via search terms) automatically structured so that he can easily and quickly recognize the parts and compare with important parts of other documents.

The more documents can be found to a subject the more search text the reader has to review to compare all documents. If only chapter headlines of books and magazines had been defined as search text, the reader would have to check pages of text to find relevant information. He could easily lose track.

Hence, search aids are implemented which abstract and present the search text of several documents automatically and clearly structured to the user to improve orientation.

Figure 2:
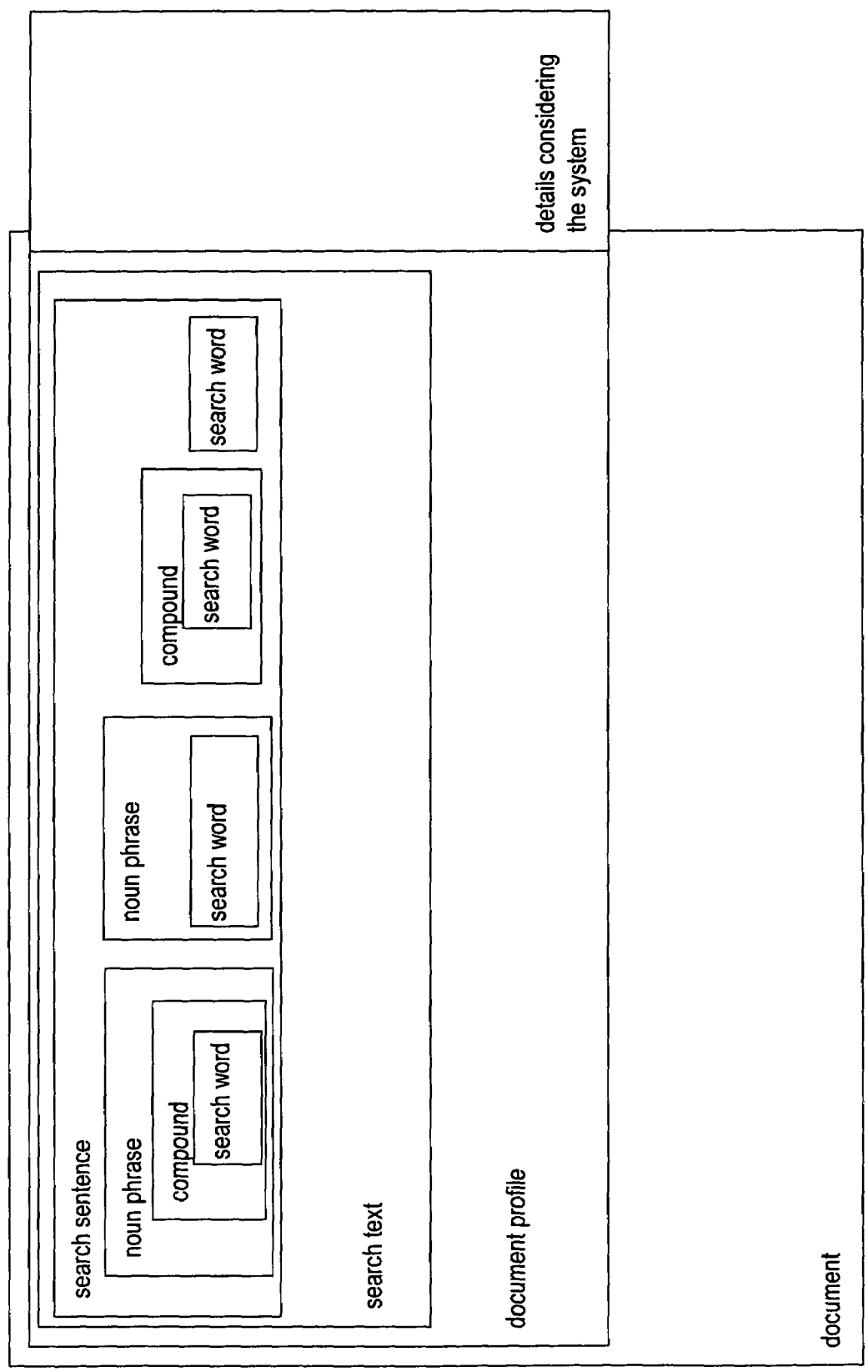
FIG. 2 the subset relations of search objects, document profiles and documents.

'Search terms', extracts of the search terms of different size connected to document profiles put such search aids to practice. They function as a text aperture, which can be adjusted accordingly by the user to see bigger or smaller parts of the search text. Search terms occurring in more than one document are connected with all document profiles and only displayed once. Synonyms are merged. The structure of the search terms is depicted in FIG. 2. They contain concepts and mostly consist of nominal expressions.

Four types are used:

| | |
|---|---|
| search word | e.g. car |
| compound | e.g. scrapping of cars |
| noun phrase | e.g. scrapping of cars according to EU law |
| search sentence | e.g. scrapping of cars according to EU law leaves questions unanswered |

The rules of formation of search terms are:

A compound must contain at least one search word.

A noun phrase must contain at least one search word or a compound (containing a search word). A noun phrase has furthermore to contain at least two concepts and their explicit relation.

A search sentence must contain at least one search word or one compound (containing a search word) or a noun phrase (containing a search word directly or via a compound). A search sentence can either be formulated from search text or straightly be copied from sentences of the search text. It must be understandable on its own without any additional annotations.

All search terms can only be taken or formulated from parts of search sentences.

Figure 3:
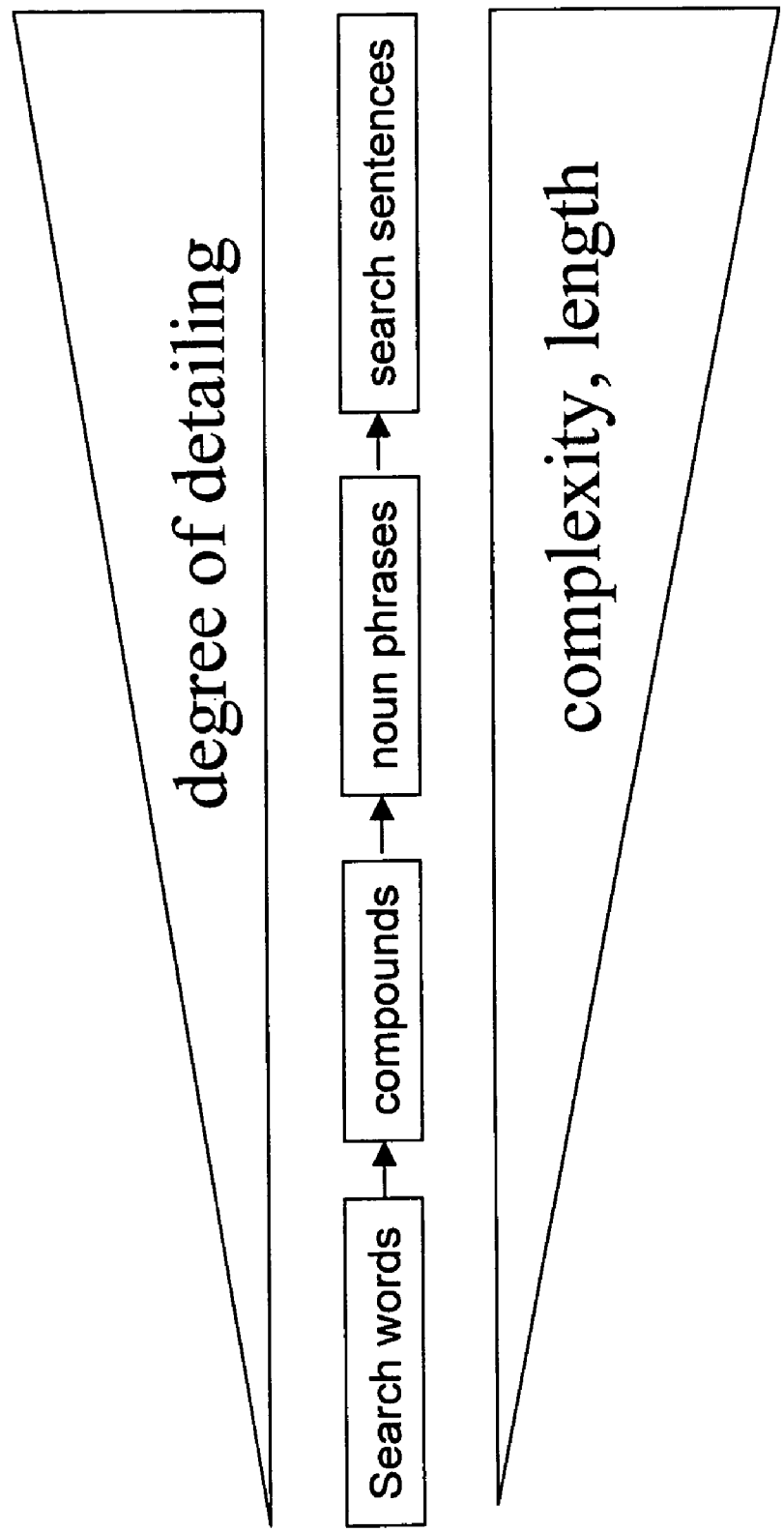
FIG. 3 properties of the search terms along a chain of search terms connected by the detailing relation.

The level of detail of the representation of the search text increases from search words via compounds and noun phrases to search sentences (see FIG. 3). The context of each search term is specified by search terms appearing on its right hand (see FIG. 3).

Accompanying the rising level of detail length and complexity increase from the left to the right side of FIG. 3.

The relations between the search terms are crucial to guide the user and to the search process. They can be divided into three types: the detailing relation, the thesaurus relation and the combining relation. The detailing relation is described in the following and by FIGS. 4-7.

Figure 4:
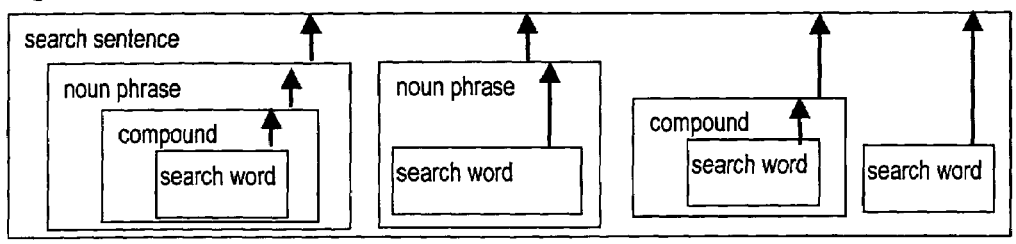
FIG. 4 a detailed view of subset relations of search terms.

FIG. 4 shows the detailing relation.

All search terms apart from search words are based on others and search terms are based directly or indirectly on a search word. They are concept components, have substantial subset relations and are nested.

Substantial subset relations exist between a detailing search term and a detailed search term as well as between a search term, a document profile and a document; one is a substantial component of the other. It maps an aspect a natural search path to the detailed search term.

Figure 5:
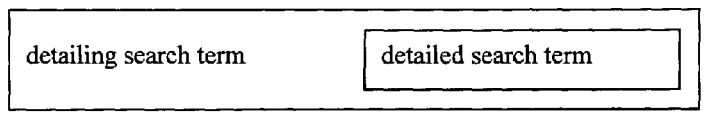
FIG. 5 subset relations of two search terms in a focused view.

The substantial subset relations are depicted in FIG. 5.

Figure 6:
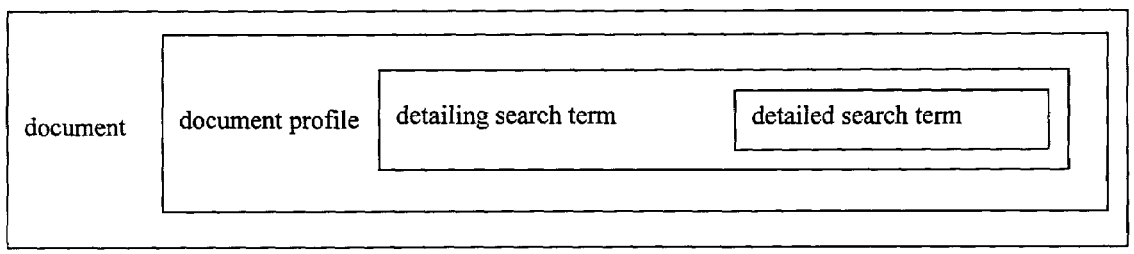
FIG. 6 subset relations of two search terms, document profiles and documents.

The substantial subset relations of search terms and of document(s) (-profiles) are depicted in FIG. 6.

Figure 7:
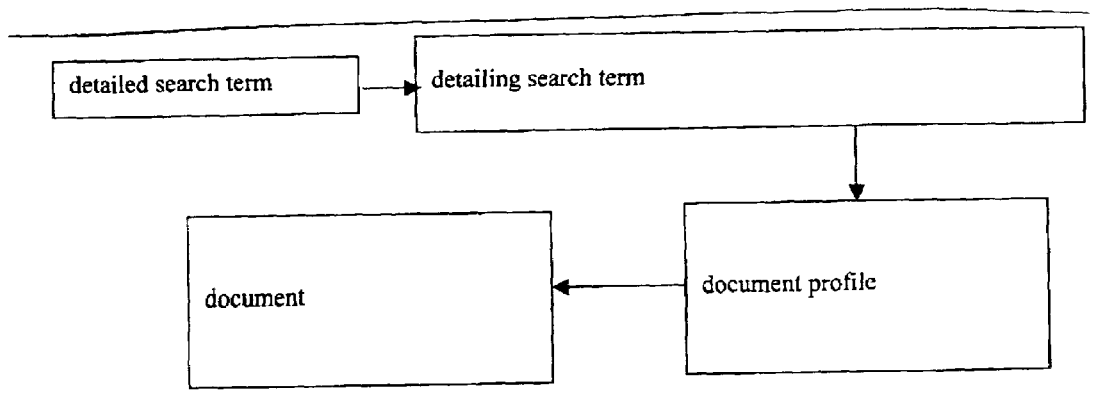
FIG. 7 the detailing relation between search terms and document (profiles), as reversed subset relation.

Elements having a substantial subset relation are connected. The connection is called detailing relation, as depicted in FIG. 7.

Detailing is defined as precising the situational meaning/context.

A detailed search term is contained in a detailing search term and its context is precised by the latter. (Additionally further expression specificating the meaning are contained which need not be search terms necessarily).

A search word details at least a compound in which it is contained. Likewise noun phrases are detailed by the contained search words and compounds. Search sentences contain and detail all other types of search terms.

Figure 8:
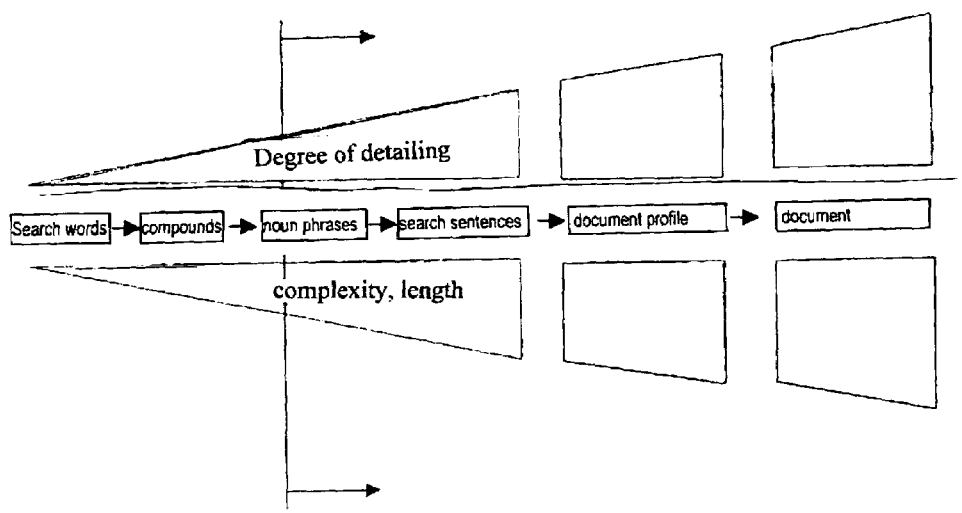
FIG. 8 complete view on a chain according to FIG. 7 containing the additional search objects document profile and a document for demonstration of effect and function of the text aperture.

The detailing relation enables the user to see differently detailed and sized extracts of the search text and thus of the document as depicted in FIG. 8. (The detailed search term is always on the left side of the detailing search term).

The feature to see extracts of different size can be compared to an aperture, which can be adjusted by the user.

In the course of the search process, the user reaches search terms, which are more and more detailed, and thus widens the aperture, as depicted in FIG. 8.

By widening the aperture, the user can see more detailed, more complex and longer extracts of the search text and of its document. As a consequence, he has to reduce the number of search terms more and more in order to avoid information overload.

This effect can be compared to optical zooming. By zooming in, a photographer gets a more detailed view of an object, the increasing size of the mapped objects however forces a concentration on fewer objects because of the fixed maximum size of the projection area. Otherwise, not all objects can be displayed.

Search terms are projections of the object document with different semantic enlargement scales analogous to different geometric enlargement scales manipulated by zooming. The more detailed the projection is (the bigger the zoom factor) the user chooses the less search terms respectively documents he can see.

Figure 9:
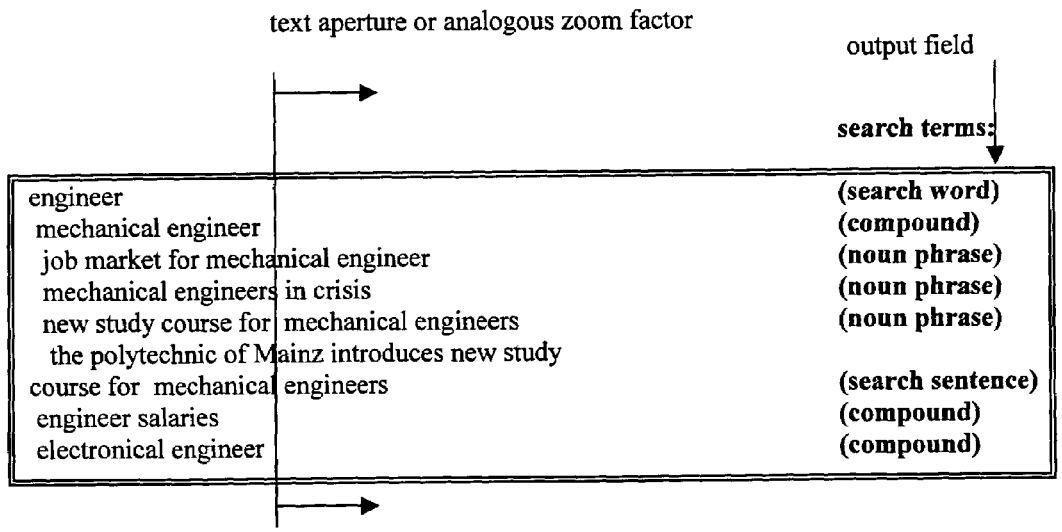
FIG. 9 function of the text aperture implemented by output field in the user interface; different degrees of detailing are marked by different indentions in the output field as well as by comments illustrating the figure.

FIG. 9 depicts the "projection area" of the search system, an output field in the user frontend.

However, in opposition to the geometric case several projections of documents with different zoom factors are displayed at the same time. The document profile represented by a search sentence appears not very much reduced, whereas documents relating to the subject "engineer salaries" in FIG. 9 appear quite reduced and not detailed.

The output field can be scrolled analogous to moving a lens bringing new objects into sight. The user is however motivated to early concentrate on few relevant objects in order not to scroll. He can delete other objects and exclude them from the further search process.

Figure 10:
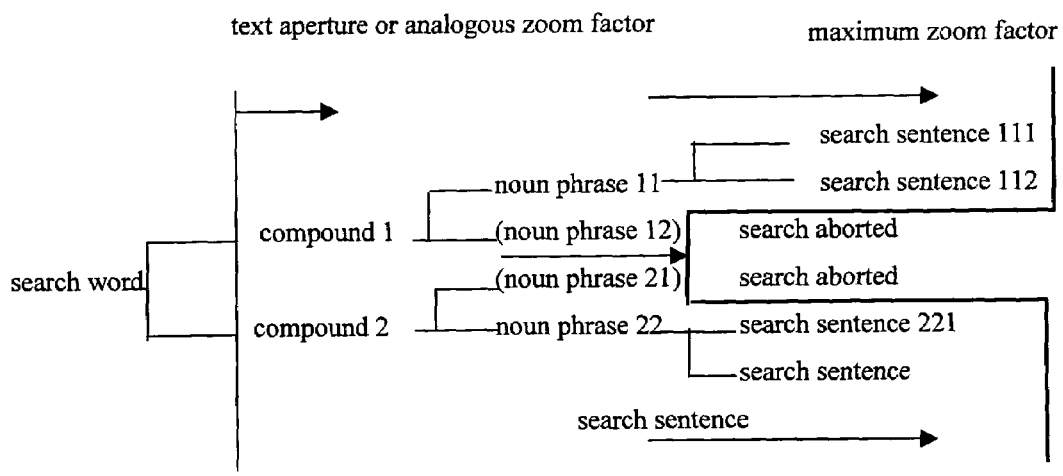
FIG. 10 the effect of selection of certain search objects by the user by input options of the computer on the representation of the semantic search space.

Thus more space remains for the rest to execute further actions of detailing, as depicted in FIG. 10.

A summary of form of a catalogue or a directory is presented to the user whose paths are opened step by step (see FIG. 10).

The branchings of the chosen search terms are displayed in the output field where the user can choose items (black beam in FIG. 11) in order to involve them in another action of detailing.

Figure 11:
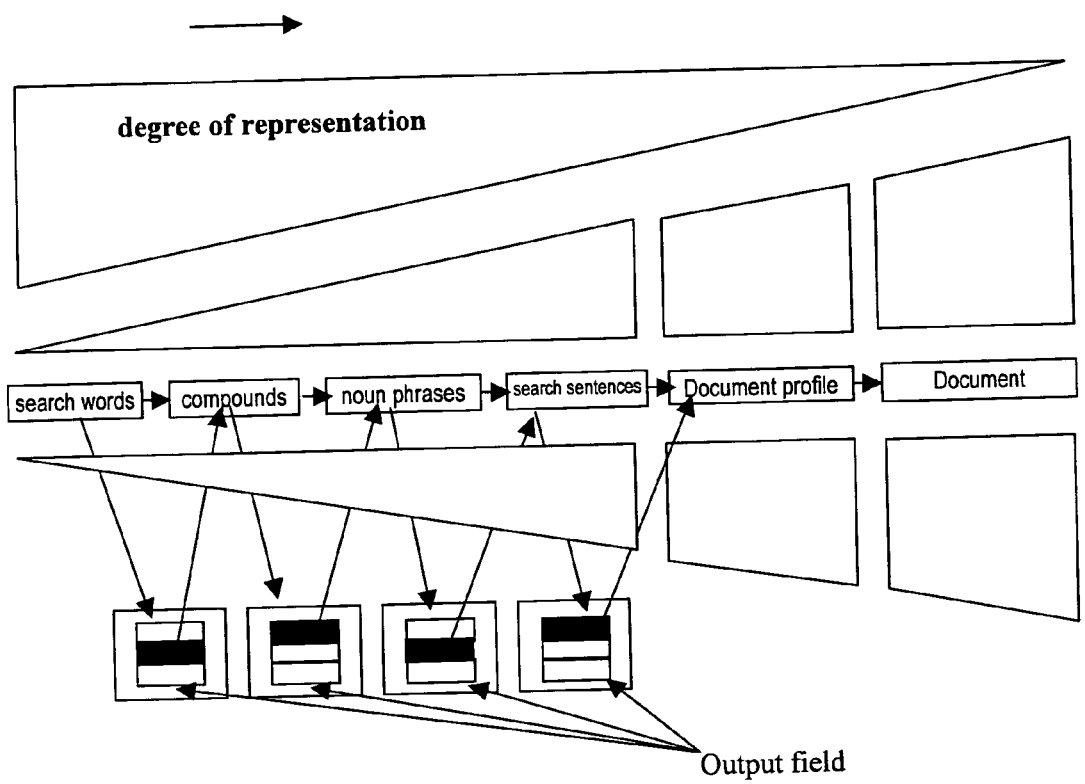
FIG. 11 running through various levels of detailing; at any level the system presents search terms in the output field of the user interface from which the user chooses some of the items, others not.

The course of the preferred search sketched in FIG. 11 is idealized, in reality there appear also "short cuts". A noun phrase for instance may contain a search word but no compound or a search sentence may contain a search word or compound but no noun phrase (see FIG. 12).

The method ensures that always the same type of search term is selected and skips types not represented by the detailing relation of the chosen search terms.

The ratio of detailed and detailing search term is n:m, that means a detailed search term can always be detailed by one or more detailing search terms (case a). The other way round a detailing search term can detail one or more search terms, as depicted in FIG. 12.

Figure 13:
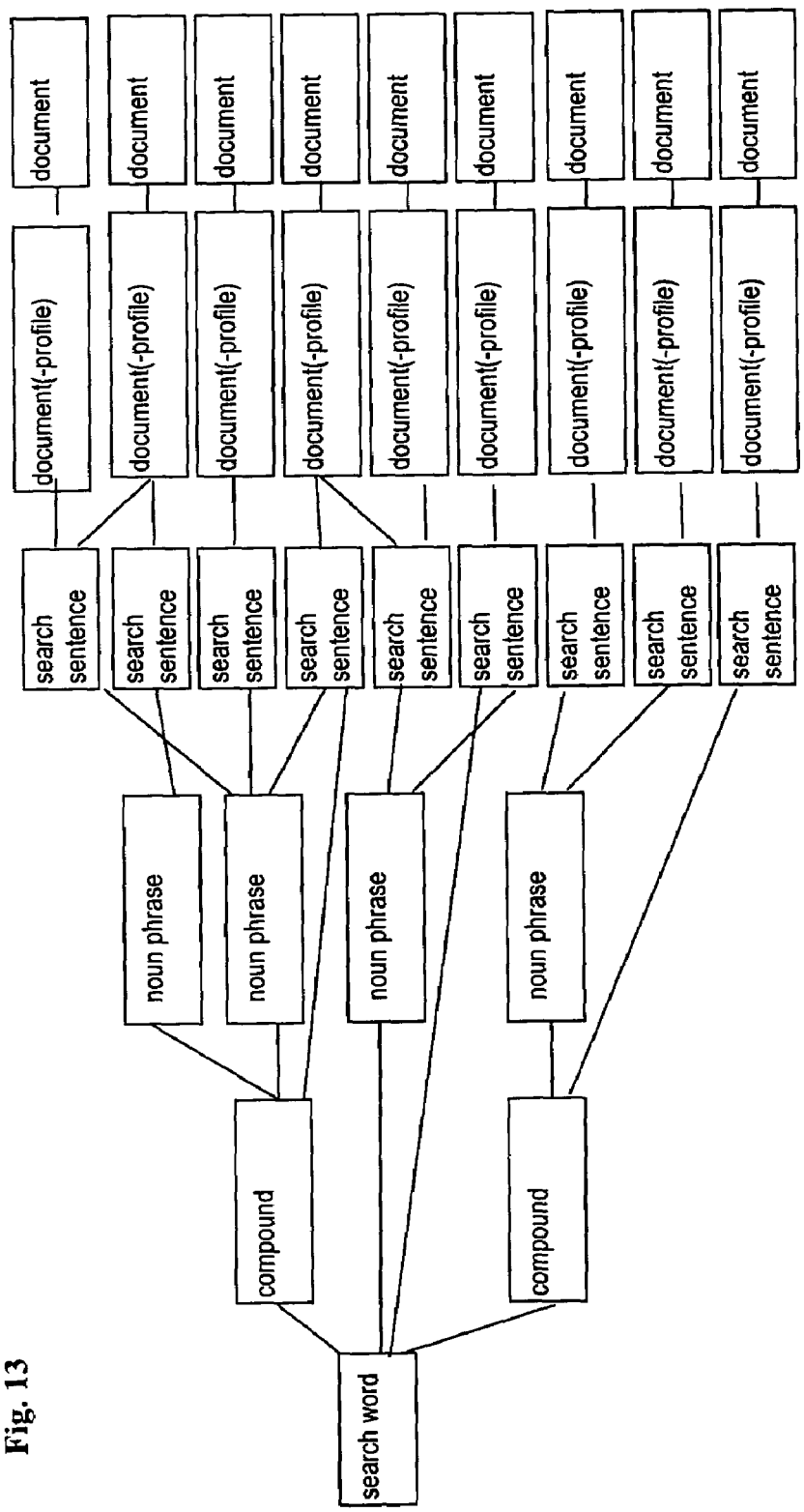
FIG. 13 the possibilities of branching via the detailing relation applied to a search word.

The branching possibilities of the detailing relation applied to a search word are depicted in FIG. 13.

The detailing relation has the following advantages:

Dividing of selection into several successive steps by means of search terms getting increasingly detailed has several advantages:

The user can influence the direction of the search process and refine it even after he chose a search word. He is not forced to view the final search result (the document itself) and evaluate it, which is—compared to the evaluation of a search term—much more complex, confusing and time consuming in order to modify the search strategy and run a new search process as it happens by the use of conventional search systems using for example relevance feedback.

The user does not have to formulate a query statement or query term, he just has to choose from search terms. That reliefes the process when longer search terms have to be handled (e.g. noun phrases).

The increasing branching sketched in FIG. 13 causes—by increasing degree of detailing—a reduction in amount of documents connected to each single search term (=degree of representation, see FIG. 11), because the amount of documents is divided by detailing search terms: A general search term like the search word 'engineer' is connected to all documents, also to documents which are connected to the compounds 'mechanical engineer', 'electrical engineer' and so on. Therefore, it represents more documents than the compounds which means its degree of representation is higher.

For the sake of straightforwardness and because of limited space the user usually limits or even reduces of displayed search terms.

The amount of documents connected to the displayed search terms is reduced because of the decreasing degree of representation typical of more detailed search terms appearing in the course of the search process.

Figure 14:
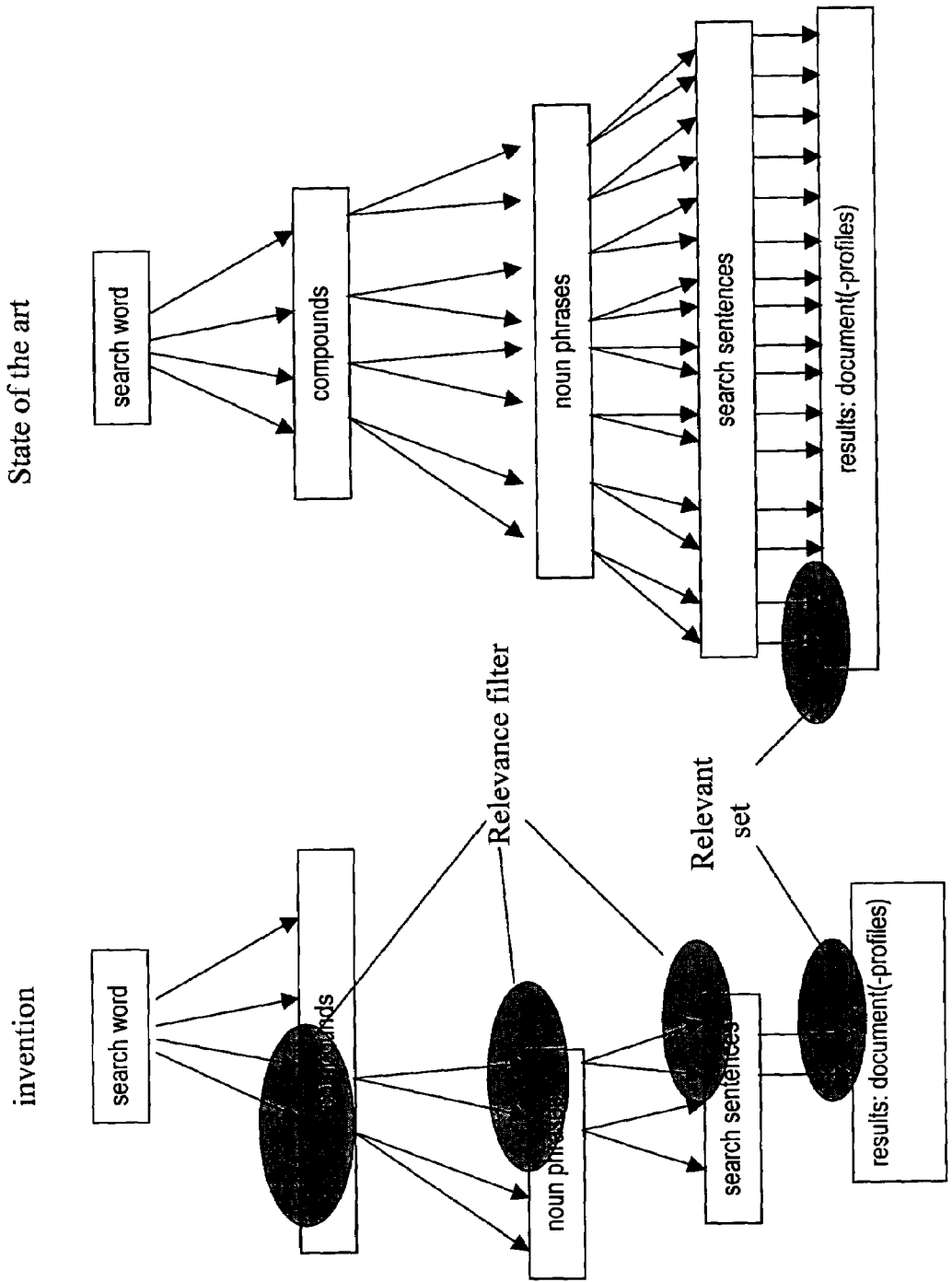
FIG. 14 comparison of "state-of-the-art" search systems and the invention regarding the amount of results a user has to evaluate.

FIG. 14 illustrates that in case of the invention fewer results have to be evaluated than in case of conventional search systems and that moreover the evaluations are less complex as search terms are shorter and easier to check than whole documents.

Figure 15:
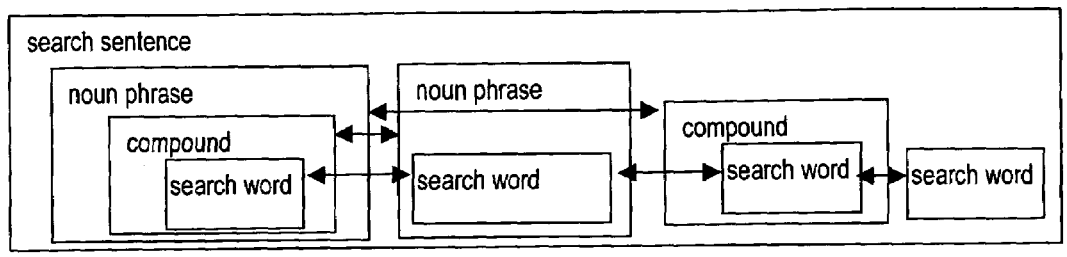
FIG. 15 thesaurus relation sketched analogous to FIG. 2.

FIG. 15 shows that a conventional system querying after formulation of a query term relevant documents or document profiles directly and skipping the intermediate stages of querying other (more detailed) search terms. Such a system causes the user according to FIG. 15 to evaluate 16 results. In case of application of the invention under the same conditions and a selection quota of 50%, the user has to evaluate only 12 results most of them being search terms and therefore less complex to evaluate than documents.

In addition to the detailing relation, the invention comprises the thesaurus relations.

They connect search terms having no substantial subset relations but located side by side in the search text. These are independent concepts but nevertheless related by their content (=thesaurus relations, depicted in FIGS. 15 and 16). They include the types subordinating relation, superordinating relation and associating relation.

Figure 16:
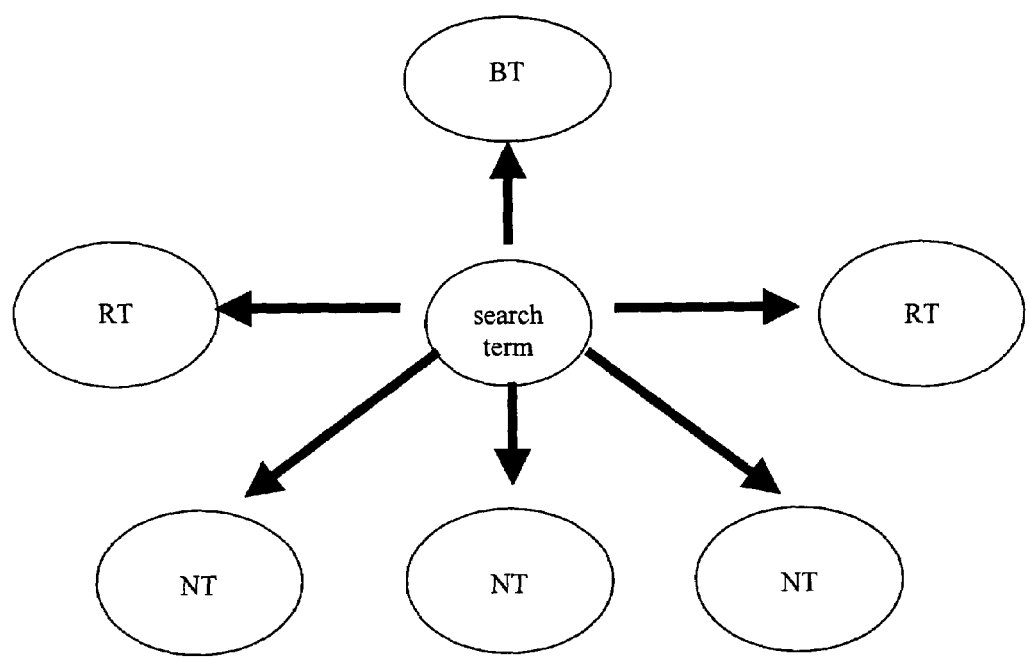
FIG. 16 characteristics of thesaurus relation in the semantic space.

As illustrated in FIG. 16, search terms connected by thesaurus relations can have the following status:

BT (broader term=subordinated search term)

NT (narrower term=superordinated search term) and

RT (Related term=associated search term)

Thesaurus relations can be distinguished from detailing relations by the following characteristics:

In case of detailing relations, the situational meaning/context of search terms is precised and it is substantially contained in another search term. That means that detailed and detailing search term have concepts in common, the detailing search term however enriches the concepts by adding details or aspects accompanied by bigger length and complexity as illustrated in FIG. 3. As a consequence the detailing relation guides the user from general to special topics.

The search terms connected by thesaurus relations usually have no concepts in common. They only belong together because of their meaning and not linguistically.

One search term is not contained in the other and its context is not defined by the other.

The thesaurus relation is independent from the detailing relation, which can be apply additionally.

The BT/NT-relations are mutual, that means if a search term is superordinated to another (having status 'BT' concerning the connection), the latter is subordinated to the first and has the status 'NT' concerning the connection.

A NT often defines a value or a subgroup of a BT.

An expression for the detailing relation is:

[less detailed search term]–"more precise"→[more detailed search term]

A corresponding expression for the BT/NT-Relation is:

[NT]–"part of/characteristic/type/example of"→[BT]

Graphically, both relations are illustrated in FIG. 16.

Synonyms are search terms having strictly the same meaning. They are merged in the way that the relations assigned to one apply likewise to the other.

An example are the synonyms "Great Britain" and "United Kingdom". The noun phrase "economical situation in Great Britain" is connected with the search word "Great Britain" as well as with the search word "United Kingdom". Thus, the method selects the search terms related to a synonym without displaying it.

RT are associative search terms with similar meaning.

The relation between a search term and its RT is consequently called associating relation.

Thesaurus relations are preferably used for the following actions performed by the method:

specialize (NTs are queried)

enlarge (RTs are queried)

generalize (BTs are queried)

If a user has chosen a search term being too special and therefore gets too few results, he can generalize it by BTs and increase the amount of results. BTs can give an overview and render alternatives.

Following querying of NTs can lead to new aspects and give ideas for new searching.

If a user searches for example for "fertilizer for sunflowers" and gets few results, he can query the BT "fertilizer for flowers". Thus, he is given the hint that the searched term belongs to fertilizers for flowers and an approach to continue searching. The NTs of the latter search term are several types of fertilizer for flowers which can be checked by the user if being suitable, like "fertilizer for corn poppy".

The RTs may induce continued searching as well if the search process has lead into an impasse.

The invented method however implicitly (that means displaying to the user not before search sentences are to be queried) queries NTs as well. Otherwise, it could happen that a user searches for "fertilizer for flowers" and relevant documents concerning "fertilizer for sunflowers" are not selected.

Thus the whole agglomerate of search terms is selected which can be subsumed to "flowers". Sometimes however the user does not want to include all NTs into a search process. If a user for example has several flowers, he might search for different types of fertilizer of flowers apart from special fertilizer for sunflowers, which he does not have. To exclude this aspect he has to query the NTs and avoid all search terms having to do with "sunflowers".

Figure 17:
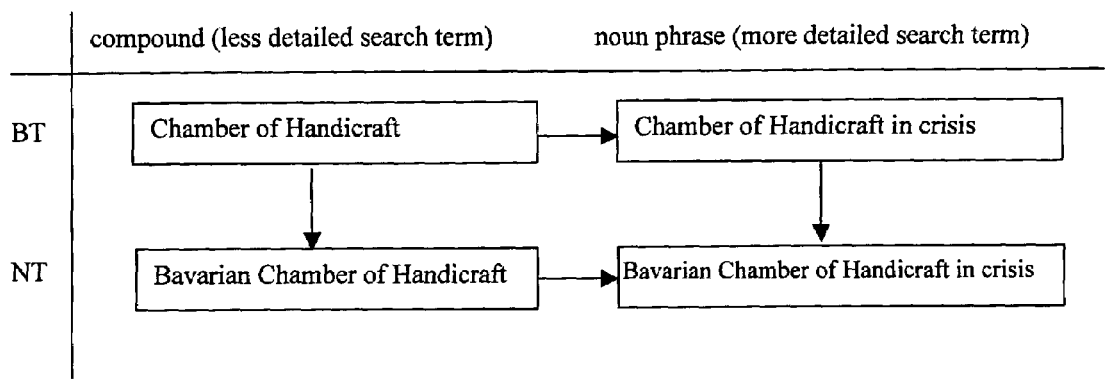
FIG. 17 differences between thesaurus relation and detailing relation illustrated by examples.
Figure 18:
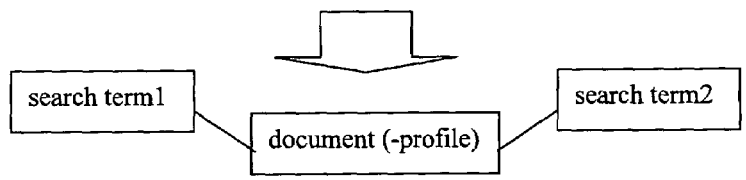
FIG. 18 introduction of constraints not concerning the subject to the search process and effect on selected results.

Limitations according to the invention enable the user to define constraints not concerning the subject to optimize the results of the search process considering the set conditions as illustrated in FIG. 17.

Only search terms and document profiles fulfilling the conditions are selected and displayed by the invented method.

The conditions are document-related. They usually reduce the number of relevant document profiles and thus the number of connected search terms selected.

Constraints not concerning the subject can be for example the document type and characteristics like source, language or price.

Constraints not concerning the subjects can be dropped during the search process, which increases again the number of relevant document profiles, and thus the number of connected search terms selected.

The invention comprises moreover the action "combine" using the combining relation.

Combining relations define sets of document (profiles), either containing a combination of search terms (including combination, corresponding to the Boolean operator "AND") or containing one search term but not the other (excluding combination, corresponding to the Boolean operator "AND NOT").

Figure 19:
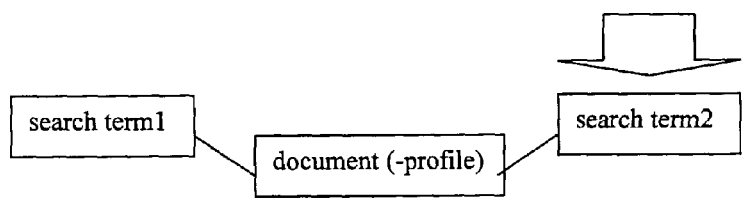
FIG. 19 introduction of constraints concerning the subject to the search process via the combination relation and effect on selected results.

The connection of two search terms is implemented via a document profile as illustrated in FIG. 19.

Combining relations are search term related. If the user chooses a set of search terms and executes the "combine" action according to the invention the number of the document profiles relevant for the search is reduced because only those profiles are further considered being connected to the chosen search terms. Thus, the number of relevant search terms is reduced as well, for only search terms are further considered which are contained in the relevant set documents profiles defined in the step before. By the described action, the user defines constraints concerning the subject.

The action "combine" is performed by two main steps. On selection of a search term (search term 1) or a search term set (search term set 1) all search terms are selected and displayed to the user by the method according to the invention which are contained together with search term 1 or search term set 1 in the search text of the same document (step 1).

Then the user can choose search terms to be considered in the following search process (include them). Consequently, only those document profiles are further considered containing as well search term 1/search term set 1 as well as the included search terms (step 2*a*).

The action enables the user to stress a second aspect.

Instead of step 2*a* the user can choose search terms not to be considered in the following search process (exclude them). Consequently, only those document profiles are further considered containing search term 1/search term set 1 and not the included search terms (step 2*b*). This action enables the user to exclude a second unwanted aspect often correlating with the first aspect.

The actions "combine", "include" and "exclude" according to the invention are illustrated by FIG. 20 to 27.

Figure 20:
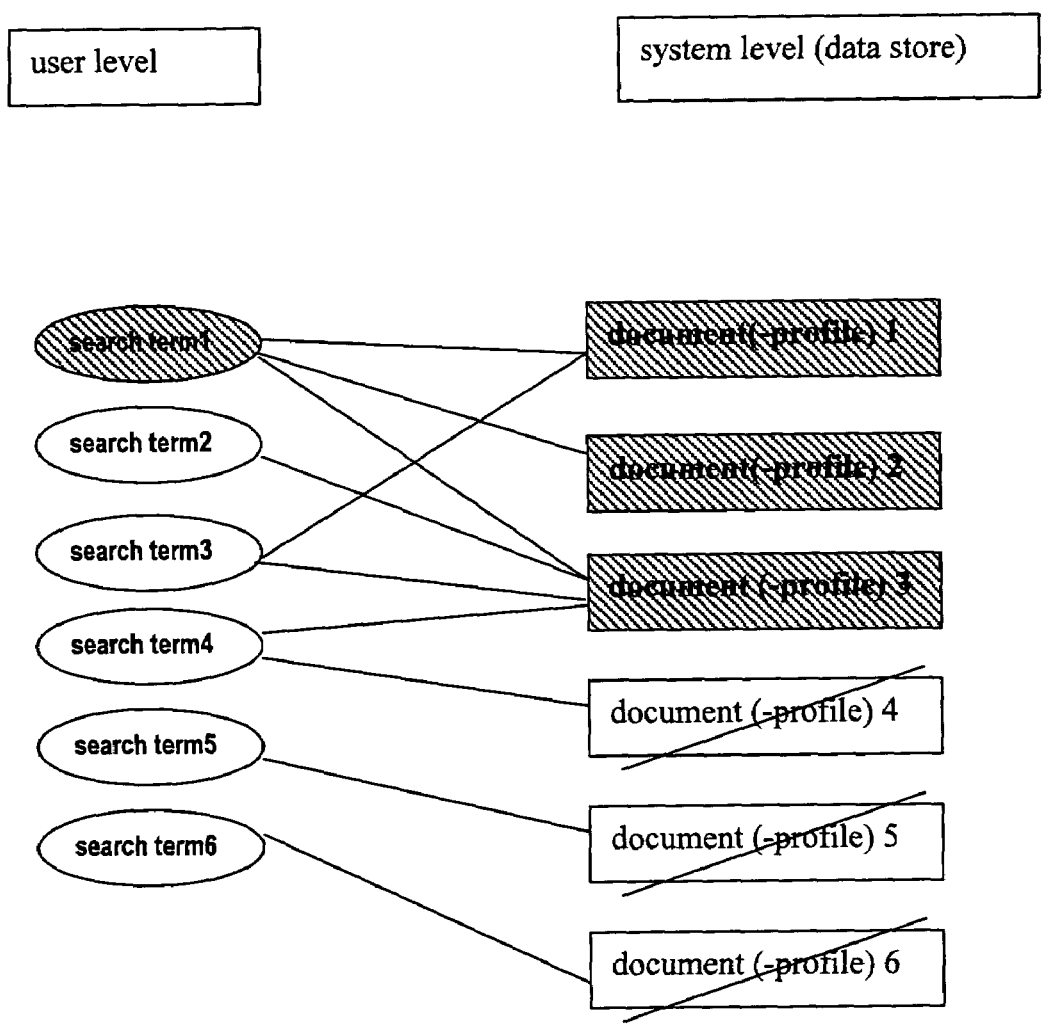
FIGS. 20 to 27 the search process using all kinds of constraints available.

FIG. 20: Search term 1 should be combined to others.

First, the method selects document profiles connected to the search term/containing the search term, which fulfil the (probably) defined constraints not concerning the subject (hatched areas in FIG. 20). They are therefore relevant.

All document profiles connected to search term 1 are blocked for the search process and no more relevant (white, crossed out document profiles in FIG. 20).

The method according to the invention keeps the combination as constraint concerning the subject. Unlike a constraint not concerning the subject it cannot be dropped, that means, all search object selected later in the process have to meet the condition defined by the combination. It can only be dropped by a restart of the search process.

Figure 21:
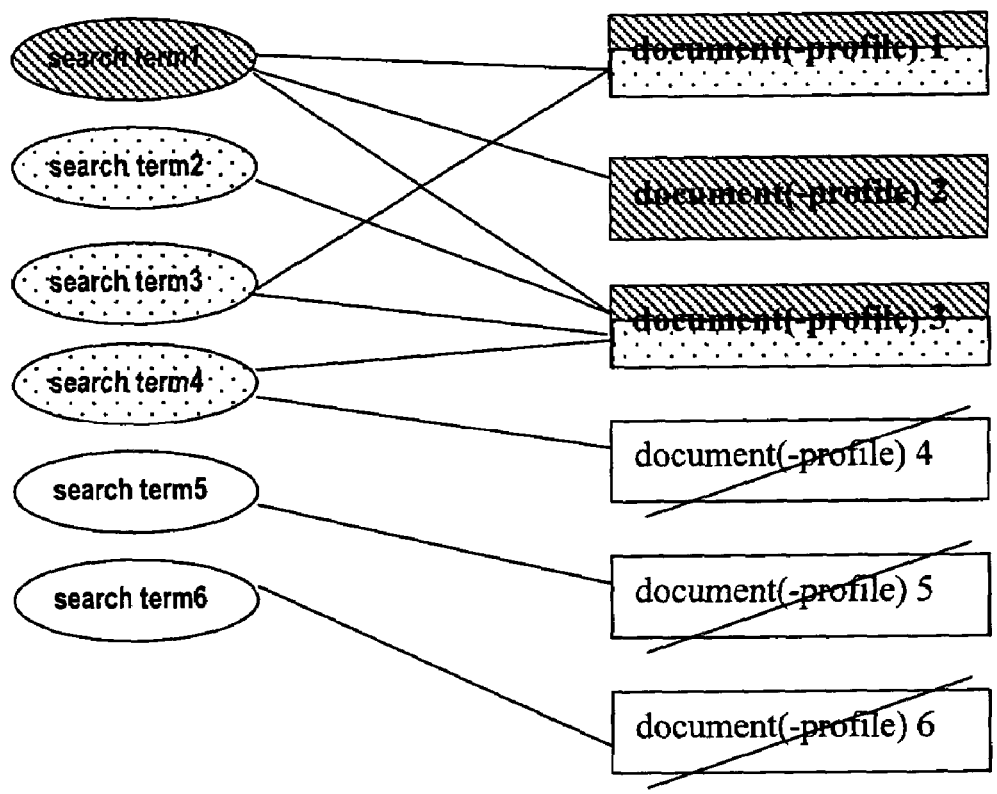

Afterwards the system selects additional search terms also being connected with/contained in the relevant document profiles (dotted and hatched elements) and displays them in the output field (dotted elements) as shown in FIG. 21.

The user can choose search term 2 from the list of selected documents of FIG. 21 and include it for the following process. The system blocks all document profiles not connected to search term 1 and search term 2 for the further search process, as depicted in FIG. 22.

To put it by other terms:

Relevant document profiles are now hatched and dotted elements of FIG. 21 containing search term 1 as well as search term 2.

Figure 22:
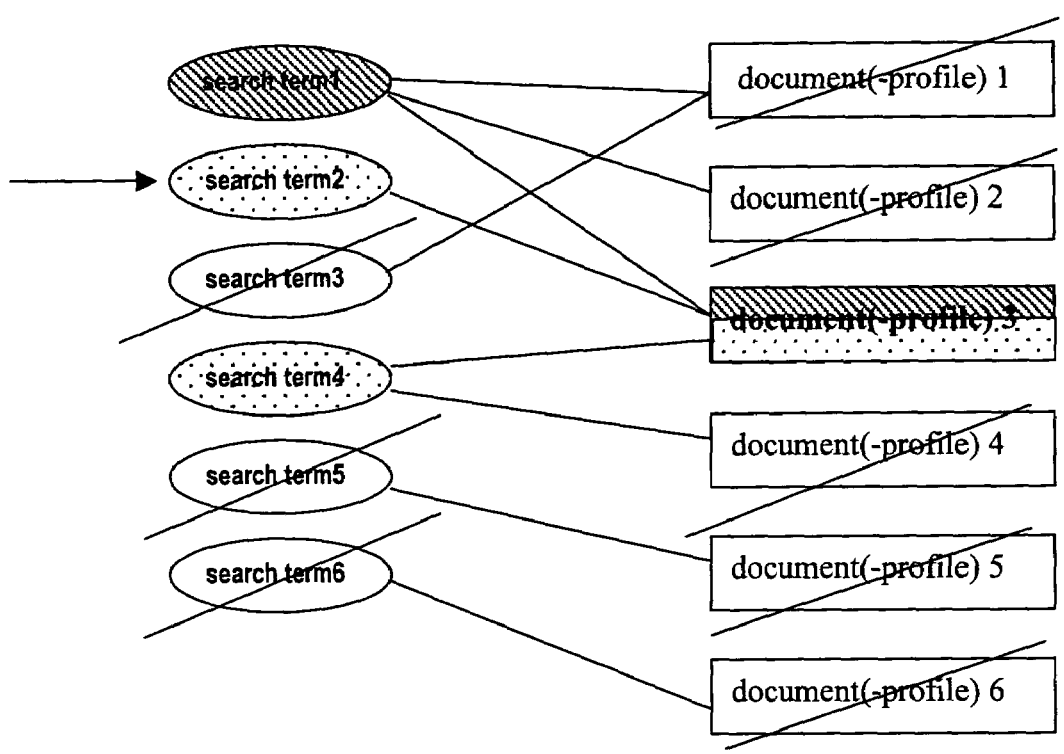

Search terms not connected with relevant document profiles are not relevant for the following search steps (white, crossed out search terms in FIG. 22).

Only document profiles (also) connected to relevant documents are relevant for the further search (e.g. document profile 3 in FIG. 22).

Search term 1 is connected to an irrelevant (1) and a relevant document profile (3). Search term (3). It represents for the further search only the relevant item (3), the irrelevant (1) should not rendered to the user.

Figure 23:
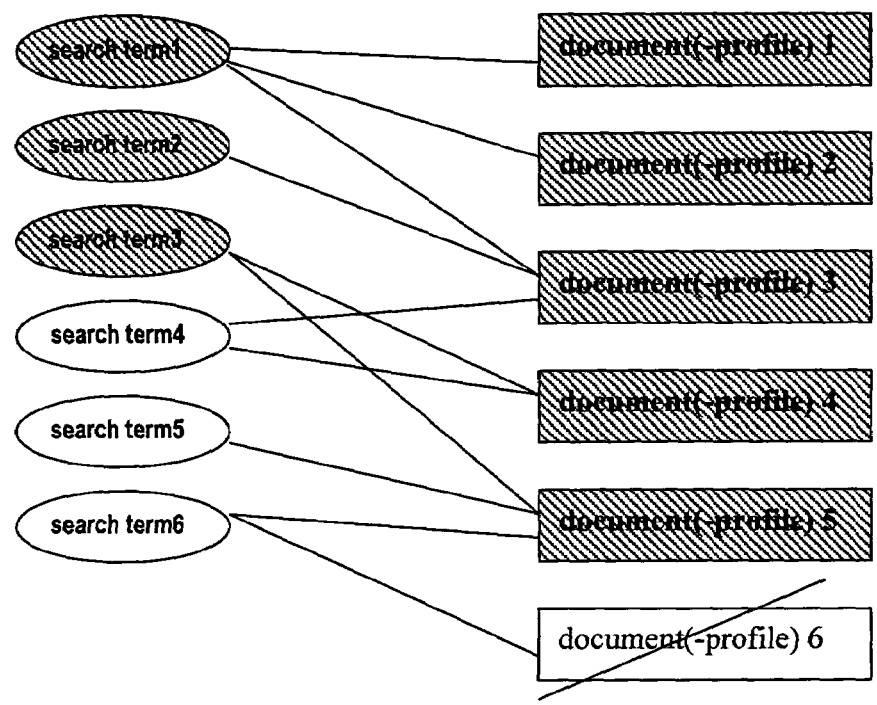
Figure 24:
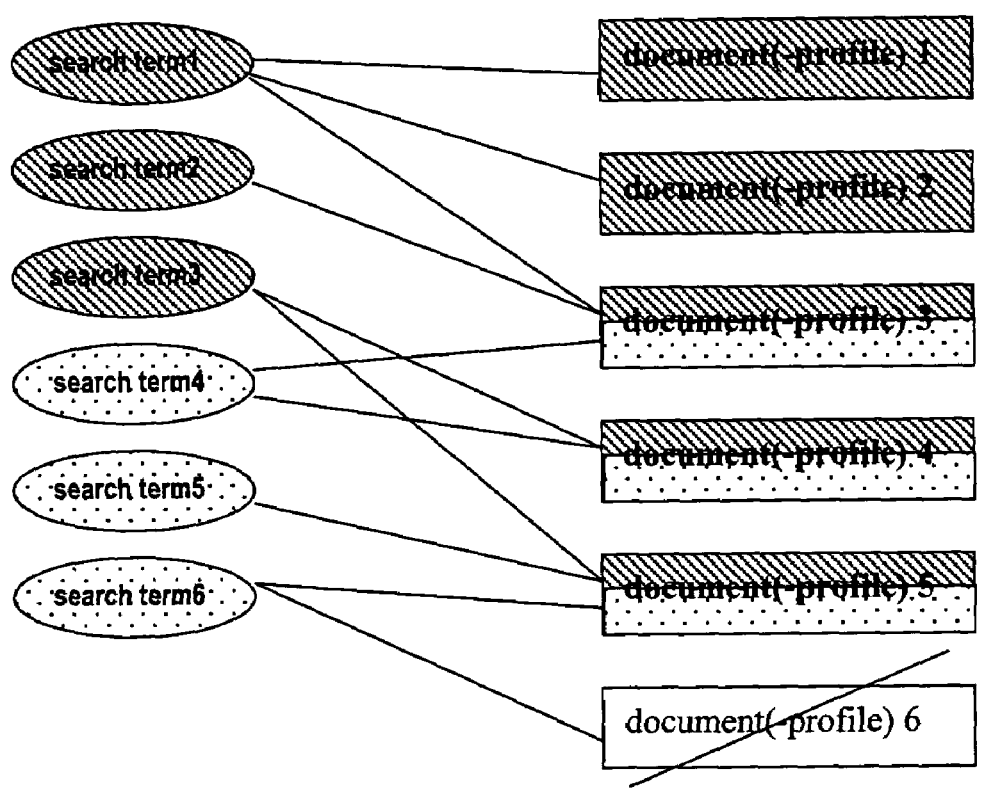

FIGS. 23 and 24 illustrate the procedure to combine a set of search terms with a search term.

In the following, the user wants to combine a set of search terms consisting of search terms 1–3 (set 1) with other search terms. The same steps performed as above now have to be done for a set of search terms. Set 1 is displayed in the output field at the beginning of the first step as depicted in FIG. 23.

Then document profiles are blocked which are not connected to a search term of set 1, consequently not containing at least one of the search terms 1 to 3 as depicted in FIG. 23.

As soon as the user selects search term 2 to exclude it from further processes all document profiles which contain search term 2 or which do not contain set1 are blocked (crossed out elements of FIG. 25) for further search processes.

To put it by other terms:

Relevant document profiles are now hatched elements or elements being hatched and dotted containing search term 1 and not search term 2.

Only search terms connected (also) to relevant document (-profiles) are relevant for further search processes. All search terms connected only to blocked document (-profiles) are irrelevant.

Search term 1 is connected to an irrelevant and to a relevant document (-profile). It represents in further search process only the relevant; the irrelevant must not be rendered to the user.

Figure 25:
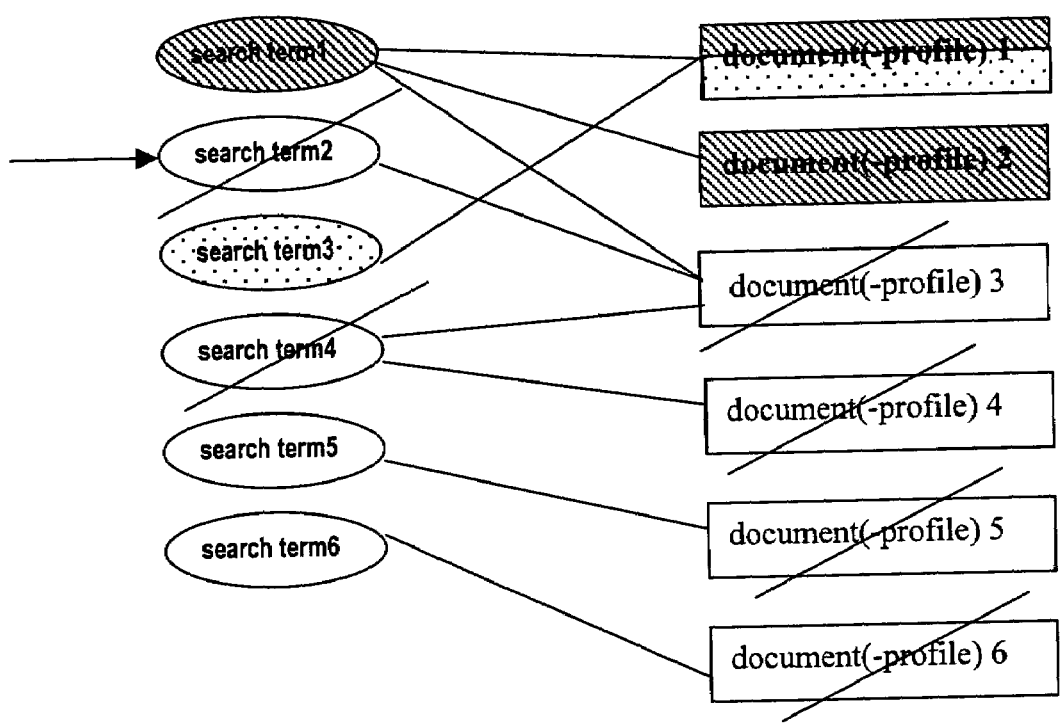

Then again the method selects search terms which are at least combined with one search term not belonging to the search term set and therefore appearing in the same document (profile) (the hatched and dotted elements in FIG. 25). The found search terms (dotted) are displayed in the output field (FIG. 26).

Figure 26:
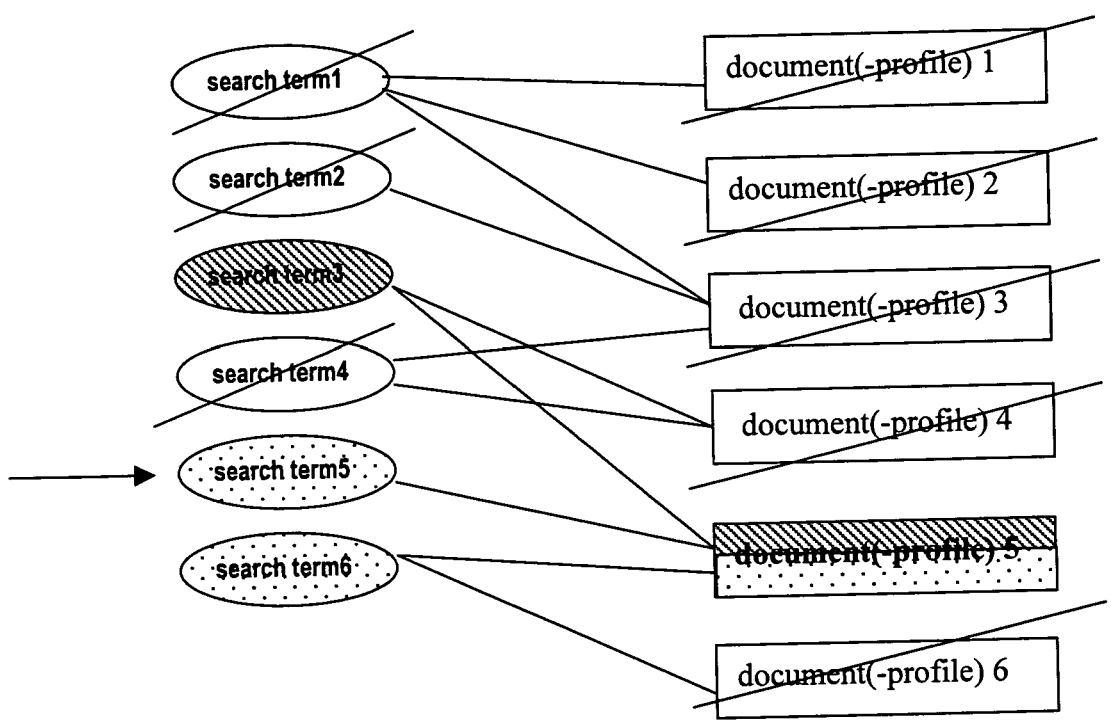

The user chooses search term 5, as depicted in FIG. 26 to include it. The method blocks all document(s) (profiles) not connected to search term 5 and one of the search terms 1–3. The hatched and dotted elements are relevant for further search and the search terms 3, 5 and 6, which are connected to them. Search terms 1 und 2 which cannot be connected to search term 5 are no more relevant for further search as well as search term 4.

Figure 27:
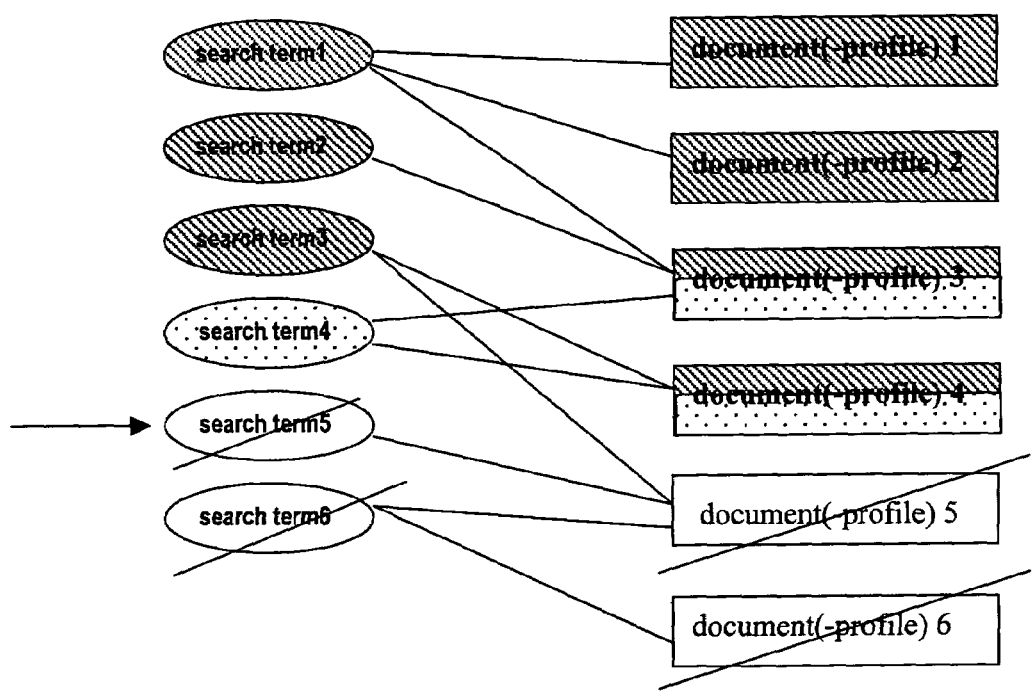

If the user chooses search term 5 to exclude it from the search process, document (s) (profiles) are blocked which contain this search term or do not contain any search term of the search term set. All document (s) (profiles) connected only to blocked elements are not relevant for further search, as depicted in FIG. 27. Only search terms (also) connected to relevant document (s) (profiles) are relevant.

The action "combine" can (as all actions of the invention) be repeated so that a result of an action can be used for the next action. Thus, Boolean operations of three and more terms can be generated.

Figure 28:
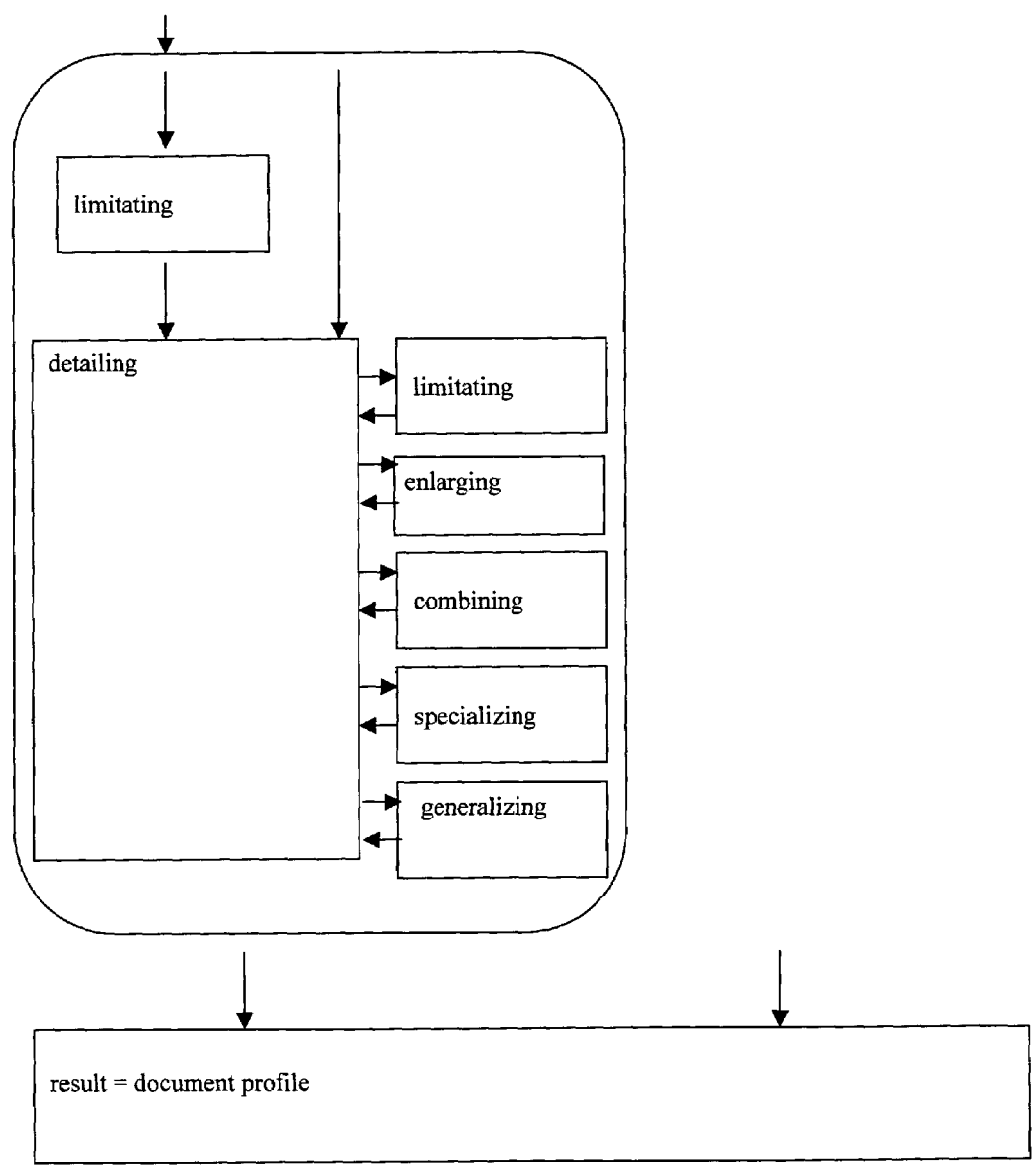
FIG. 28 overview of the actions of the specialised search mode (invention)
Figure 29:
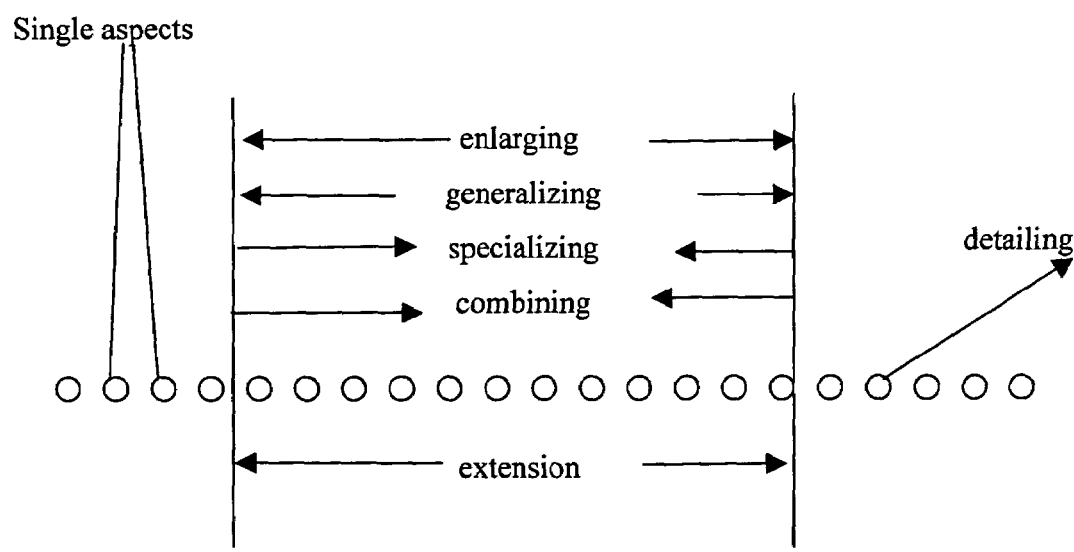
FIG. 29 possibilities to change the subject range.

The same effect is generated if each term1 respectively search term set1 are combined with several search objects. In FIGS. 20 to 27 the user had to choose several of the dotted search terms. Then further document (s) (profiles) had to be blocked containing these search terms (exclude) respectively not containing them (include):

The actions of the invention are run in the following order as depicted in FIG. 28.

First prelimitations are performed. Then successive actions of detailing (named "detail") are executed accompanied by the actions "limitate", "enlarge", "generalize", "specialize" and "combine" in any order. Finally, search sentences are displayed form which items are chosen to receive document profiles.

The user selects results rendered by an action to subject them to the next action.

Document profiles are stored in a data base which is—according to the invention—queried indirectly via databases storing the search terms. The search terms function as intermediate retrieval for the retrieval of document profiles.

As alternative to the invention the document profile data base can also be queried directly via a user front end (=direct search, see right arrow in FIG. 28).

By the invention, the user is enabled to move free in the semantic space. At any time the user can manipulate the number and quality of considered topics or aspects ("enlarge", "generalize", "specialize" and "combine") or go into details ("detail") as illustrated in FIG. 28, 30. In any situation, the invention supplies predefined search terms to the user to support his articulation what he is searching for so that he does not need to formulate input. Therefore, a passive knowledge of terminology of the searched subject is sufficient.

Moreover, the overviewing search mode is at disposal as well to search document profiles.

It uses hierarchical directories connected to the document profiles and corresponds to a classification system. The first level is implemented in form of a matrix, the next levels in form of one-dimensional branching structures (see FIG. 31 after selection of matrix field "tools/labour market, human resource" a connected branching structure has been displayed).

Each class or directory is defined by a administrator on a sever system and therefore standardized. The standardized structure can be alternated on a client system.

As indicated by the name the user is supposed to get quick and clear but not very special information just to get an overview of a certain subject. Correspondingly information is delivered not being to special but popular for an average user. The mode can be compared to skimming through a newspaper.

Client and server use the same directories so that a user can easily update his client system ("update results") and transfer new subdirectories and connected document profiles from the server to the client. He can easily repeat the same search procedure by searching in the same directories.

The problem oriented search mode is a special form of the overviewing search mode. Both have hierarchical structures implemented by directories defined by an administrator in common. An example is illustrated on FIG. 32 ("costs of distribution and marketing") and FIG. 33. (subdirectory).

The problem oriented search mode however differs from the overviewing search mode in summarizing directories associated by the subject, depending on each other or influencing each other as "problem chains" being presented to the user. Such a structure is illustrated by nodes and arrows.

Figure 32:
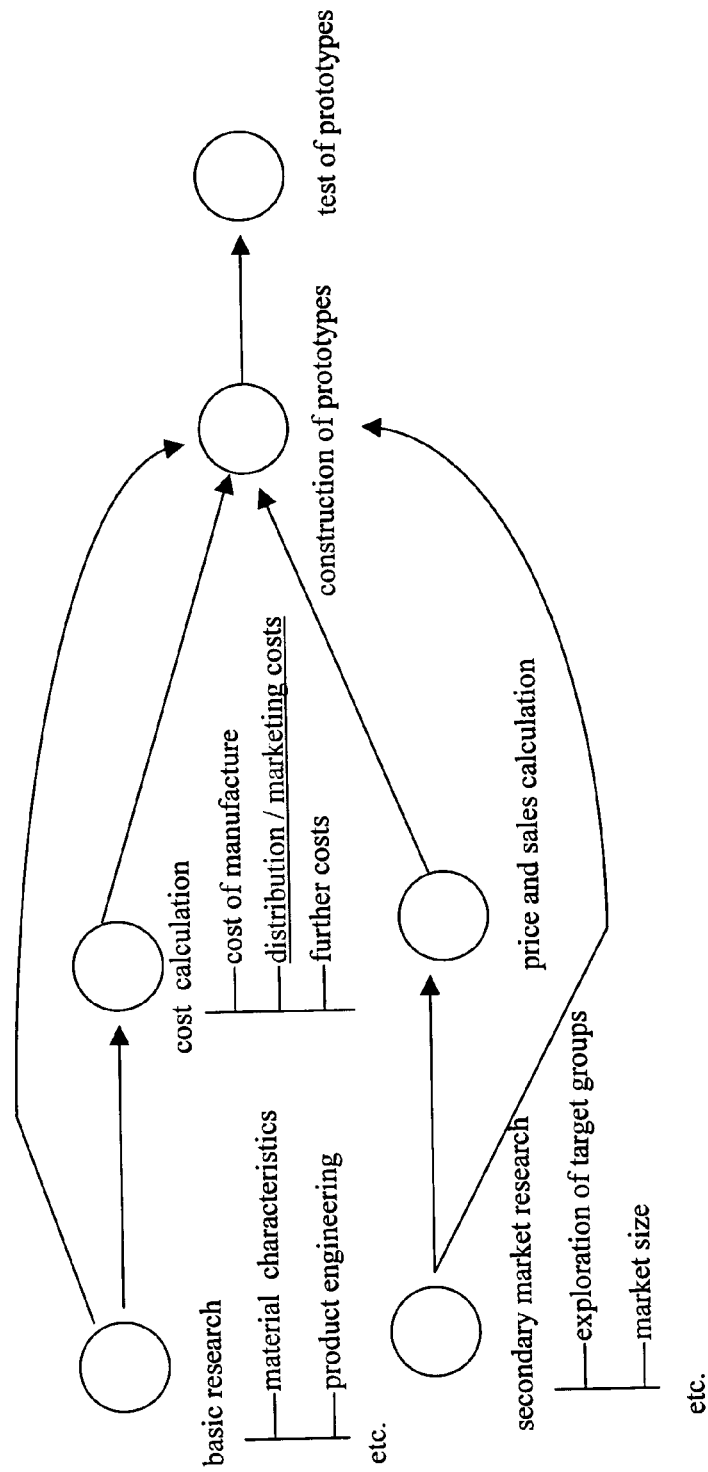
FIG. 32 example for a problem chain (product development consumer mass product) applied by the problem oriented search mode.
Figure 33:
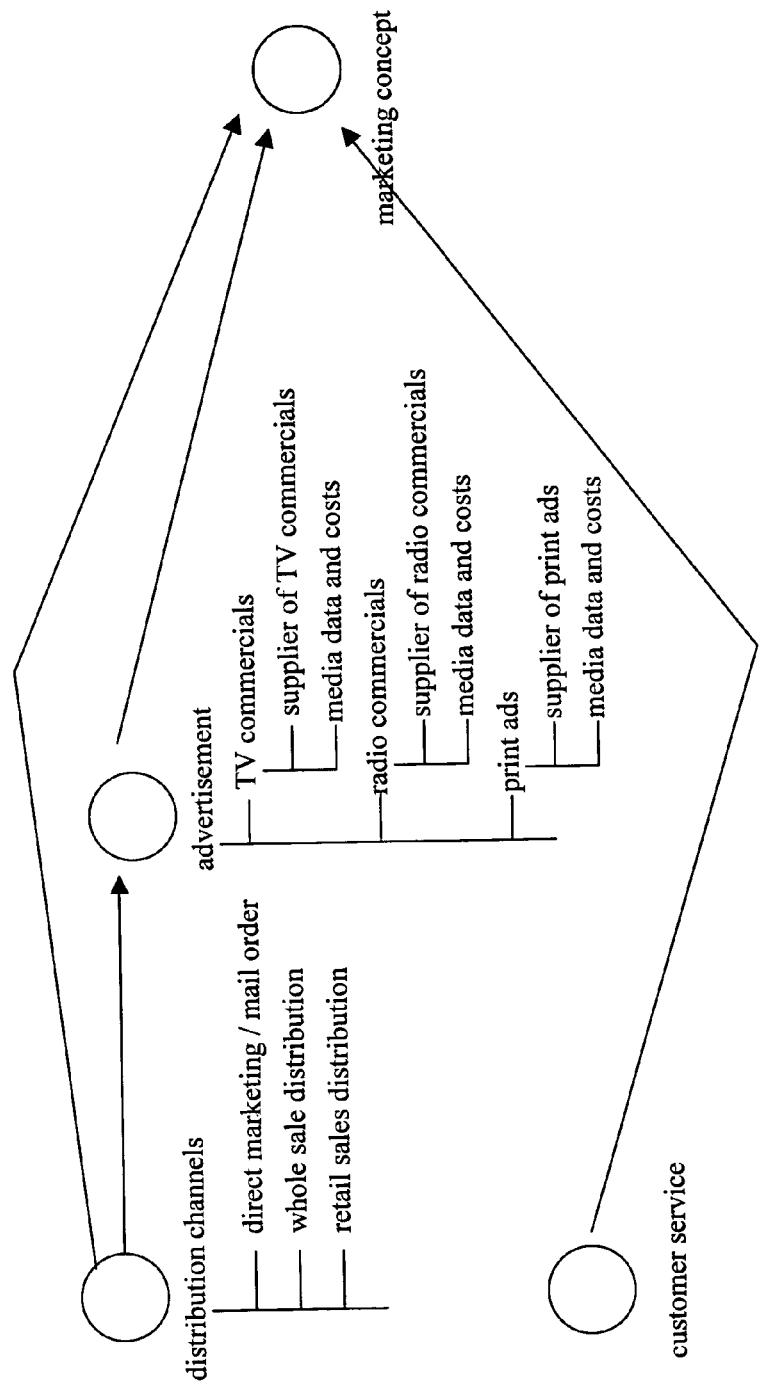
FIG. 33 an additional problem chain (marketing consumer mass product)

Problem chains can be connected by search terms used in the specialised search mode or directories from the overviewing search mode; an example can be seen in FIGS. 32 and 33.

The problem oriented search mode intends to give a systematic overview of a certain subject to a user and guide him to notice certain aspects in a certain order. Hence, he receives a kind of checklist or project plan, which prevents him from failing or omitting important topics.

Problem chains are offered for complex subjects whenever getting a systematic overview of the subject is crucial before getting into details.

In the following procedure of the specialised search mode according to the invention is described.

The main characteristics are the architecture of the method according to the invention (data base design, retrieval procedures) and the interaction with the document management system.

In the following "document", "document profile" and "result" are used as synonyms.

The basic idea of the method according to the invention is the "aperture procedure" that means the successive revealing of growing parts of a complete text (the over-all text of a document) by means of text extracts of the over-all text (=search term) during the search process. The smallest part to be revealed is a search word, the most considerable a search sentence The background of the invention is that the user is enabled to change the search strategy and the direction of a search process while it is running. He can successively refine the search and influence the results earlier than through other methods. He is supported by easy readable hints (search terms instead of whole documents).

As the retrieval structure is related to the document, it is possible to copy parts of the structure to a client system handling only subsets of all documents and search terms available on the server, still fulfilling the complete function.

There are intersections of the invention with classification systems on the one hand and with search engines with automatic indexing and keyword systems on the other hand.

Figure 34:
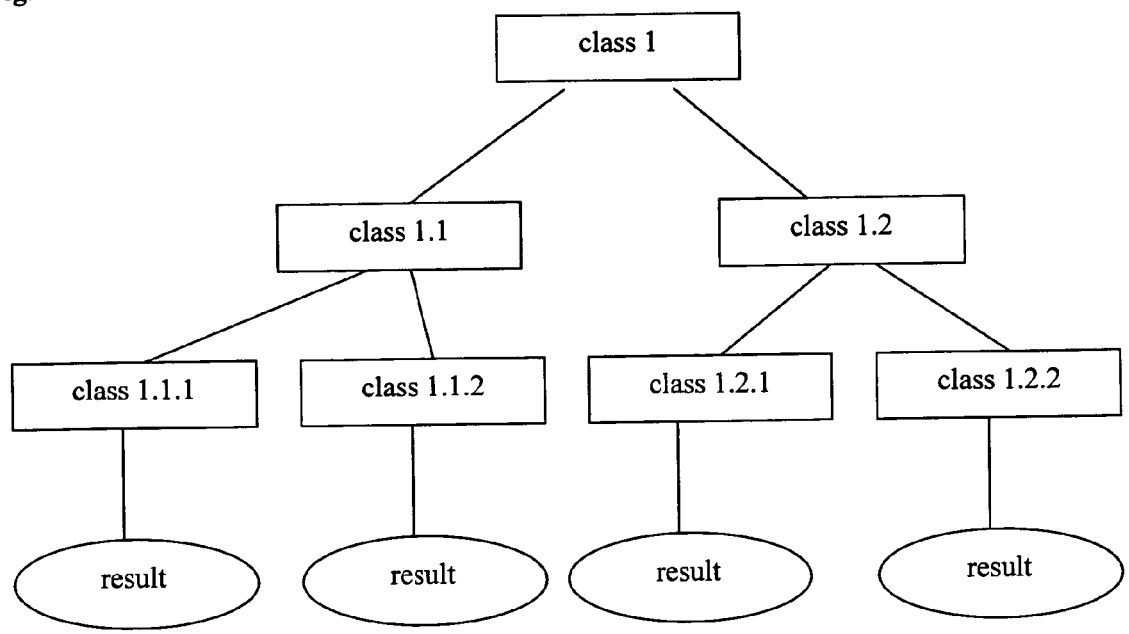
FIG. 34 "state-of-the-art" classification system.

The classes of a classification system correspond to the search term of the invention, which are connected by detailing relations and the thesaurus relations subordinating relations and superordinating relations. FIG. 34 illustrates a classification system according to the state of the art.

Figure 35:
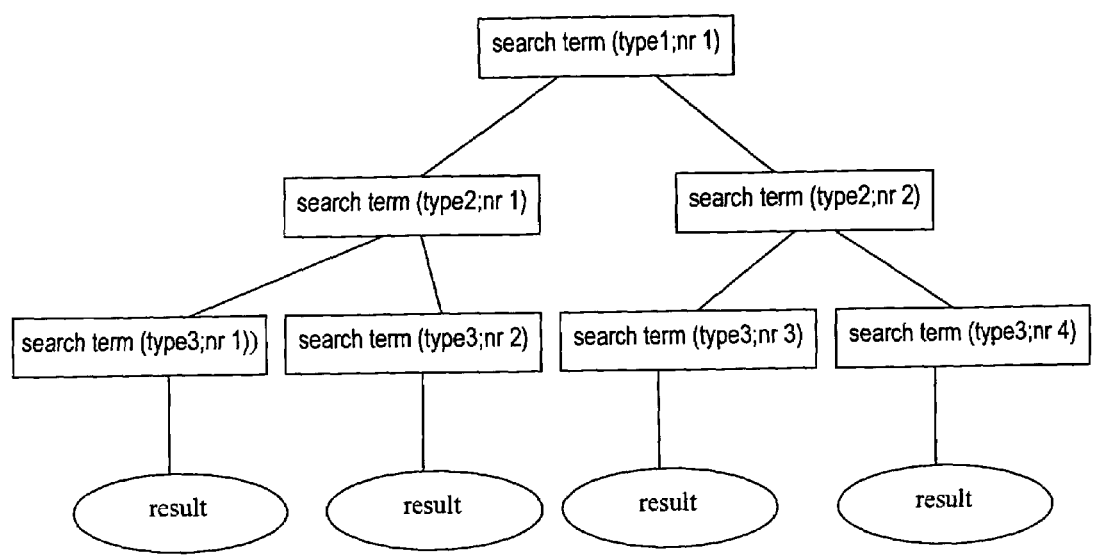
FIG. 35 search terms applied by the specialised search mode compared to a classification system, sketched analogous to FIG. 34.

FIG. 35 depicts the invention's section model illustrating the similarity of classification systems and the invention.

Both can be considered to have a hierarchical search structure. The user moves along a path form one hierarchical level to the other; the levels are connected. The paths function as a guide so the user does not need to formulate query strings. Going down the hierarchical search structure the user can narrow the range of subjects and amount of results.

The differences between the invention and classification systems are:

Classes as representatives of the documents during the search are named abstract from the documents. According to the invention, the search terms as representatives of the documents during the search are derived from the document or from themselves by extracting them from the document. The have linguistic-substantial subset relations (detailing relation) to each other and to document profiles.

The search terms of the invention are generated automatic/semi-automatic by the document management system, whereas the classes of the classification system are formed "intellectually" by an administrator. Similarities can also be found with the information zooming of the topic/topographic system, in which the user sees projections of the search results ("text condensates or -surrogates") being rather abstract from the documents. The advantage of the extraction of search terms according to the invention compared to the text condensation of topic/topographic is the following: It can be automated but nevertheless is a precise method to index documents (corresponding to the process of forming classes and assigning documents to it in case of classification systems). Classification systems make mistakes if using automatic indexing, which can be improved by increasing the fault tolerance by decreasing the amount of classes or by manual corrections. The extraction according to the invention does not need manual corrections (in case a stock of reference search term is available). Moreover, the search terms present a very precise classification.

The classification of a classification system exists independently of the search results. Setting up classes and assigning documents to them are two separate steps. Classes are abstract from the search results. That means that connections between classes and search results as well as between classes themselves are static, fixed and independent of the relevance of individual search results determined by constraints. That means a class is presented to the user regardless if relevant documents are assigned to the class.

In contrast, the creation of the search terms according to the invention is done simultaneously with assignment of documents to it. Search terms can only coexist with search terms and therefore they are related. They are only presented to the user if the method according to the invention retrieves results connected to them The displayed or relevant search terms are therefore always a function of the results connected to them Search term$_{displayed}$=$f$(result$_{connected}$).

Therefore, the relevance of the search terms depends on the relevance of the connected results. In turn these depend on constraints related to the subject (defined by combinations according to the invention) or constraints not related to the subject (defined by limitations according to the invention) defined by the user during the search process.

Therefore, the relevant search terms are a function of the constraints for the results:

result$_{connected}$=$f$(constraint for the result).

Therefore, the relevant or displayed search terms are a function of constraints:

Search term$_{displayed}$=$f$(constraint for the result).

Figure 36:
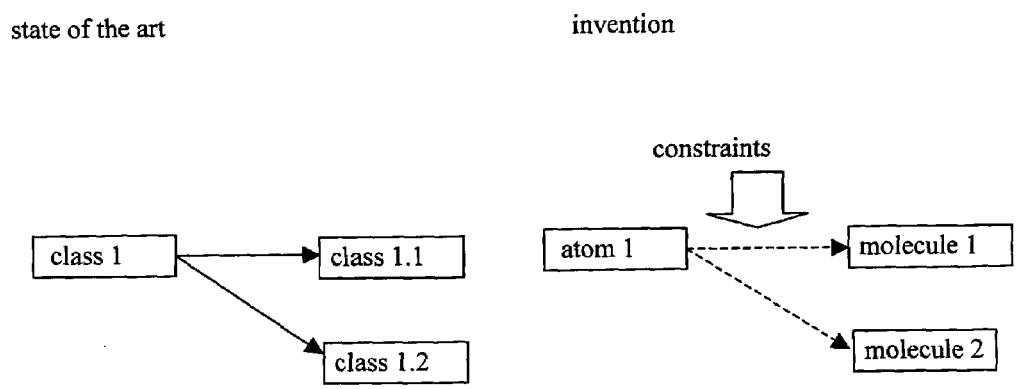
FIG. 36 influence of constraints on the search branching of specialised search mode (the invention) compared to a "state-of-the-art" classification system.

According to the constraints within the invention (in opposition to a classification system) a set of search results is selected from a database relevant for the search as well as relevant search terms connected to the results and the search terms are presented to the user. Connections of search terms are dynamically activated depending on the constraints during the search process. Hence they are not existing a priori like classes of a classification system. Transferred to a tree of a classification system that means: not all directories are revealed to the user, but only those which are relevant concerning the constraint as illustrated in FIG. 36.

Keyword systems and the invention are compared in the following, illustrated by FIGS. 37 and 38.

Figure 37:
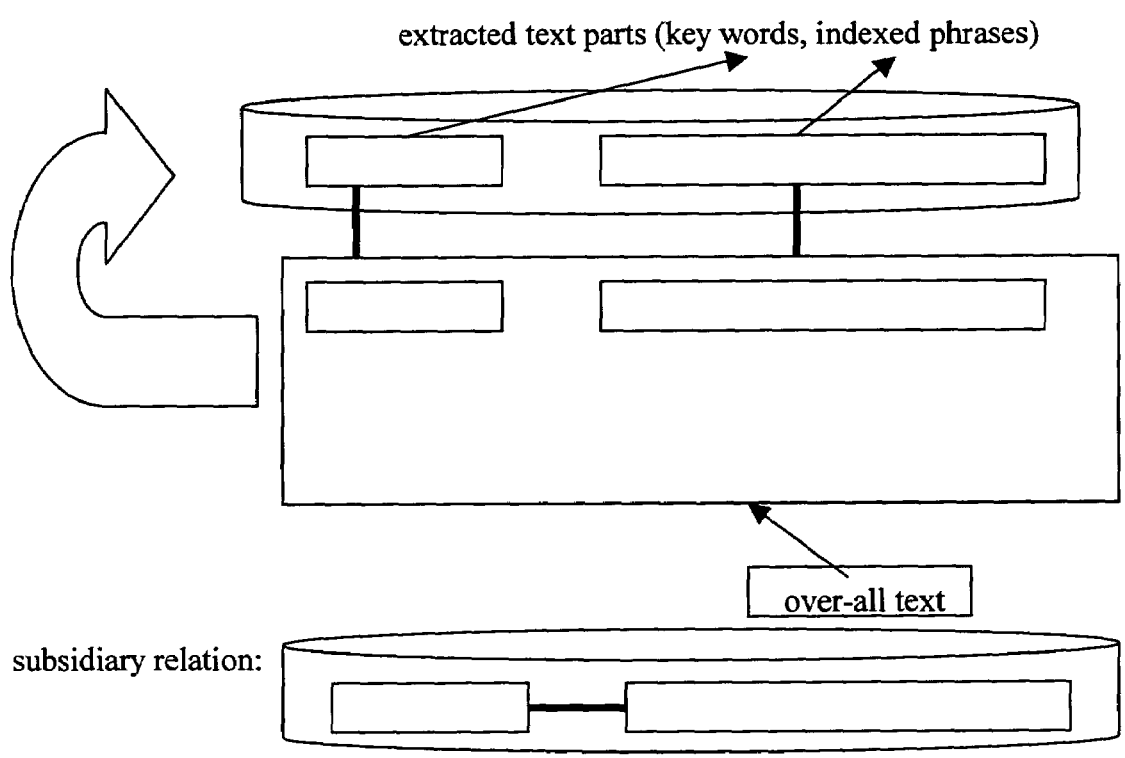
FIG. 37 "state-of-the-art" keyword system containing unrelated keywords.

The model of a state-of-the-art keyword system is depicted in FIG. 37.

Figure 38:
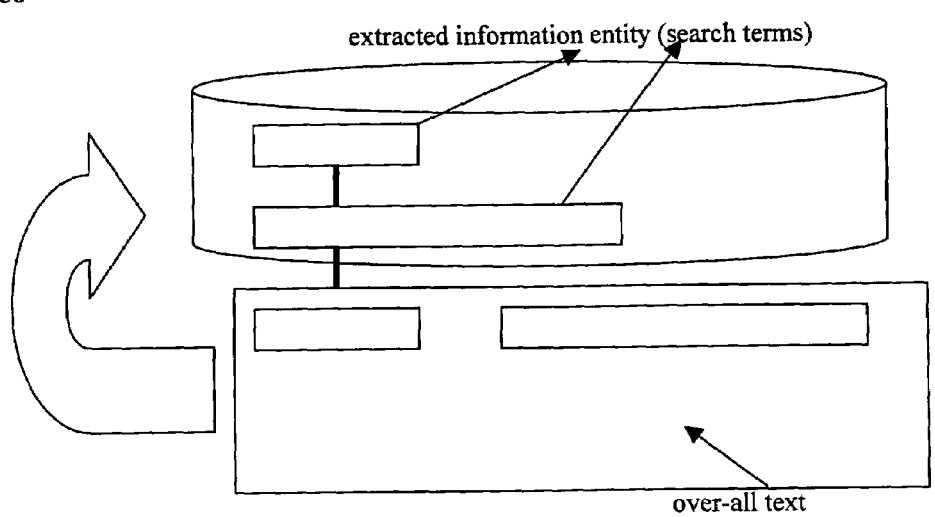
FIG. 38 invention compared to keyword system of FIG. 37 in a focused model.

A part model of the invention illustrating intersections with a keyword system is depicted in FIG. 38.

Both methods extract parts of the original text (see big arrow in FIG. 37), stored as objects in a data base and connected to search results (see vertical, thick lines in FIG. 37).

Both methods have in common that the text parts show extracts of the full text of different sizes (keywords and search words are short extracts, indexed noun phrases and search sentences are long extracts).

However differences of both methods are:

A keyword system usually comprises only relations between text extracts and documents, but not between text extracts themselves. Some systems use the above mentioned thesaurus relations, but these are only subsidiary and give hints to reformulate or extend a query (e.g. query extensions). They are not related to particular documents but exist independent of documents (see thick horizontal arrows in FIG. 37).

As a consequence the user gets the search result directly after formulation of a keyword. If he wishes to change the search strategy, he has to restart and formulate a new expression (with some systems employing relevance feedback the system itself reformulates the search expression on the basis of documents preferred by the user).

Figure 39:
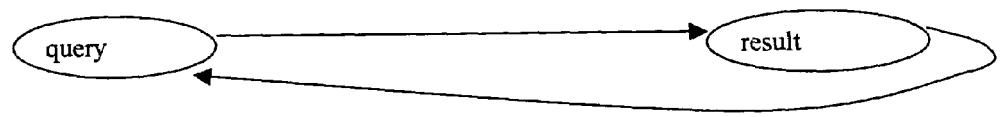
FIG. 39 search paths of a "state-of-the-art" keyword system.

The search procedure has a single beginning (formulated query) and a target (result list) without any intermediate stages, as illustrated in FIG. 39.

The user can be compared to a golf player who has just one stroke to place the ball into the hole. After the stroke, he has to search quite long where he has hit the ball (metaphoric for the long result lists he sometimes has to look through). If he missed the target, he has to go back where he started and start again. Whether he hits the next time is also a question of what he learned from the first stroke.

Figure 40:
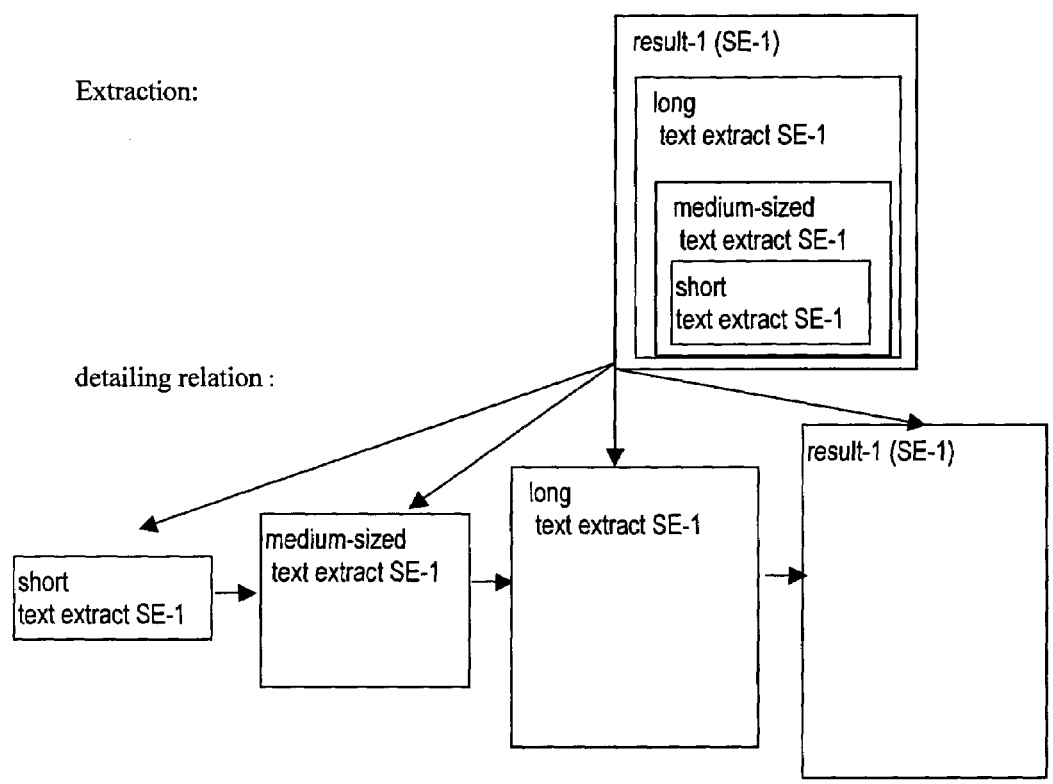
FIG. 40 available search paths of the invention.

According to the invention, nested text extracts of different length are taken from the original text and not only connected to the results, but also to each other. All text extracts (search terms) are stored in a data base in a manner that makes them retrievable as chains which link one text extract to another in which it is contained, as illustrated in FIG. 40.

Figure 41:
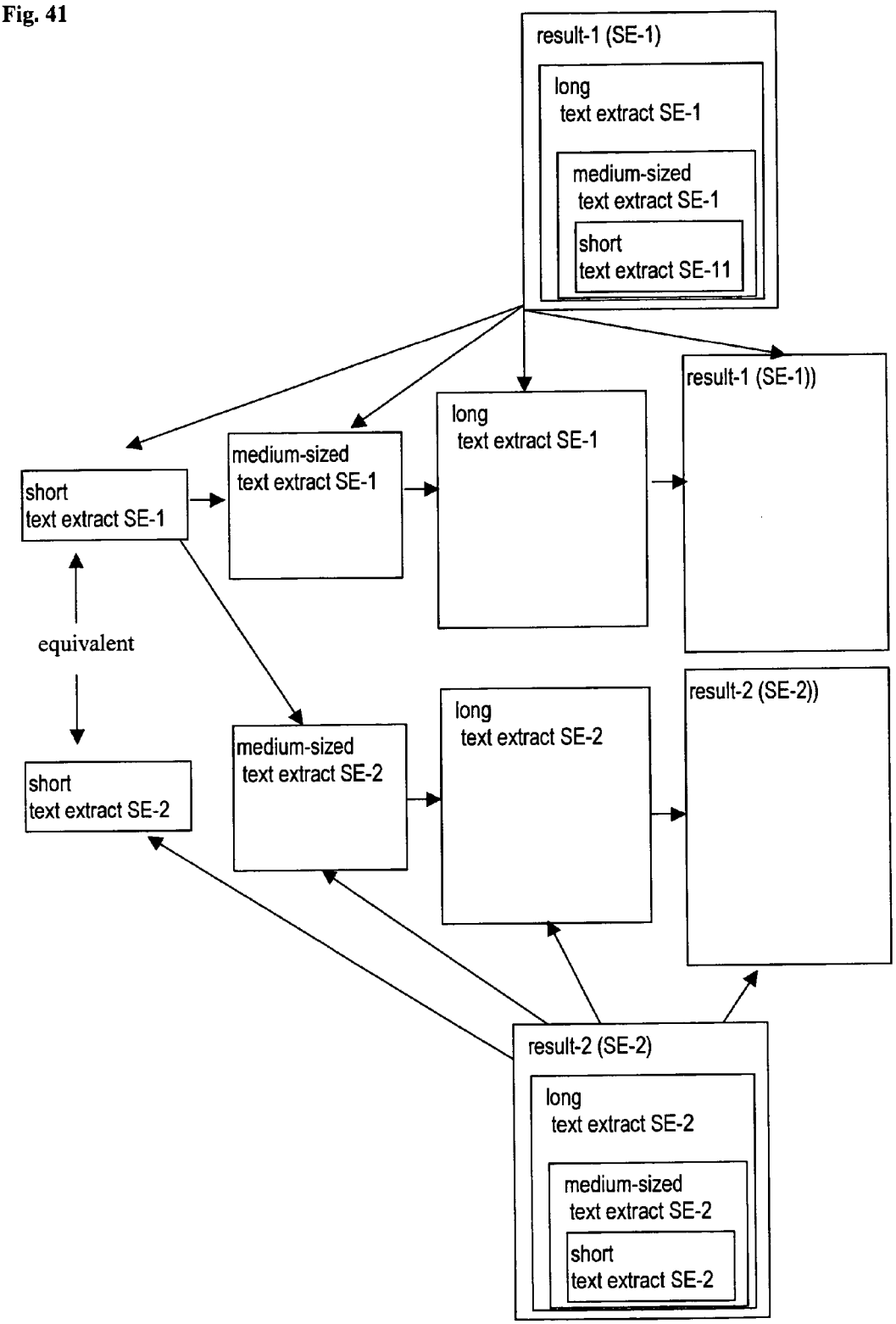
FIG. 41 available search paths of the invention of FIG. 40 as example.

Additionally relations to equivalent text extracts of other results and to the results themselves are generated and added to the chain (see FIG. 41). Search terms related to the same results display as lowest common denominator text extracts appearing in both results. Therefore, complexity and size of content representation of results is reduced.

By searching, the user moves along the chain from one text extract to the next until he reaches the search result which is connected to the last link (if he does not abort the search process before). During such a search process, the user is able to view longer and longer text extracts from the documents of the result list.

By using this method he can change the search strategy according to the knowledge he acquired from the intermediate results (intermediate of the chain).

Figure 42:
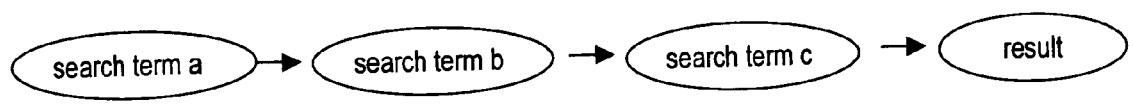
FIG. 42 search path of the invention.

His search path has a start (selected short text extract/search term a), a target (search result) and in between there are intermediate results (text extracts of different length/search terms b–c, which are connected to the search results as well as to the short search term first selected), as depicted in FIG. 42.

The situation of the user can now be compared to that of a golf player in reality. He has several strikes not being forced to hit by one strike. He can adjust the direction of the strikes (analogous: the search strategy) according to the intermediate results (position of the ball after the first strike respectively related search terms), by choosing certain search terms.

During the complete search process and at all actions lists of relevant search terms are presented to the user so that he never has to formulate a query. Unlike as in keyword systems where he has to do that.

Some systems make propositions by a thesaurus, but they are related to the whole vocabulary of a system, not to keywords being connected to relevant search results and to relevant intermediary steps/search terms. Hence, it can happen that a user chooses two entries of a thesaurus and combines them although there is no result containing both terms.

Figure 43:
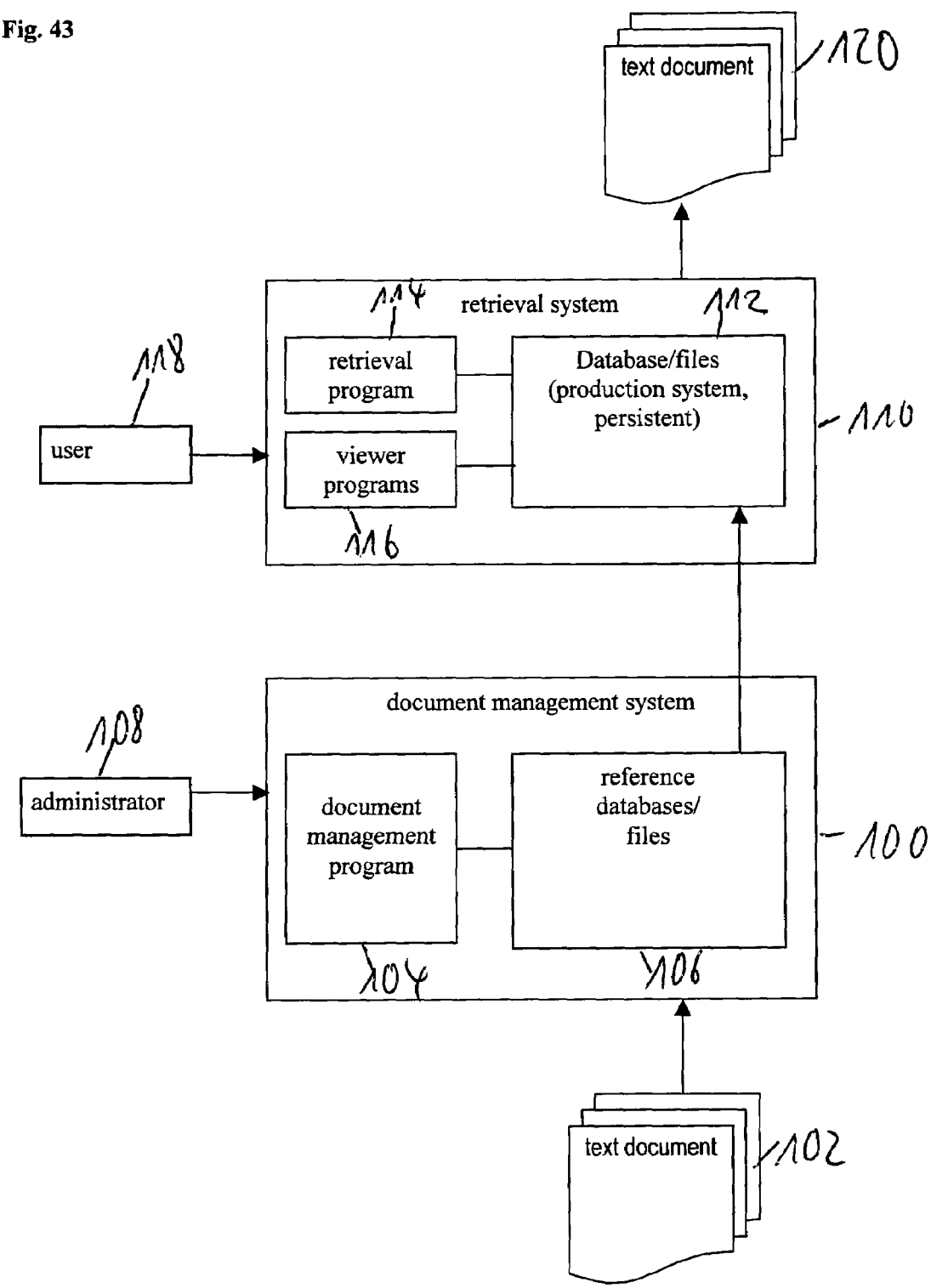
FIG. 43 system environment of an implementation of the invention.

After having explained the invention theoretically so far now, a practical example should be presented. FIG. 43 depicts a preferred system environment. The complete system consists of a document management system (100) and a retrieval system (110).

Within the document management system text documents (102) are processed by means of a document management program (104) and reference databases (106) automatically or semi-automatically under control of an administrator (108) and stored in databases in a form accessible by a retrieval program according to the invention and viewers (e.g. internet browsers). The retrieval system (110) renders references to text documents (120) requested by the user (118) according to his search actions.

The document management system (100) processes information from text documents concerning search objects and generates reference data bases (106) while a part of their content serves as a base of the persistent data storages of the invention (112).

The user (118) accesses the data storages (112) by means of a preferred program (114). Viewer programs (116, esp. HTML-Browser) support.

The invention can be run on a decentralized local stand-alone system as well as on a central client/server system and retrieve internal and external information.

Figure 44:
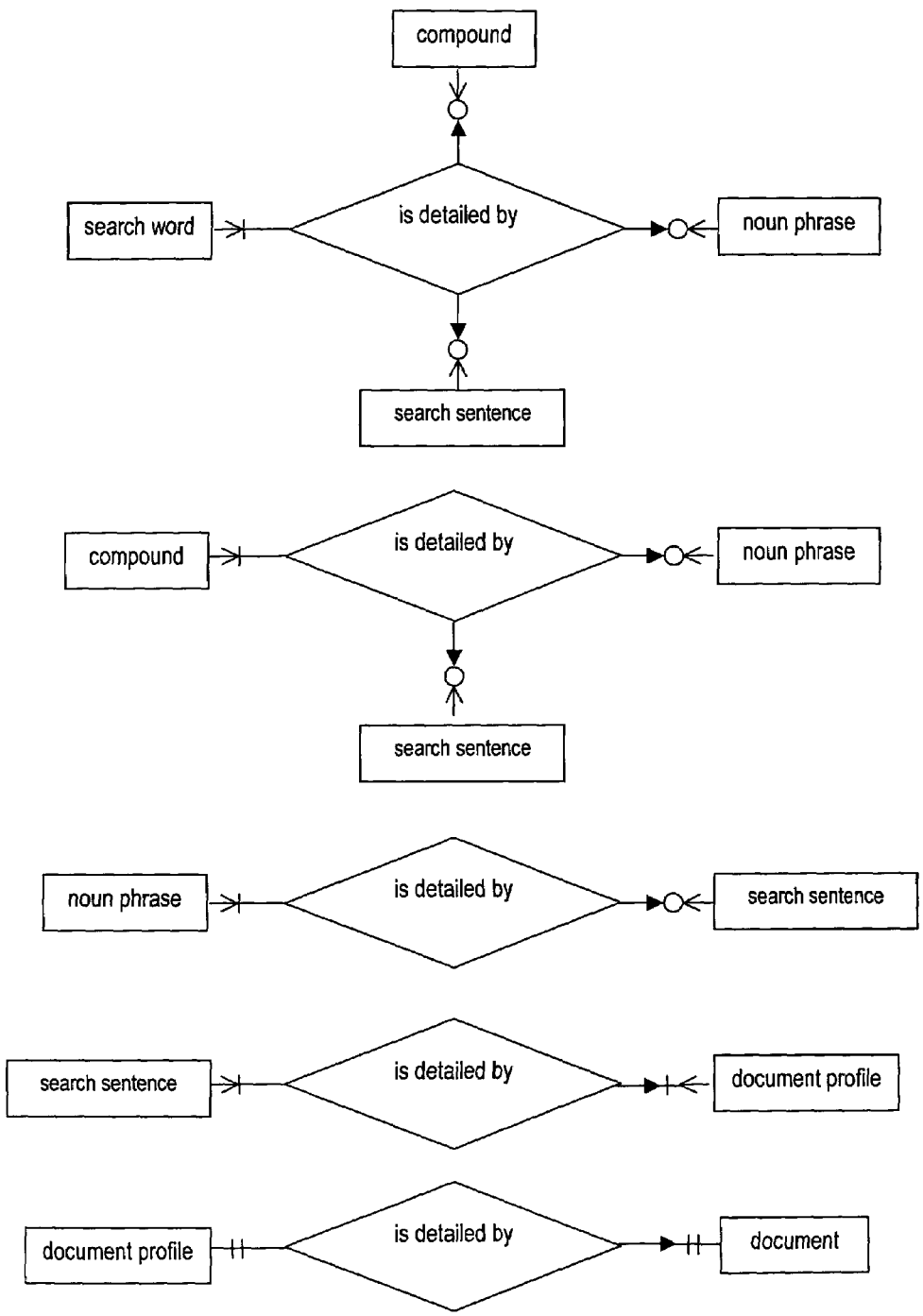
FIG. 44 model of the detailing relation.

In the following, the data model of the method for retrieval according to the invention is explained:

The data objects of the invention are:

1. Search terms (search objects)
   a. search words
   b. compounds
   c. noun phrases
   d. search sentences 2. document profiles 3. documents The objects have various relations:

1. detailing relations 2. thesaurus relations
   a. subordinating relations
   b. superordinating relations
   c. associating relations 3. combining relations FIG. 44 depicts a corresponding entity relationship model for the detailing relations according to the invention.

The relation comprises two basic rules:

There can only be a single search path between two search terms.

It should comprise as many search terms as possible and thus be as long as possible.

Figure 45:
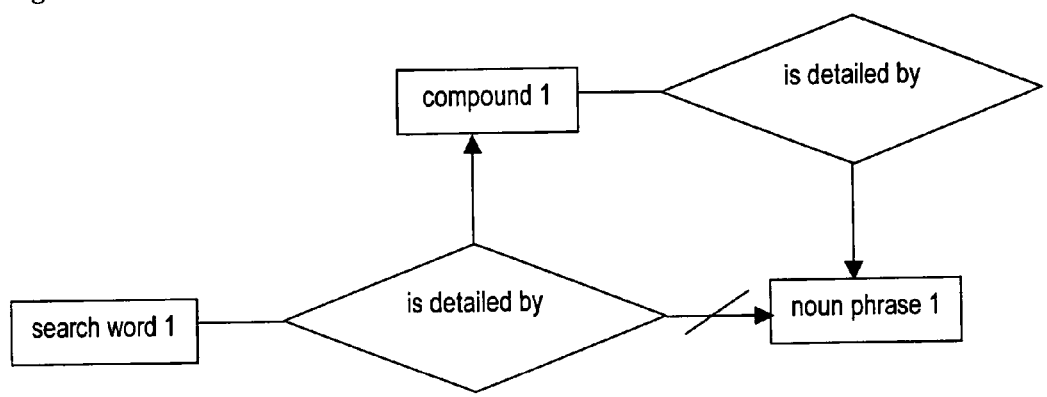
FIG. 45 an example for improper assignment of search paths.
Figure 46:
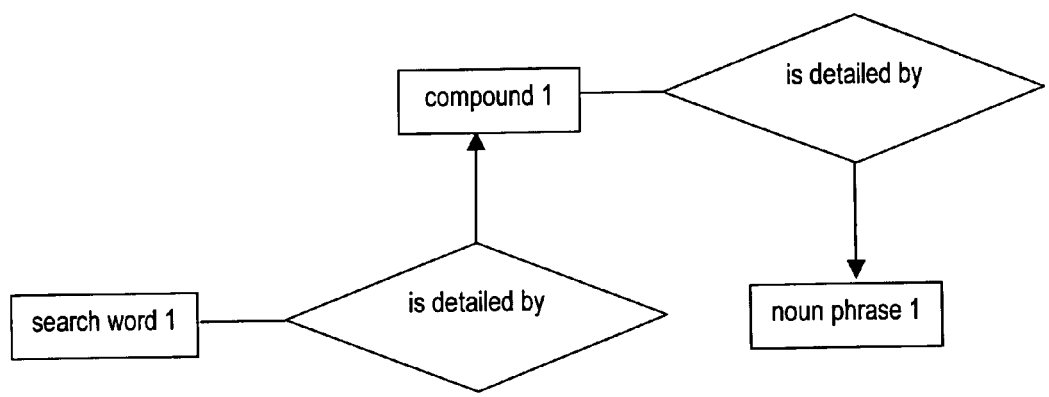
FIG. 46 proper assignment of search paths in opposition to FIG. 45.

FIG. 45 gives an example:

A search word must not be connected to a noun phrase directly and in addition indirectly via a compound entailing two parallel relation paths between search word and noun phrase. The shorter relation is dropped, so that there is only one detailing relation between search word and noun phrase left, as depicted in FIG. 46.

Figure 48:
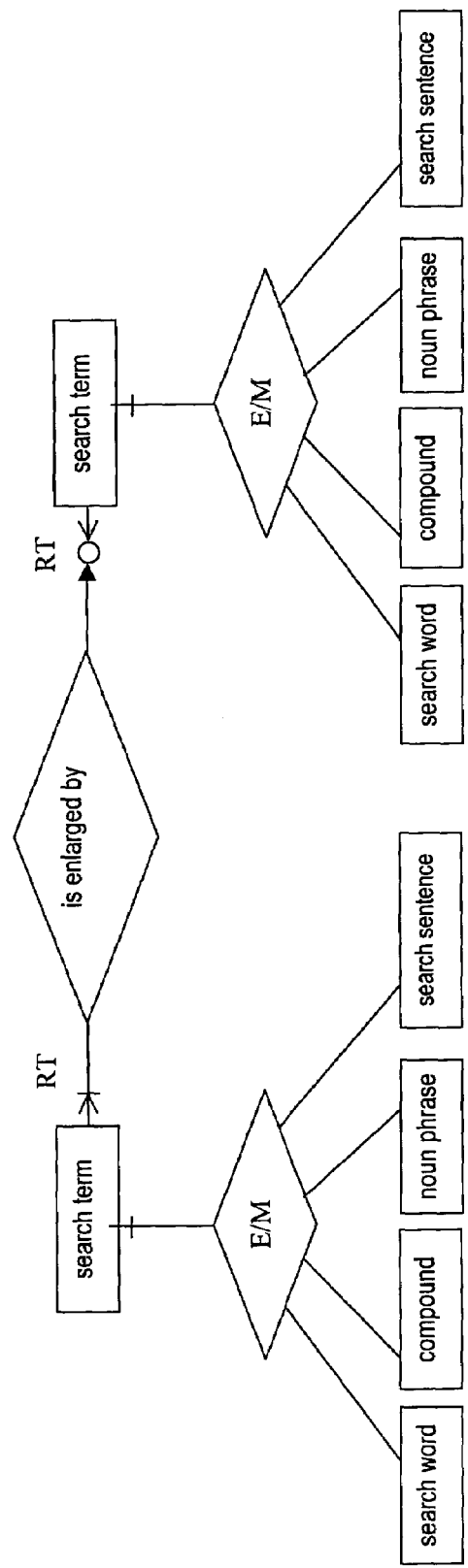
FIG. 48 model of the associating relation.

FIG. 47 depicts a corresponding entity relationship model for the subordinating relation according to the invention, and FIG. 48 a corresponding entity relationship model for the associating relation according to the invention.

Figure 49:
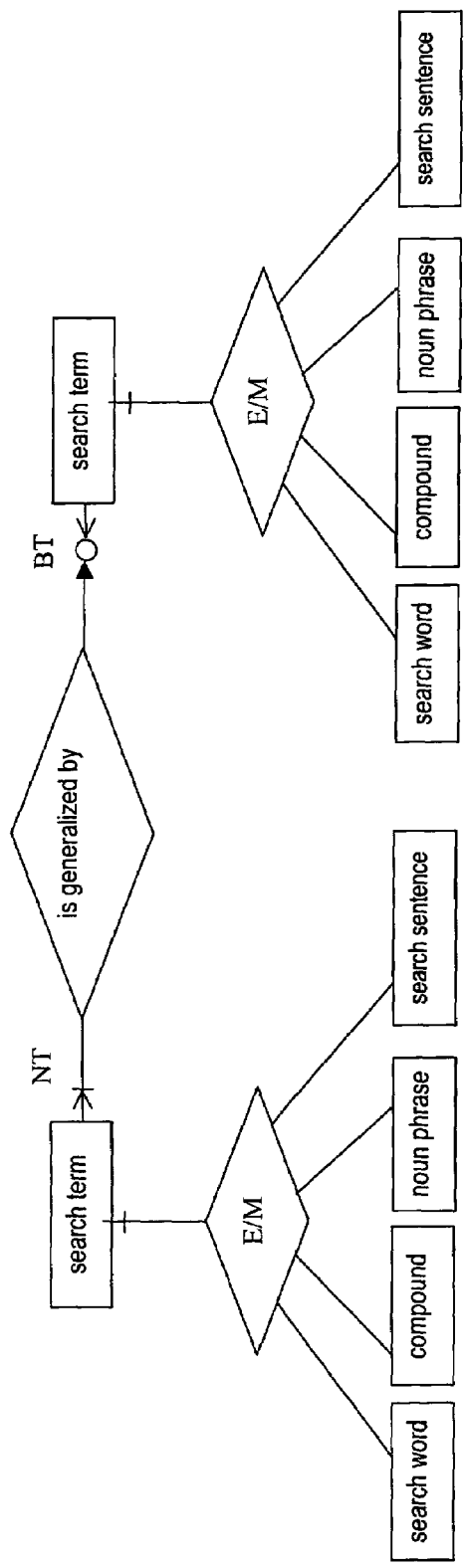
FIG. 49 model of the superordinating relation.
Figure 50:
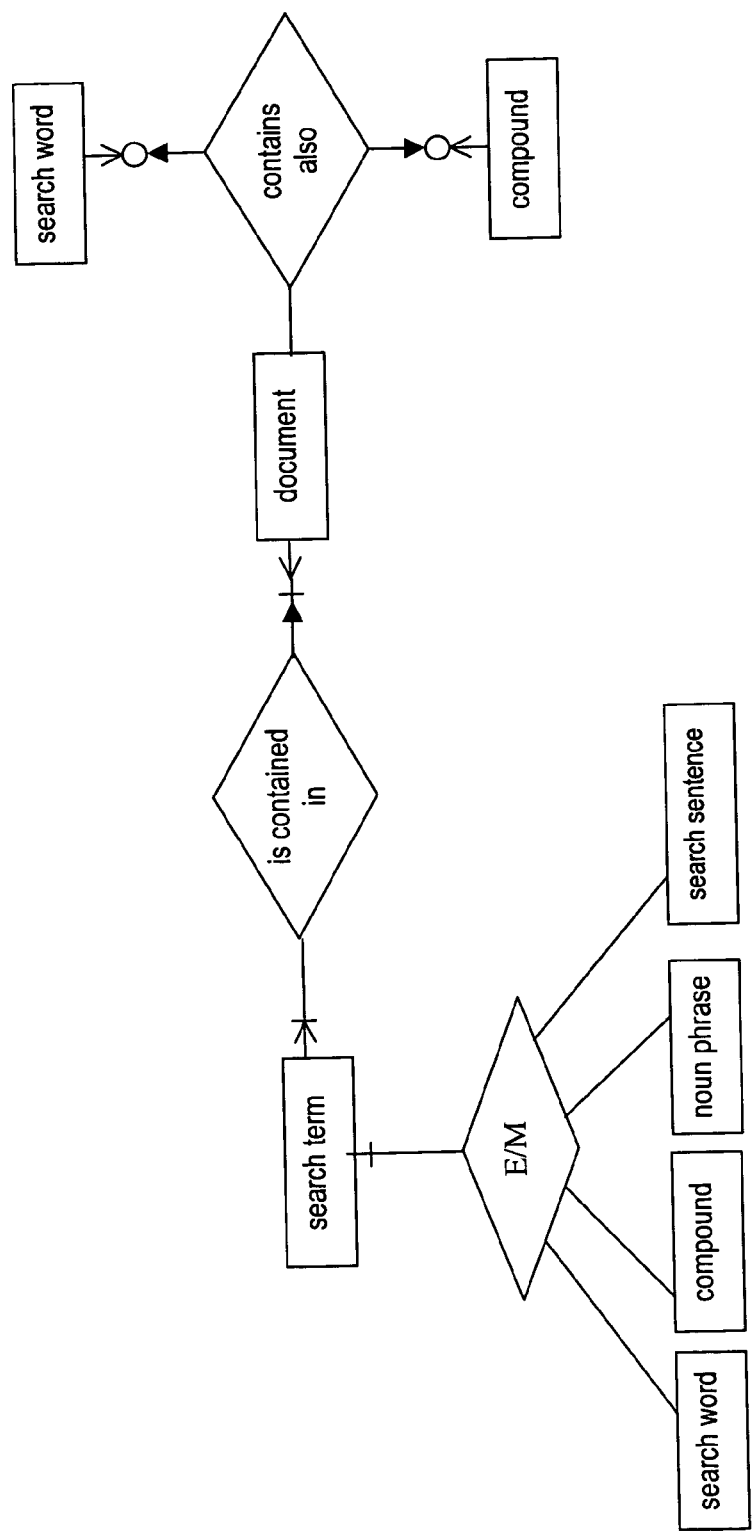
FIG. 50 model of the combining relation.
Figure 51:
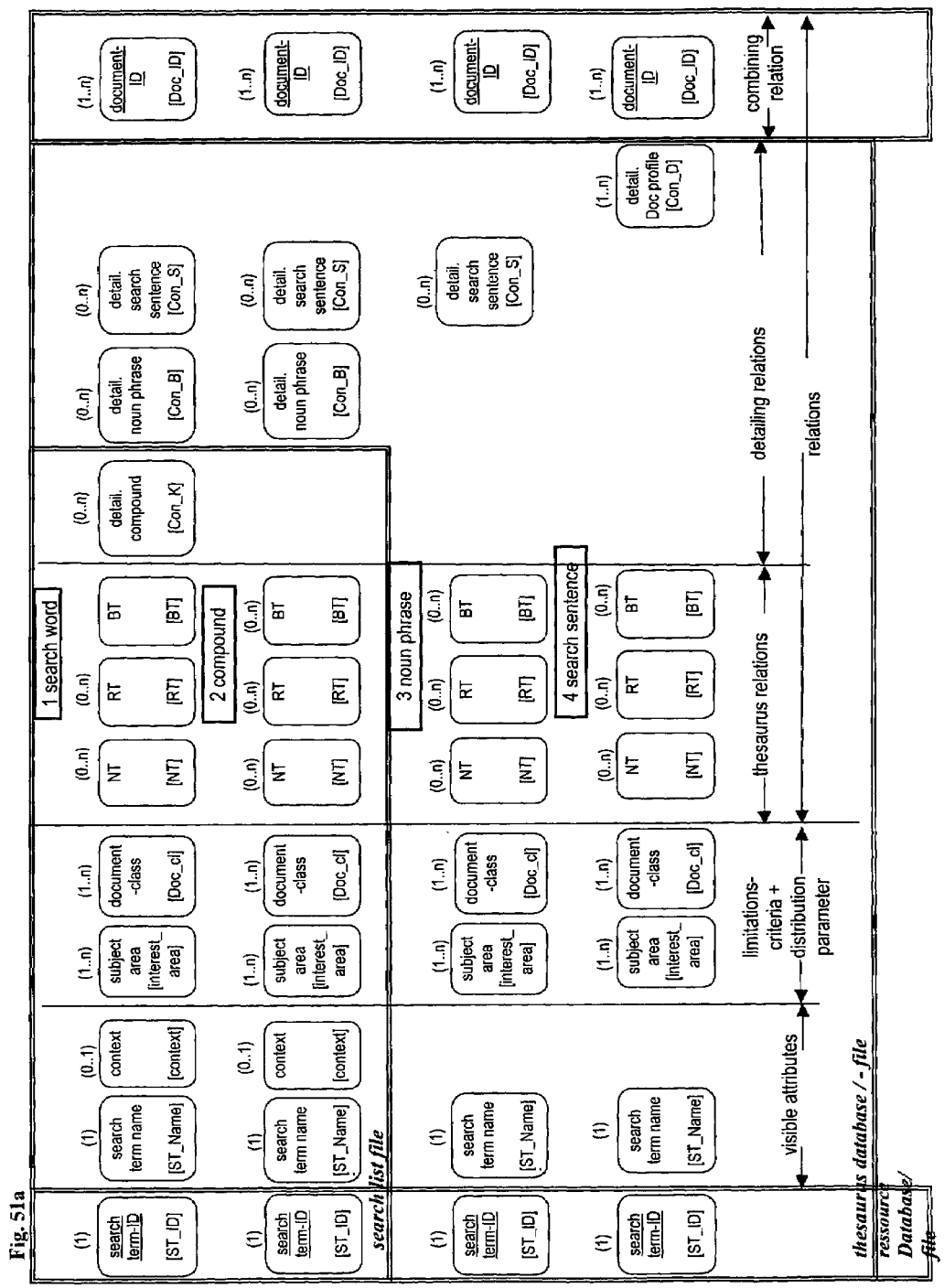
FIGS. 51a and b model of data objects according to the invention.

FIG. 49 depicts a corresponding entity relationship model for the superordinating relation according to the invention and FIG. 50 a corresponding entity relationship model for the combining relation according to the invention. FIG. 51b is the extension of FIG. 51a. Both depict an attribute model of the data model according to the invention.

Figure 52:
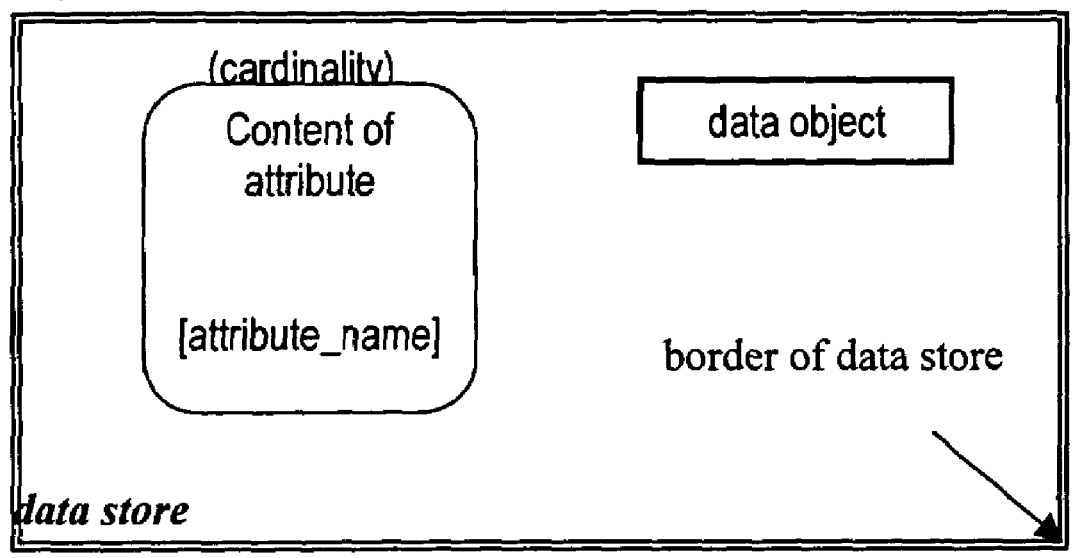
FIG. 52 legend of FIGS. 51a and 51b.

FIG. 52 depicts a legend for FIGS. 51a and 51b. It should be noticed that each attribute is at the same time a primary key.

FIG. 53 depicts a directory of preferred attributes.

In the following search, objects are connected in the data base according to the pattern (ST=search term):

ST1+relation (ST1–ST2)→ST2, which means that data on the relation (ST1–ST2) is stored in the record of ST1, which is the starting point for a retrieval of ST 2, which is related to ST 1 by any relation according to the invention.

As an alternative the implementation ST 1→ST2+relation (ST1–ST2) is feasible as well entailing that the data on the relation is stored in the record of ST 2, which is the target of a retrieval of ST 2, which is related to ST 1 by any relation according to the invention.

The preferred system employs several data storages (double marked areas in FIG. 51a and 51b). All data is stored in persistent stores implemented as databases or as structured text files.

(Annotation: in the following a datastorage is defined to be persistent it is is not defined to be temporary).

Bigger systems with multi-user access to central data storages functioning as servers in a network typically employ databases, smaller decentralized systems working as clients usually employ files.

In data bases [interest_area] and [Doc_cl] function either as attribute or a distribution parameter to address the right data storage.

The retrieval program can either address external data storages in case external data are retrieved or internal data storages in case archived, internal data are retrieved. The retrieval program addresses the right data storage by a user-defined storage parameter [search status].

In the following, the structure of a search list file according to the invention is illustrated by FIG. 54. The search list file contains the objects search words and compounds including synonyms in alphabetical order. FIG. 54 is a depiction in form of a table.

The legend for FIGS. 54 to 59 is:

underlined: attributes function as primary key in data storages.

(brackets): attributes being sort keys or distribution parameter of data storages.

The search list according to FIG. 54 contains data which are not much changed by the time. For each bigger subject area there is a search list file containing all search words and compounds of the subject area. It is stored on the client. The external search list file (for external not archival information) is updated at the beginning of every search process, the internal search list file is updated at the beginning of every archiving process.

The search list file contains all data to select the search objects search words and compounds on a local system.

The search list file functions as thesaurus store during the preselection and can be looked up to avoid formulation of search terms. Synonyms have the same ST_ID (id of search term and primary key) and can be used as surrogates.

A search list file will be updated before starting retrieval.

A preferred search list file comprises following characteristics:

| | |
|---|---|
| Sort records: | by ST_Name |
| distribution of data on datastores: | by interest_area (oblig.) |
| format: | structured file |
| amount: | 1 per subject area (interest_area) |
| user interface for retrieval: | search view |
| transfer of data to client system: | before search process (preselection) |

FIG. 55 illustrates the structure of a thesaurus database/file according to the invention. It contains all search terms without synonyms as objects.

The thesaurus database supports the main selection.

The only parts of thesaurus database/-file enabling local retrieval of internal (archived) information are stored on the client. It contrasts the search list file, which contains as well search terms connected to documents not stored in the local system.

In contrast to the search list file records of the local of thesaurus database/-file are not updated before the search process starts and only if they are used after download and archiving of a document.

A preferred thesaurus database comprises the following characteristics:

| | |
|---|---|
| Sort records: | by ST_Name |
| distribution of data on datastores: | by interest_area (oblig.) |
| format: | database / structured file |
| amount: | 1 per subject area (interest_area) |
| user interface for retrieval: | search view |
| transfer of data to client system: | at archiving |

FIG. 56 illustrates the structure of a resource database/-file according to the invention. It contains the identifiers (ids) of all search terms and document profiles related to a document.

The resource database/-file is a distributing center for all databases/files and generates a connection between document and document profiles.

It has two functions:

On the one hand, it is used for the action "combine" to select search terms contained in the same document profiles. On the other hand, it supplies the server information about search terms, which have to be transferred to a client after a download for archiving the document, so that the search process can be repeated there.

The resource database contains the document class [Doc_cl] of a document as distribution parameter. For the transfer of records to the client the same rules apply as for the thesaurus database.

A preferred resource database comprises following characteristics:

| | |
|---|---|
| Sort records: | by Doc_cl, doc_id |
| distribution of data on datastores: | by search status (oblig.), Doc_cl (fac.) |
| format: | database / structured file |

| | |
|---|---|
| amount: | 1 |
| user interface for retrieval: | — |
| transfer of data to client system: | at archiving |

FIGS. 57 and 58 illustrate the structure of a index database/-file according to the invention. It contains the document profiles. FIG. 57 depicts the document profile of an expert article in form of a table.

Document profiles are displayed on a viewer, displaying either one or more document profiles within a window (e.g. an internet browser for HTML documents or any text editor for text documents, see example in FIG. 58).

A preferred index database/-file comprises following characteristics:

| | |
|---|---|
| Sort records: | by Doc_cl, doc_id |
| distribution of data on datastores: | by search status (oblig.), Doc_cl (fac.) |
| format: | database / structured file |
| amount: | 1 |
| user interface for retrieval: | viewer according to the format (e.g. browser) |
| transfer of data to client system: | at archiving |

Figure 59:
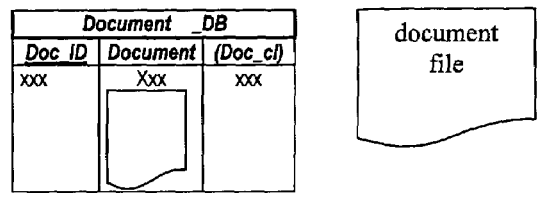
FIG. 59 example for structure of a document database/-file according to the invention.

The document itself is directly downloaded as file from a server or selected from a database. FIG. 59 depicts a document database or file.

A preferred document database comprises following characteristics:

| | |
|---|---|
| Sort records: | by Doc_cl, doc_id |
| distribution of data on datastores: | by search status (oblig.), Doc_cl (fac.) |
| format: | database / structured file |
| amount: | 1 |
| user interface for retrieval: | viewer according to the format (e.g. browser) |
| transfer of data to client system: | at archiving |

Figure 60:
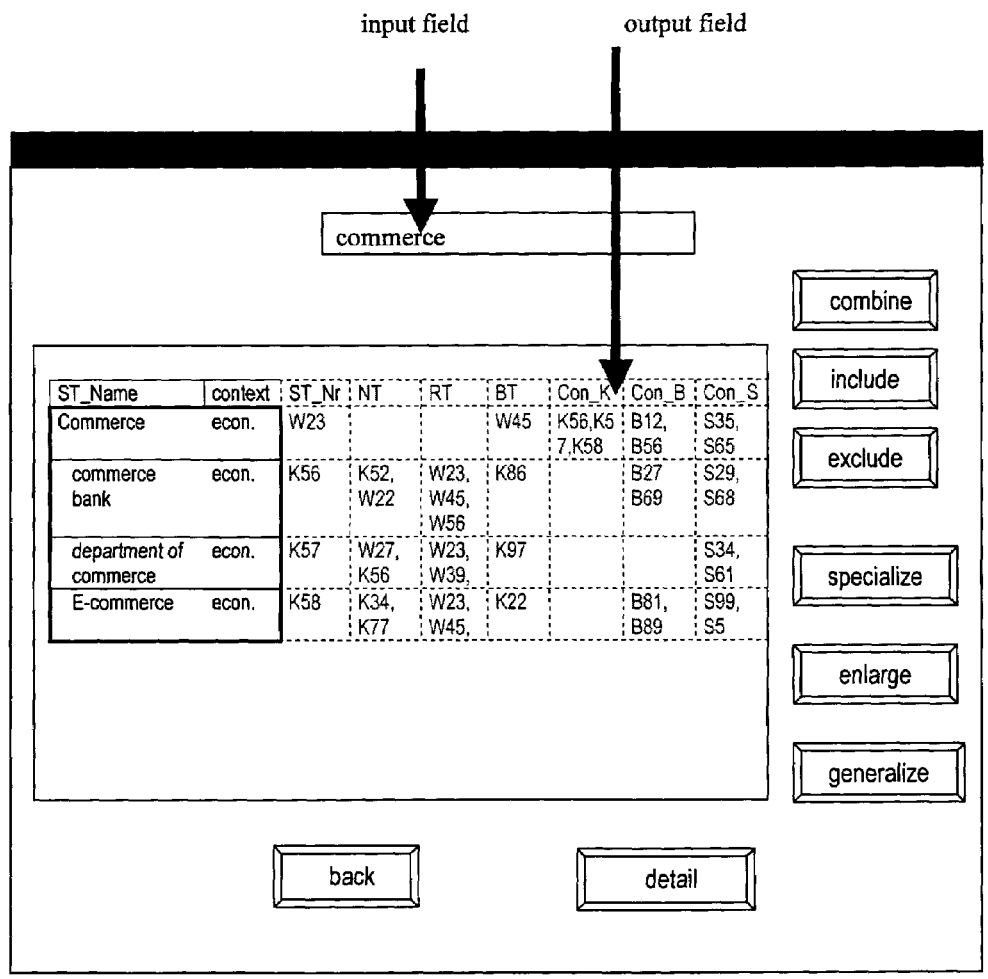
FIG. 60 example for user interface according to the invention.

In the following, the user interfaces and the temporary data memories are illustrated by FIG. 60.

The retrieval program keeps parts of search objects (rendered attribute sets, selection attributes) in temporary data memories as so-called "views". A view comprises a user interface, temporary data memories and appropriate interfaces.

The user interface depicted in FIG. 60 is used for the preselection and the main selection and comprises an input field, an output field and several buttons to activate various search actions.

The results of each action (=rendered attribute sets, see below) are selected from the addressed persistent data storage and loaded through interfaces to the temporary data memory of a view in the same order as they were selected.

The visible attribute sets—parts which are relevant for the user (framed parts in FIG. 60) are displayed.

Now the user can mark some of the displayed search terms and thus involve them into the next search action. Alternatively, he can also delete some and mark the rest.

The selection attributes which are relevant for the action and were stored temporarily in the search view, are transferred to the persistent data storage for the selection required by the next search action defining selection qualifiers.

The user can control the position of the part of the search list, which is visible in the output field by the input field (listbrowsing). The position is set by the system so that items beginning with the input string are visible.

The search status and the subject area (see FIG. 61 "searched information") are defined in the limitation view at the preselection.

In case external information is required ("new information") the system updates the local search list file of the chosen subject area.

At any time of the search process a change of the parameters "search status" ("searched information" see FIG. 61) and "subject area"—which must be defined by the user—sets off a new search process starting again with the preselection.

As soon as search status and interest_area are defined by the user the menus "limitations" in FIG. 61 are displayed and can be activated by the user.

Items below these obligatory selection fields define the document class (Doc_cl) and define the constraints not related to the subject.

They can be defined during the whole search process.

Figure 62:
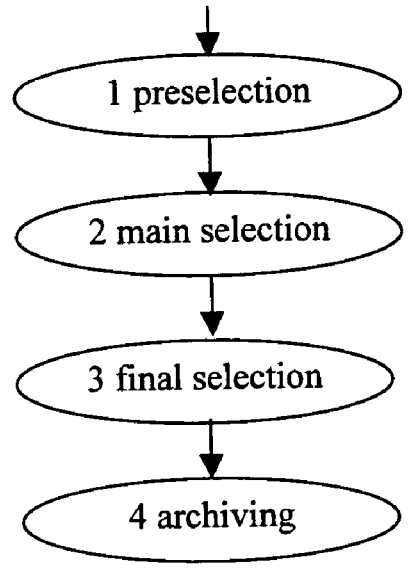
FIG. 62 function model sketching main steps of the entire search process for external information according to the invention.

In the following, the function of the method according to the invention is illustrated on the basis of a functional model. FIG. 62 depicts an overview of the processes of the search for external information.

The following rules are valid for steps 1 to 4 of FIG. 62 (preselection, main selection, final selection and archiving):

1. preselection

→ initial status:
retrieval program started, limitation view opened
Definition of relevant search list by search status and subject area in the limitation view
display of relevant search words and compounds in the output field of the search view ← final status:

list of relevant search words and compounds in the output field of the search view 2. main selection → initial status:
list of relevant search words and compounds in the output field of the search view
successive selection of search terms and relevant document profiles through several search actions ← final status:

selected document profiles displayed in a document profile viewer 3 final selection → initial status:
selected document profiles displayed in a document profile viewer
selection of document profiles and document displayed in a document viewer ← final status:
document loaded 4. Archiving → initial status:
document loaded, search for external information
transfer of all used search terms to the client system
in case of a client/server-system the retrieval program stores the external (server side) search objects and documents in the preceding steps only temporarily, these are transferred and stored to the client at archiving using a client-dependent format.

→ final status:
  transfer finished

Figure 63:
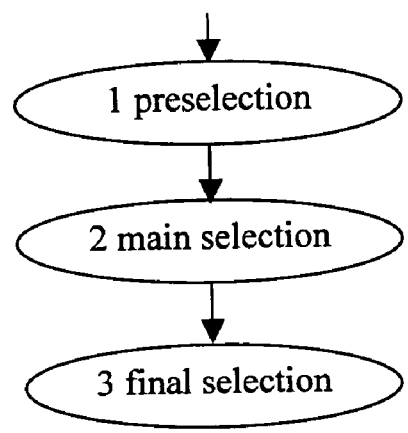
FIG. 63 function model sketching main steps of the entire search process for internal information according to the invention.

FIG. 63 depicts an overview of the processes of the search for internal information.

If internal information is searched, the process of archiving is not performed, as all objects are already stored on the client system.

Figure 64:
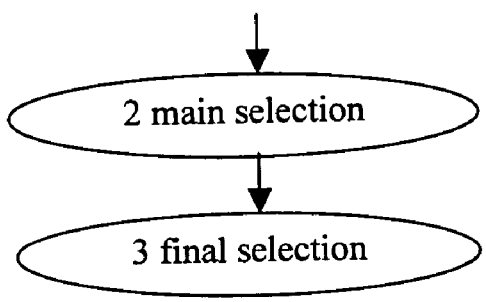
FIG. 64 function model of the main steps of a server based search process according to the state of the art.

FIG. 64 depicts a functional model giving an overview of the processes of a server-search.

The "server-search" is a procedure according to the state of the art not employing the program according to the invention. In this procedure, the client computer accesses directly the server interfaces. The communication of the server databases is executed by a server interface generating the user interface on the client at a session. For the sake of performance, the preselection is not employed.

The procedure starts with the action "limitate" of the main selection. Then the user has to input a string in the input field being a required value for the selection qualifier [ST_Name] for a selection in the thesaurus database/-file. If a record is selected, it is transferred to the search view, if not an error message is displayed.

In the following the procedures of the retrieval according to the invention is illustrated by data flow diagrams (process specification) in FIGS. 65 to 68. The legend of FIGS. 65 to 68 is depicted in FIG. 69.

Figure 65:
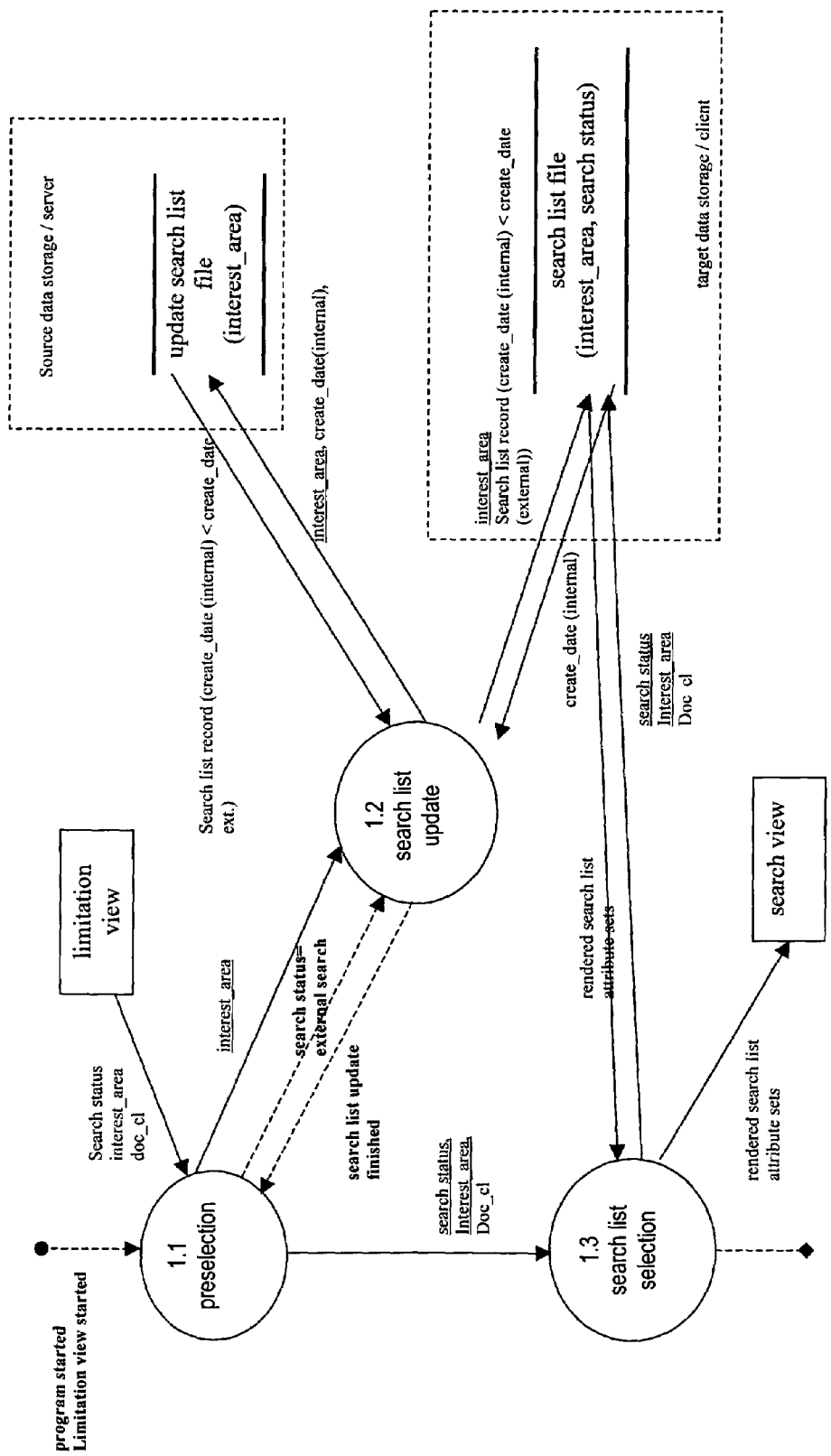
FIG. 65 flow diagram for specification at the preselection according to the invention.

FIG. 65 illustrates the preselection.

Figure 66:
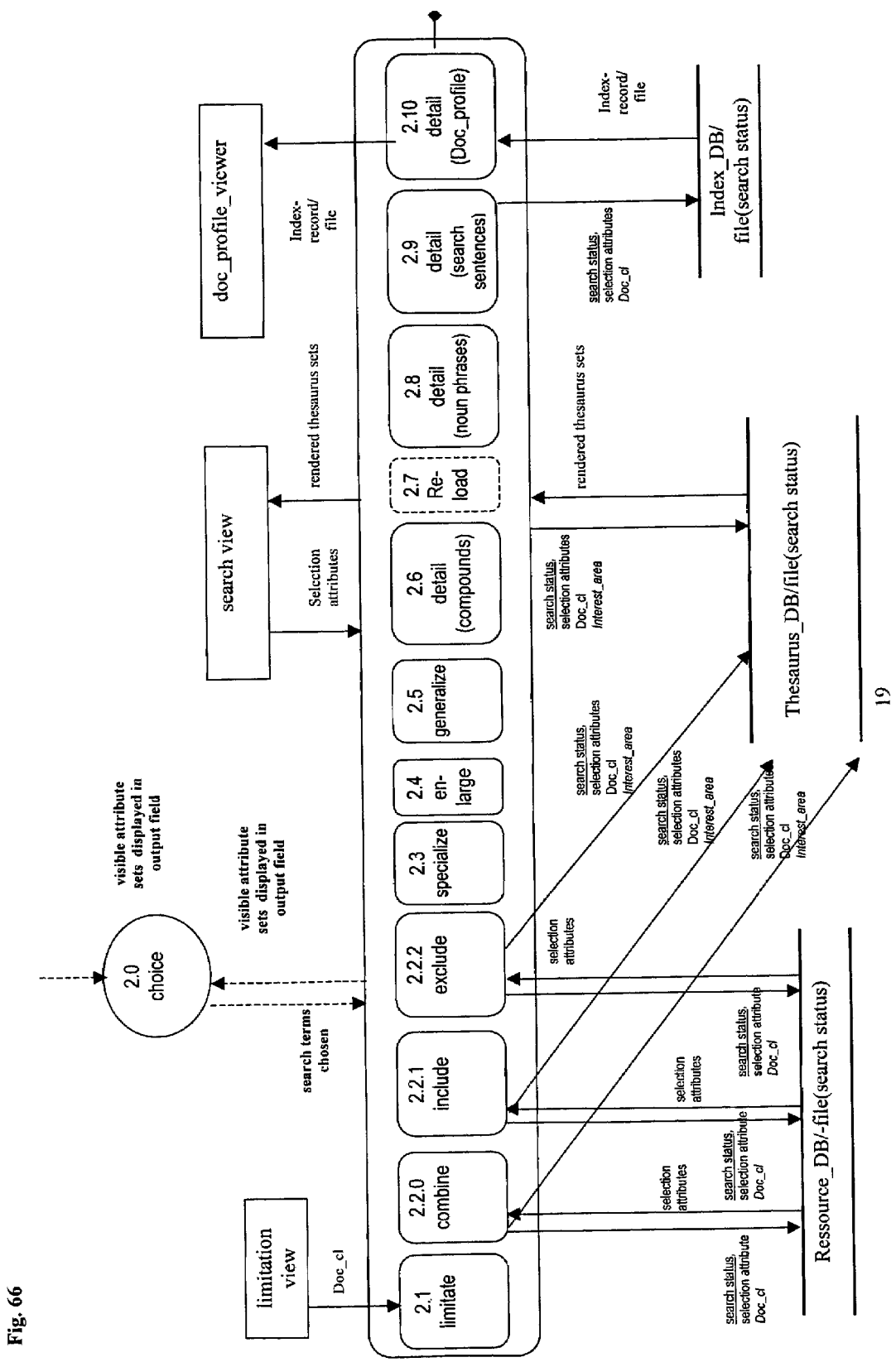
FIG. 66 flow diagram for specification at the main selection according to the invention.
Figure 67:
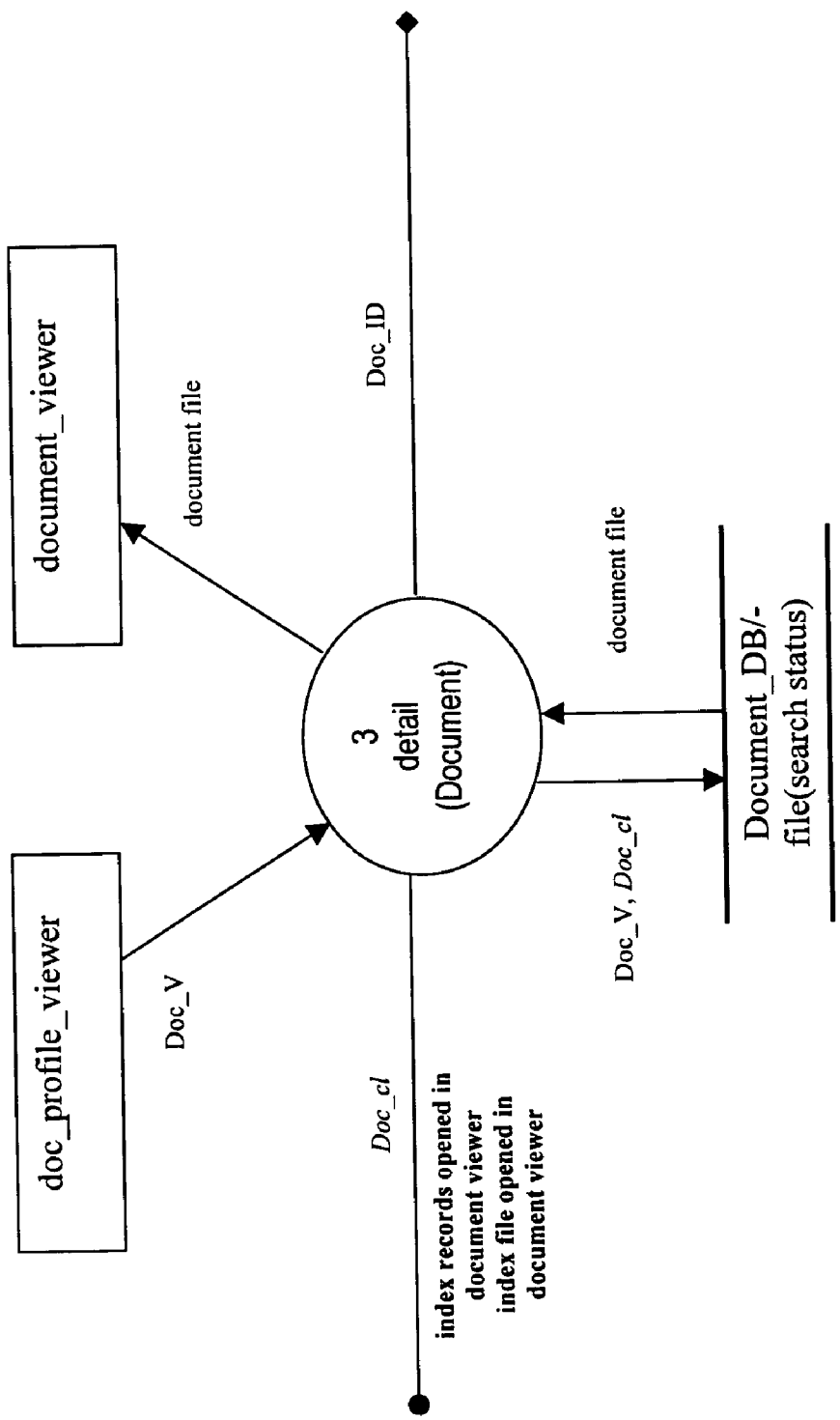
FIG. 67 flow diagram for specification at the final selection according to the invention.
Figure 68:
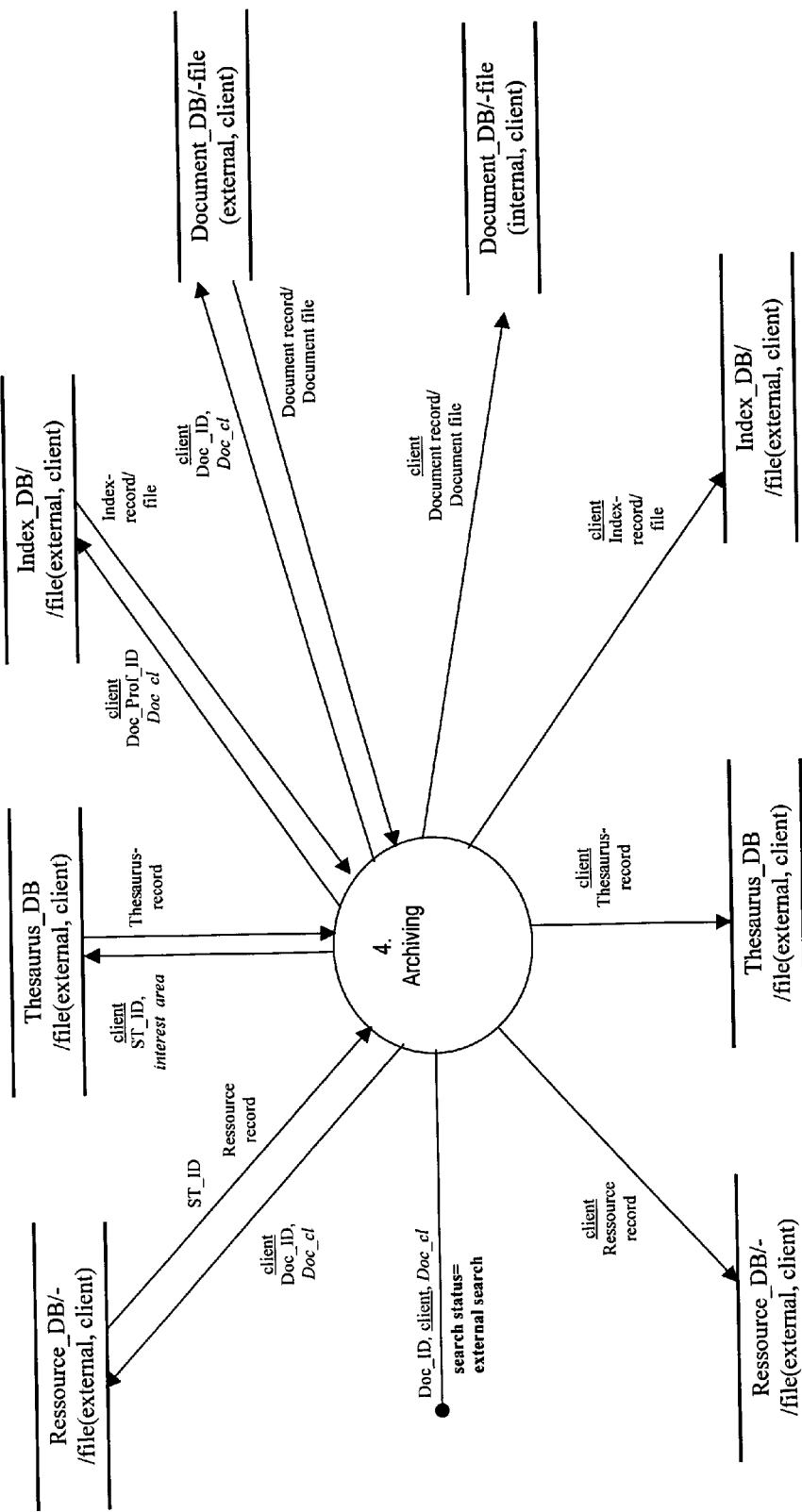
FIG. 68 flow diagram for the archiving according to the invention.
Figure 69:
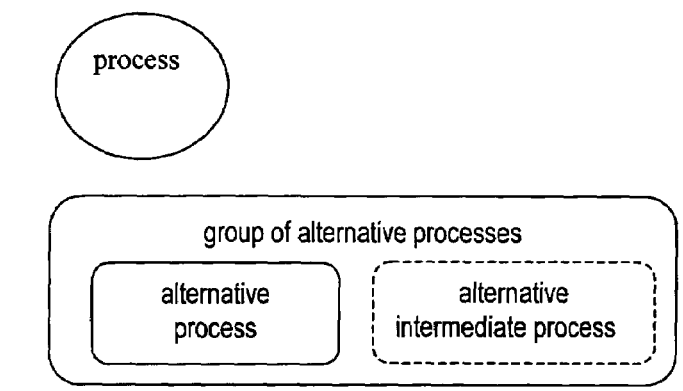
FIG. 69 legend for FIGS. 65 to 68.

FIG. 66 depicts the main selection, FIG. 67 the final selection and FIG. 68 the archiving.

Each is an program flow chart having the following denotations:

The conditions of transition from one process to the next are bold, the entry from the previous process and the start of the program are marked by a filled circle, the exit and the re-entry of the next process are marked by a black filled square standing on the edge. The rest of the symbols are explained in FIG. 69.

Intermediate processes do not entail new results for the user. They are just interactions without any involvement of the user.

Arrows pointing to a set of alternative processes apply to each single process.

Incoming arrows pointing to single processes are applied instead of the incoming arrows pointing to the set of processes Outgoing arrows pointing to single processes are applied instead of the outgoing arrows pointing to the set of processes Data flows are marked by thin drawn through lines with black arrows, control flows are marked by dashed lines with black filled arrows.

The invention employs the following data objects, which are defined as follows:

record:

complete record in persistent data storage rendered search list attribute sets:

parts of records which have been selected from a search list file by the system which are temporarily stored in the search view.

They contain the attributes:

[ST_Name], [context] [ST_ID], [NT], [RT], [BT], [Con_K].

rendered thesaurus attribute sets:

parts of records which have been selected from a thesaurus database/-file which are temporarily stored in the search view.

They contain the attributes:

[ST_Name], [context] [ST_ID], [NT], [RT], [BT], [Con_K], [Con_B], [Con_S], [Con_D].

visible attribute sets:

parts of attributes ([ST_Name], [context]) of rendered search list attribute sets and rendered thesaurus attribute sets which are displayed in the output field.

input string:

input of user in input field to navigate the list visible attribute sets.

selection attributes:

attributes of rendered thesaurus attribute sets of chosen search terms involved in a certain action. They are read record by record and their values transferred to the appropriate data storage as selection qualifier. All records are selected fulfilling the condition:

[selection attribute]of temporary memory=[selection qualifier]of persistent data storage The following table gives an overview of all search actions and selection attributes:

| action | selection attributes: | data storage selection: selection qualifier |
| --- | --- | --- |
| limitate, reload | [ST_ID] | TH_DB:[ST_ID] |
| specialize | [ST_ID], [NT] | TH_DB:[ST_ID] |
| enlarge | [ST_ID], [RT] | TH_DB:[ST_ID] |
| generalize | [ST_ID], [BT] | TH_DB:[ST_ID] |
| detail (compounds) | [ST_ID], [Con_K] | TH_DB:[ST_ID] |
| detail (noun phrases) | [ST_ID], [Con_B] | TH_DB:[ST_ID] |
| detail (search sentence) | [Con_S] | TH_DB:[ST_ID] |
| detail (document_profiles) | [Con_D] | IX_DB/-datei:[Dok_Prof_ID] |
| combine | [ST_ID](a) | RES_DB:[ST_ID/Doc_Prof_ID] |
|  | [ST_ID](b) | TH_DB:[ST_ID] |
| include / | [ST_ID](b) | RES_DB:[ST_ID/Doc_Prof_ID] |
| exclude | [ST_ID](c) | TH_DB/-datei:[ST_ID] | legend of above table:
TH: thesaurus
RES: resource
IX: index selection qualifier for retrieval:

facultative: distribution parameters of data storages or sort keys obligatory: identifiers, primary keys program parameters:

notation: [data/data storage], ([parameter/parameter value/condition])

the phrase in brackets specifies the relevant data/data storage.

search status:

parameter (values: internal/external) for addressing a data storage.

internal: data storages are addressed storing internal data.

external: data storages are addressed storing external data.

client:

Identifier assigning a certain client-related data storage having a certain format for the updating procedure of the search list.

interest_area:

see attribute model (FIGS. 51a and 51b)

Doc_cl:

see attribute model (FIGS. 51a and 51b)

create_date:

creation date of a record characteristics of parameter:

set in ordinary letters: obligatory selection qualifier or definition of parameter set in italics: optional distribution parameter underlined: parameter to address a data storage databases/files (persistent data storage):

persistent data stores run on the client computer (stand-alone-system) or on external computers(=server) (client/server-system).

source storage system/source storage:

external data storage system (e.g. a file system or a database management system) containing the external persistent data storages and transferring data to corresponding internal persistent data storages during archiving.

target storage system/target storage:

internal data storage system (e.g. a file system or a database management system) containing the internal persistent data storages and reading and storing data at archiving from corresponding external persistent data storages.

components of the retrieval program:

memories: temporary memories implemented on the client computer interface:

system component controlling the data exchange between temporary and persistent data storages, supporting and controlling the temporary storing of data.

limitation view:

consists of a user interface for displaying and defining constraints not concerning the subject and an interface defined above.

search view:

user interface for displaying and choosing search objects and an interface defined above.

external components:

doc_profile_viewer:

editor/viewer for document profiles (e.g. text editor, text processing program, HTML-browser)

document_viewer:

editor/viewer for documents (e.g. text editor, text processing program, HTML-browser)

Each step of the retrieval process according to the invention is illustrated by the following process specification:

1.1 preselection

→ initial status:

retrieval program started, limitation view opened menu items of limitation view are selected by user ← final status (search status=internal)

search status, interest_area, Doc_cl defined, command "start/proceed search" activated.

← final status (search status=external):

search status, interest_area, Doc_cl defined, command "start/proceed search" activated.

1.2 search list update

→ initial status:

search status=external, interest_area defined

The search list file (external, interest_area) is updated by an search list update file (external, interest_area)

← final status:

search list file updated 1.3 search list selection

→ initial status (search status=internal): search status, interest_area, Doc_cl defined, command "start/proceed search" activated.

→ initial status (search status=external):

search status, interest_area, Doc_cl defined, 1.2 finished, command "start/proceed search" activated.

The search view is started. The search terms are selected from the search list file (interest_area, search status) by Doc_cl as selection qualifier. The rendered attribute sets are transferred to the search view and the visible attribute sets are displayed in the output field.

← final status: The rendered attribute sets transferred to the search view, visible attribute sets displayed in the output field.

2. main selection 2.0 choice

→ initial status:

visible attribute sets displayed in the output field.

The user chooses search terms in the output field he wants to involve in the next search action. In order to do that he marks the items line by line. Items can also be deleted and the residual is chosen. If no item is chosen, all (remaining) items are considered to be elected.

← final status:

search terms chosen basic process of main selection

→ initial status:

search terms chosen, command (action) activated, no selection attribute (action) empty the retrieval system reads the selection attribute of the elected search terms from the search view, selects search terms (selection qualifier: selection attributes, [Doc_cl] (=obligatory), [interest_area] (=facultative)) from the thesaurus database/-file (search status) transfers the rendered attribute sets to the search view and displays the visible attribute sets in the output field.

← final status:

search terms elected rendered attribute sets transferred to search view, visible attribute sets displayed in the output field.

2.1 limitate=redefinition Doc_cl+basic process

The user enters data into the limitation view to define Doc_cl.

Then the basic process is performed.

command (process): "start/proceed search".

selection attribute (process)=[ST_ID]

Annotation: if interest_area or search status are changed the search process is restarted. → 1.1 preselection 2.2.0 Combine → initial status:

search terms elected, command: "combine" activated.

side condition:

all other actions deactivated

The selection attributes (a) are read from search view and doc_IDs of document profiles are selected from the resource database/-file in which the chosen search terms are contained. The ST_IDs of search words (W) and compounds (K) which are assigned to the same Dok_ID are transferred to the search view and defined as selection attributes (b).

The retrieval system reads from search view selection attributes [ST_ID](b), selects from thesaurus database/-file (search status) search terms (selection qualifier: selection attributes (b) [Dok_cl] (=obligatory), [interest_area] (=facultative). The rendered thesaurus attributes are transferred to the search view, visible attribute sets are displayed in the output field.

← final status:

rendered attribute sets transferred to search view, visible attribute sets displayed in the output field.

2.2.1 Include

→ initial status:

2.2.0 finished, search terms elected (selection attributes= [ST_ID](b))

command: "include" activated.

side condition:

all other actions deactivated

The selection attributes [ST_ID] (b) are read from search view and doc_IDs of document profiles are selected from the resource database/-file in which the elected search terms are contained. The ST_IDs of search sentences (S) which are assigned to the same Dok_IDs as selection attributes (a) and (b) are transferred to the search view and defined as selection attributes (c).

The retrieval system reads from search view selection attributes (c), selects from thesaurus database/-file (search status) search terms (selection qualifier: selection attributes (c), [Doc_cl] (=obligatory), [interest_area] (=facultative). The rendered thesaurus attributes are transferred to the search view, visible attribute sets are displayed in the output field.

← final status:

rendered attribute sets transferred to search view, visible attribute sets displayed in the output field.

2.2.2 Exclude

Θ initial status:

2.2.0 finished, search terms chosen (selection attributes= [ST_ID](b)), command: "exclude" activated.

side condition:

all other actions deactivated

The selection attributes [ST_ID] (b) are read from search view and doc_IDs of document profiles are selected from the resource database/-file in which the chosen search terms are contained. The ST_IDs of search sentences (S) which are assigned to the same Dok_IDs as selection attributes (a) and not (b) are transferred to the search view and defined as selection attributes [ST_ID] (c).

The retrieval system reads from search view selection attributes [ST_ID] (c) and selects from thesaurus database/-file (search status) search terms (selection qualifier: selection attributes (c), [Doc_cl](=obligatory), [interest_area] (=facultative). The rendered thesaurus attributes are transferred to the search view, visible attribute sets are displayed in the output field.

← final status:

rendered attribute sets transferred to search view, visible attribute sets displayed in the output field.

2.3 specialize=basic process command (process): "specialize".

selection attributes (process)=[ST_ID], [NT]

2.4 enlarge=basic process command (process): "enlarge".

selection attributes (process)=[ST_ID], [RT]

2.5 generalize=basic process command (process): "generalize".

selection attributes (process)=[ST_ID], [BT]

2.6 detail=basic process command (process): "detail".

selection attributes (process)=[ST_ID], [Con_K]

2.7 reload=basic process command (process): "detail".

selection attributes (process)=[ST_ID]

→additional initial status:

selection attribute [Con_B] not defined 2.8 detail(noun phrases)=basic process command (process): "detail".

selection attributes (process)=[ST_ID], [Con_B]

→additional initial status:

selection attribute [Con_B]=defined selection attribute [Con_K]=empty 2.9 detail(search sentences phrases)=basic process command (process): "detail".

selection attributes (process)=[Con_S]

→ additional initial status:

selection attribute [Con_S]=defined selection attribute [Con_K], selection attribute [Con_B] defined and empty 2.10 detail(document profiles)

→ initial status:

search terms chosen, command: "detail" activated.

selection attribute [Con_D]=defined and not empty selection attribute [Con_K], selection attribute [Con_B] =defined and empty The retrieval system reads from search view selection attributes [Con_D], selects from index database/-file document profiles (selection qualifier selection attributes [Con_D] (=obligatory), [interest_area] (=facultative). The document profiles are opened in a viewer.

← final status:

document profiles opened in document profile viewer 3. end selection=detail(documents)

→ initial status:

document profiles opened in document profile viewer

The user chooses a document in the document profile viewer and presses the button "Doc_V". The document is opened as file or is selected from a database/-file and is opened in a viewer.

← final status:

documents opened in document viewer

4. Archiving

→ initial status:

search status=external, 3 finished

The [doc_ID] is transferred to a client-related external resource DB/-file of the target data storage and the ST_IDs and Dok_Prof_IDs of search terms and document profiles are selected, which are contained in the document. These are selected from the corresponding external data storage(client)

Selection qualifier:

thesaurus database/-file: [ST_ID] (=obligatory), [Doc_cl] (=facultative)

index database/-file: [Doc_Prof_ID] (=obligatory), [Doc_cl] (=facultative)

document database/-file: [Doc_ID] (=obligatory), [Doc_cl] (=facultative)

and together with the selected resource record to the corresponding data store (client) in the target data store.

← final status:

transfer finished

Figure 70:
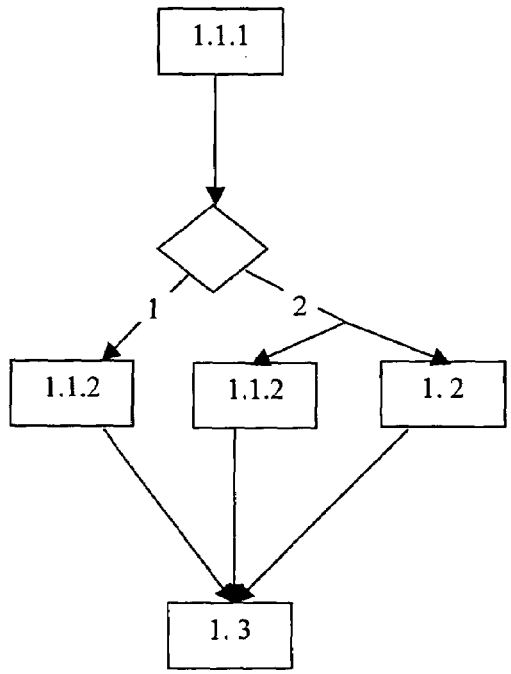
FIG. 70 structure diagram for preferred preselection according to the invention.
Figure 71:
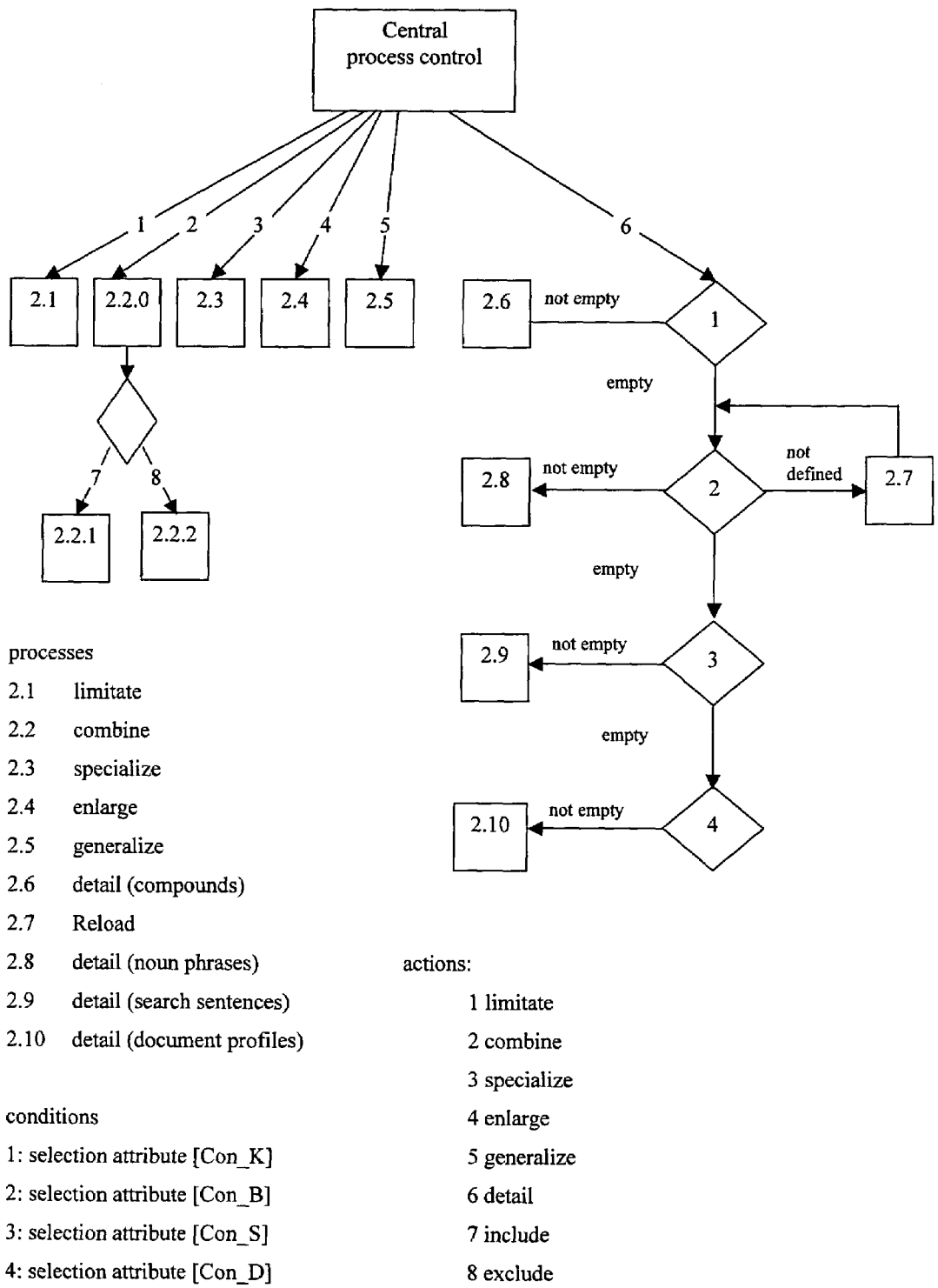
FIG. 71 structure diagram for process control at the main selection according to the invention.

In the following the control structure of the processes of the given example are explained by FIG. 70 and FIG. 71. FIG. 70 shows a structure diagram for the procedure of the preselection. The following parameters are valid for the shown example:

options:

1 search status=internal 2 search status=external processes:

1.1.1 definition search status, interest_area 1.1.2. definition search status, interest_area 1.2 search list update 1.3 search list selection FIG. 71 illustrates a structure diagram for the process control of the main selection in the given example. The related marks for processes, conditions and action options are defined as follows:

Processes 2.1 limitate 2.2 combine 2.3 specialize 2.4 enlarge 2.5 generalize 2.6 detail 2.7 reload 2.8 detail (noun phrases)

2.9 detail (noun phrases)

2.10 detail (document profiles)

conditions

1: selection attribute [Con_K]

2: selection attribute [Con_B]

3: selection attribute [Con_S]

4: selection attribute [Con_D]

action options:

1 limitate 2 combine 3 specialize 4 enlarge 5 generalize 6 detail 7 include 8 exclude FIGS. 72 to 80 explain detailed process models of the given example of the invention.

Figure 72:
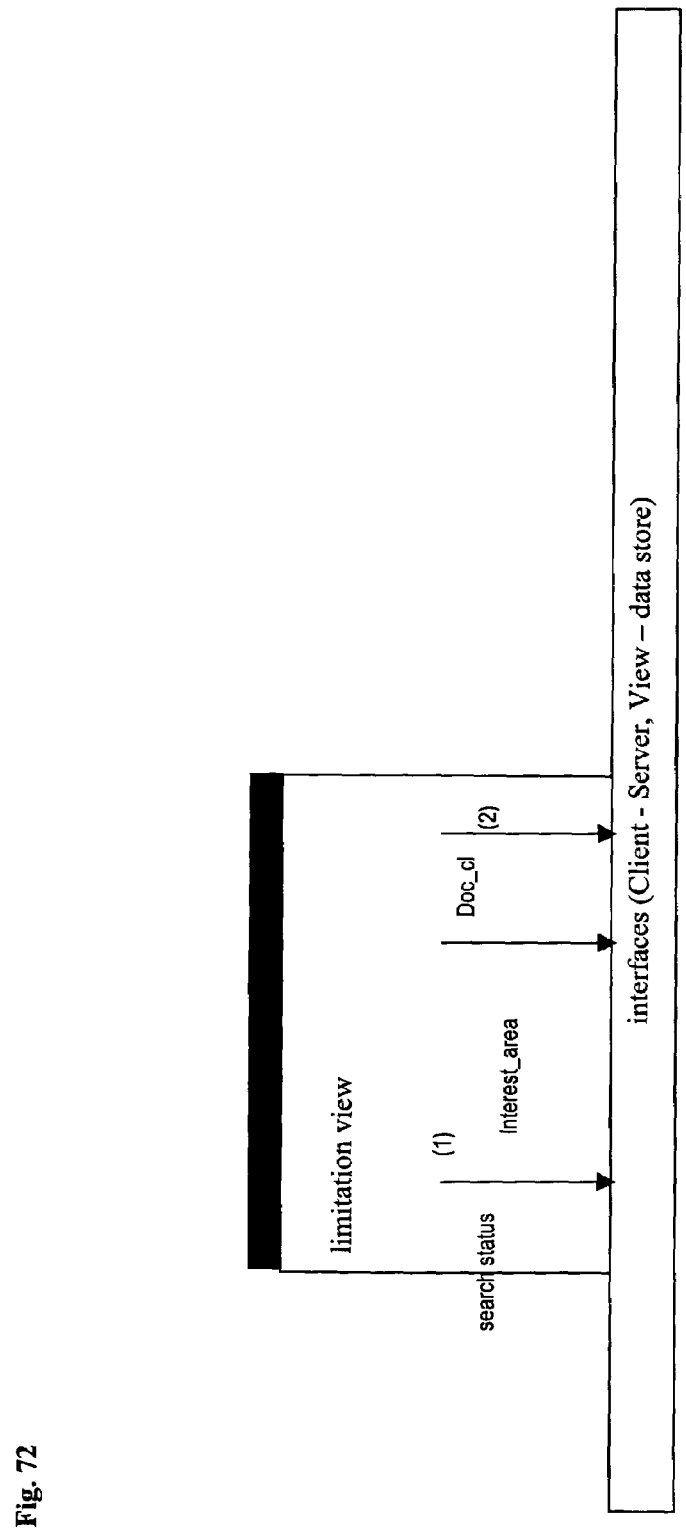
FIG. 72 process model for preselection according to the invention.
Figure 73:
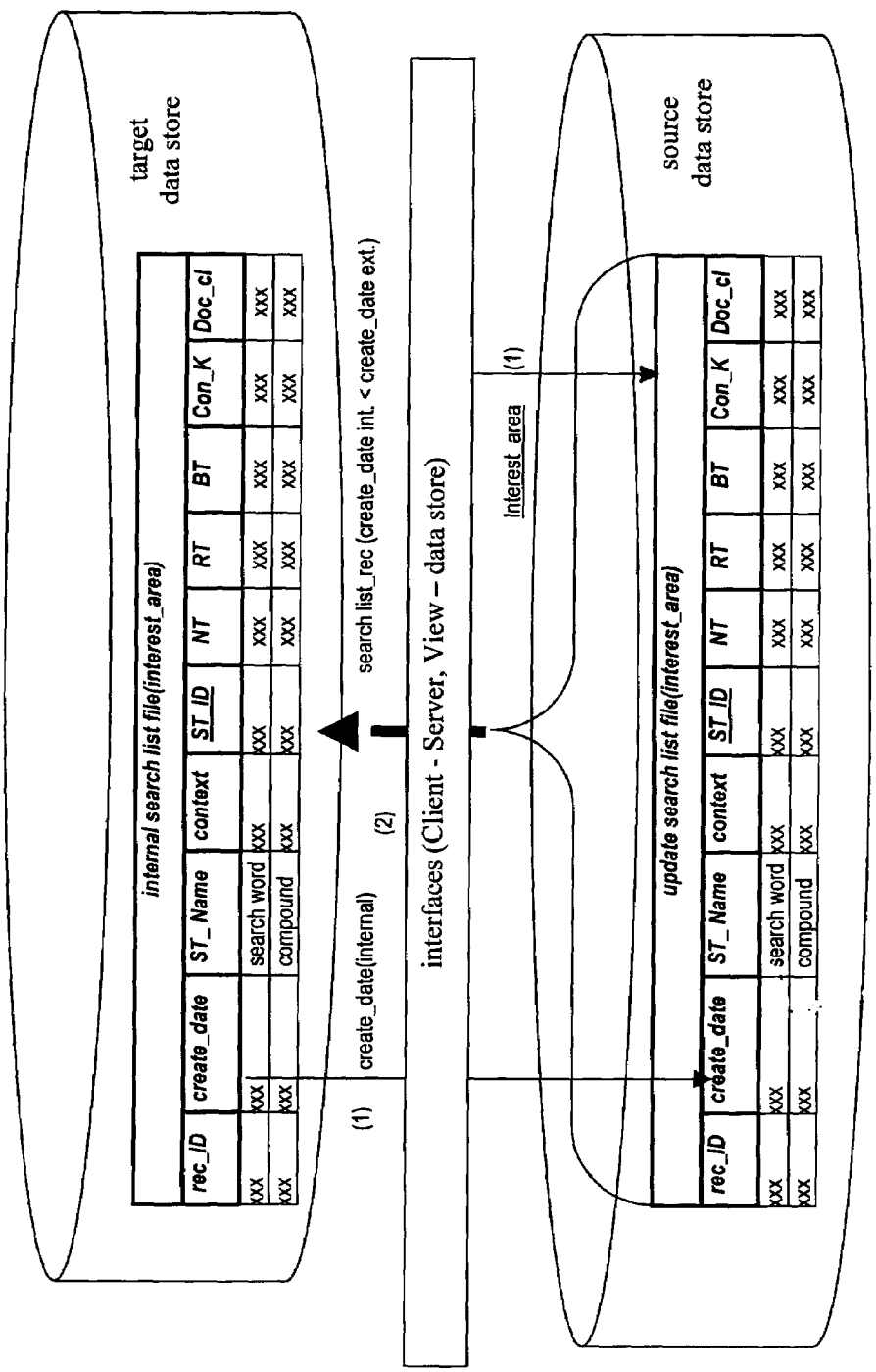
FIG. 73 process model for updating the search list according to the invention.
Figure 74:
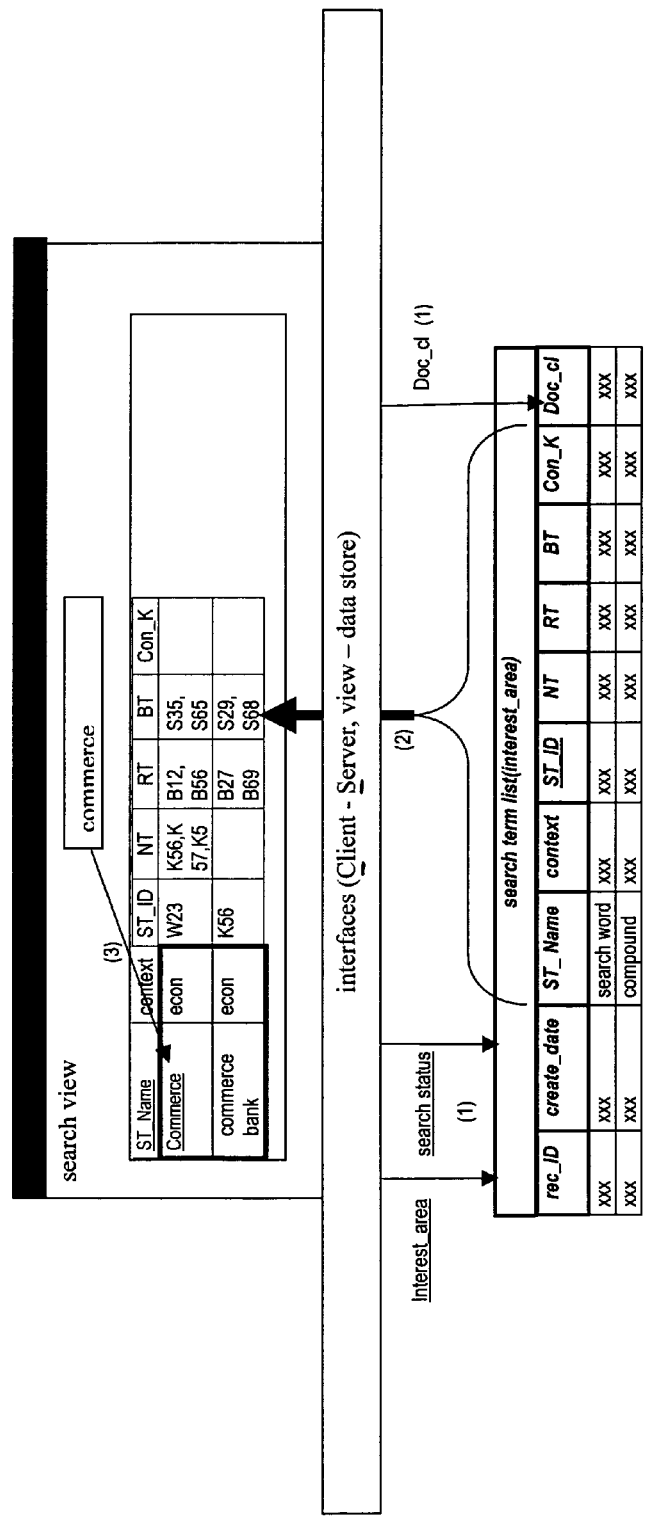
FIG. 74 process model for search list query according to the invention.
Figure 75:
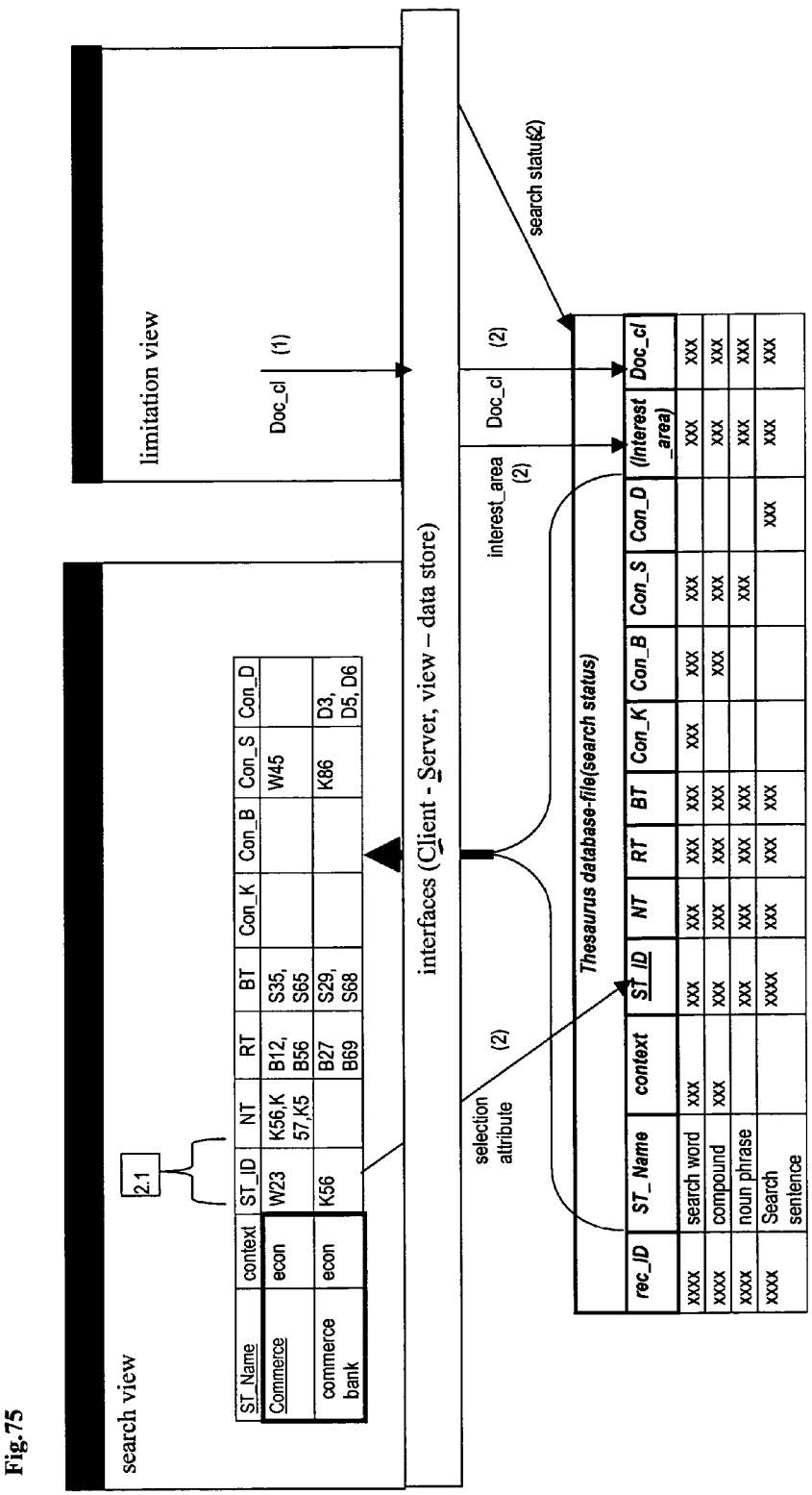
FIG. 75 process model for action 'limitate' according to the invention.
Figure 76:
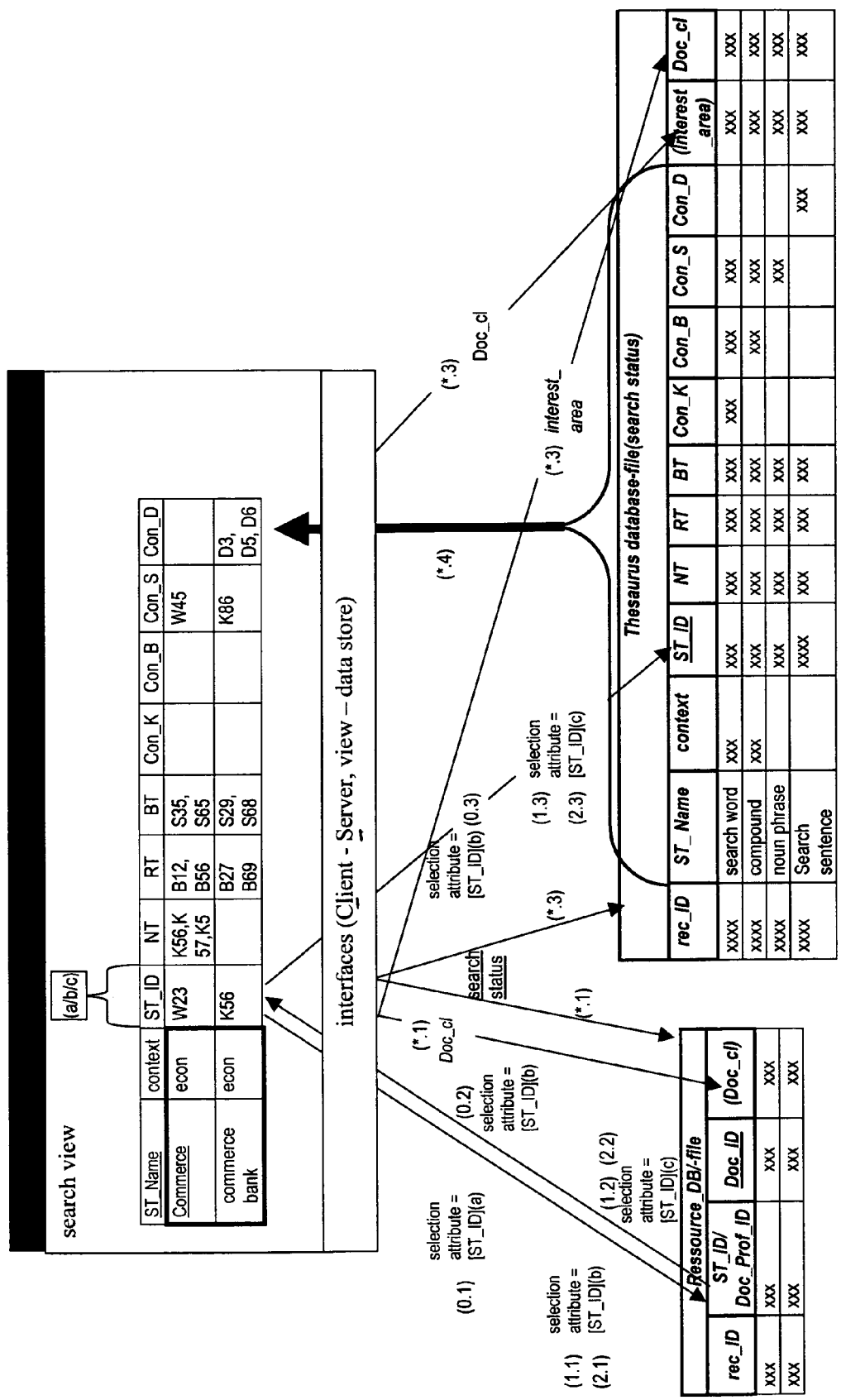
FIG. 76 process model for actions 'combine', 'include' and 'exclude' according to the invention.
Figure 77:
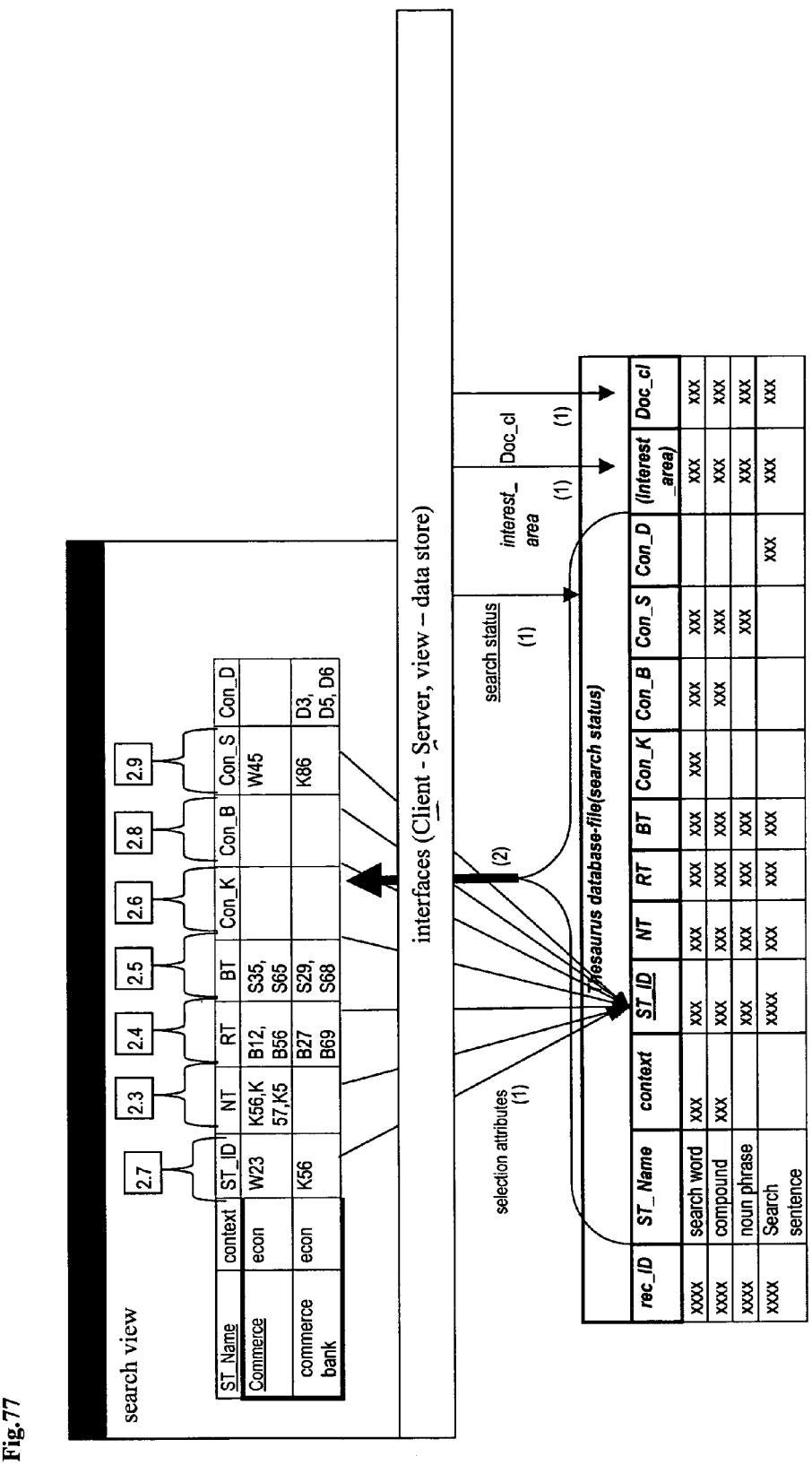
FIG. 77 process model for main selection at an early stage according to the invention.
Figure 78:
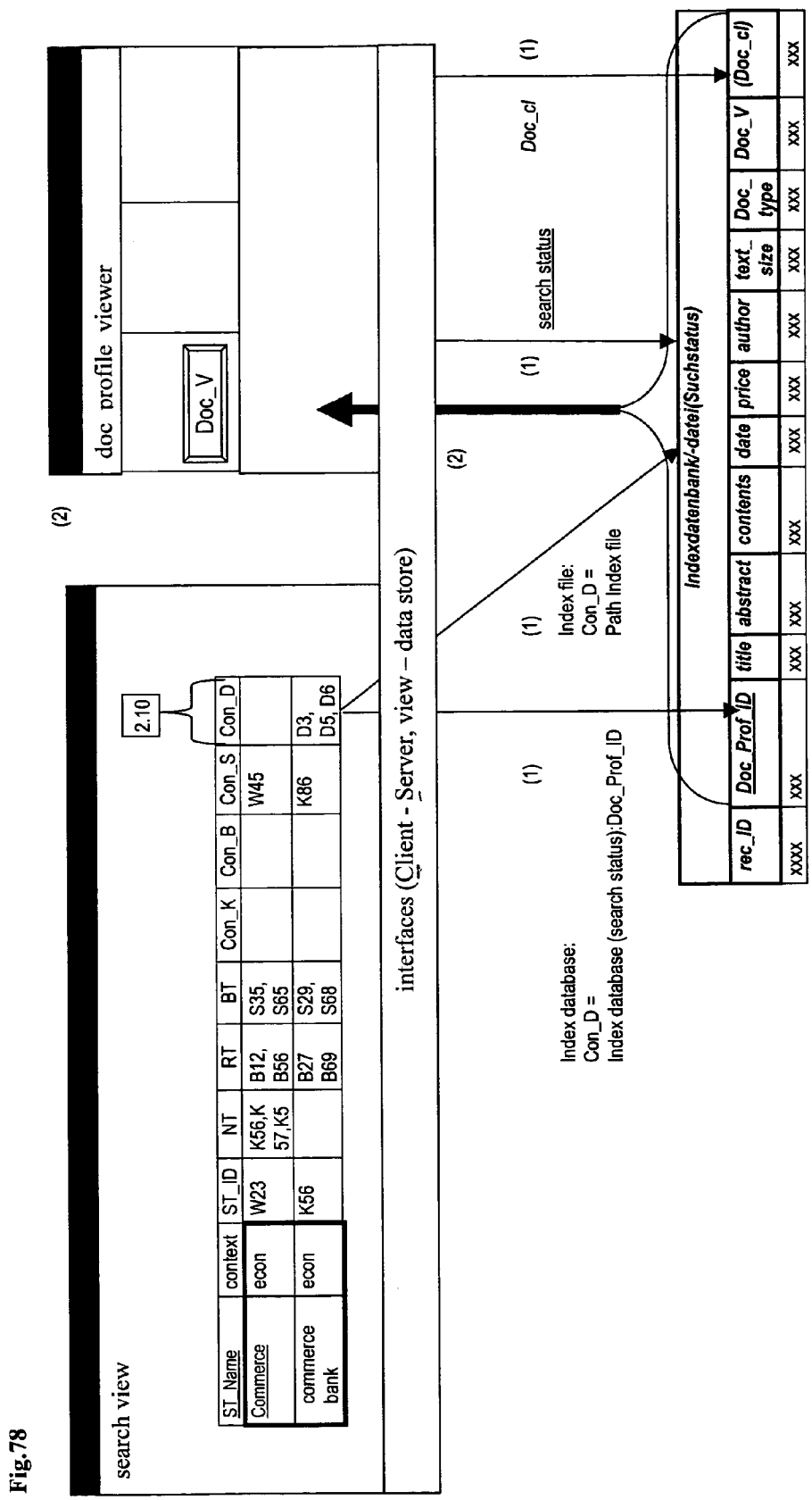
FIG. 78 process model for main selection at a later stage according to the invention.
Figure 79:
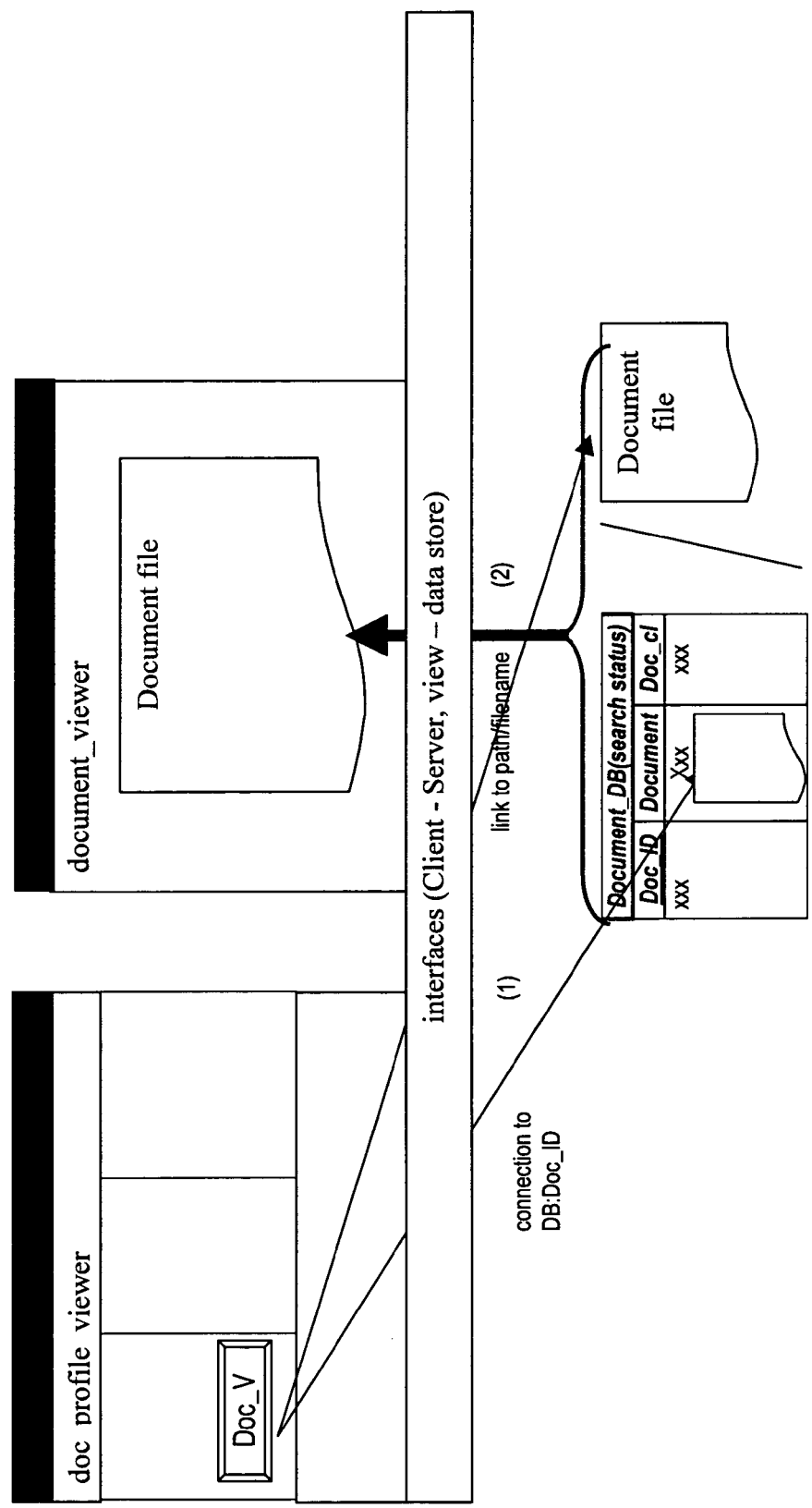
FIG. 79 process model for final selection according to the invention.
Figure 80:
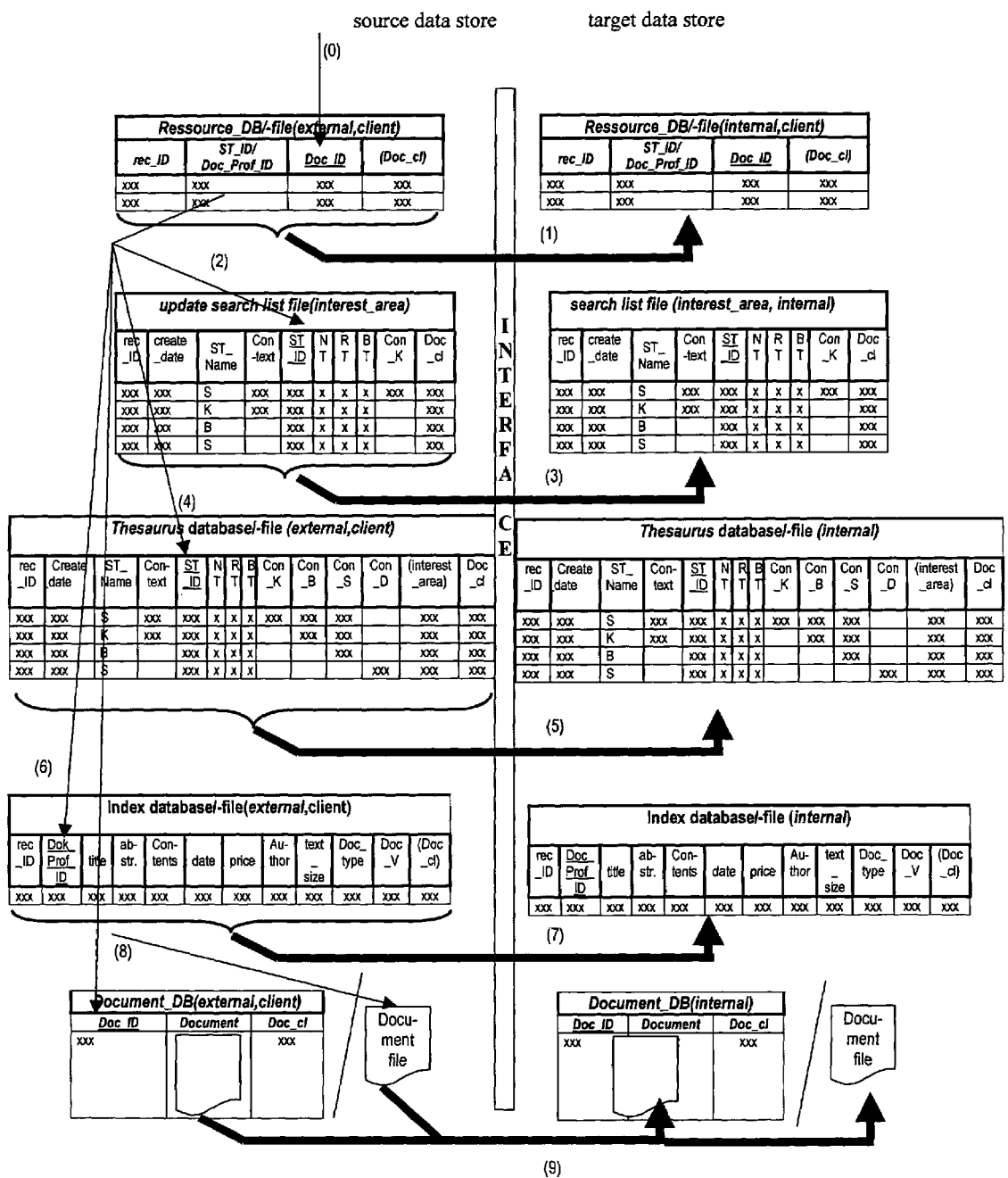
FIG. 80 process model for archiving according to the invention.
Figure 81:
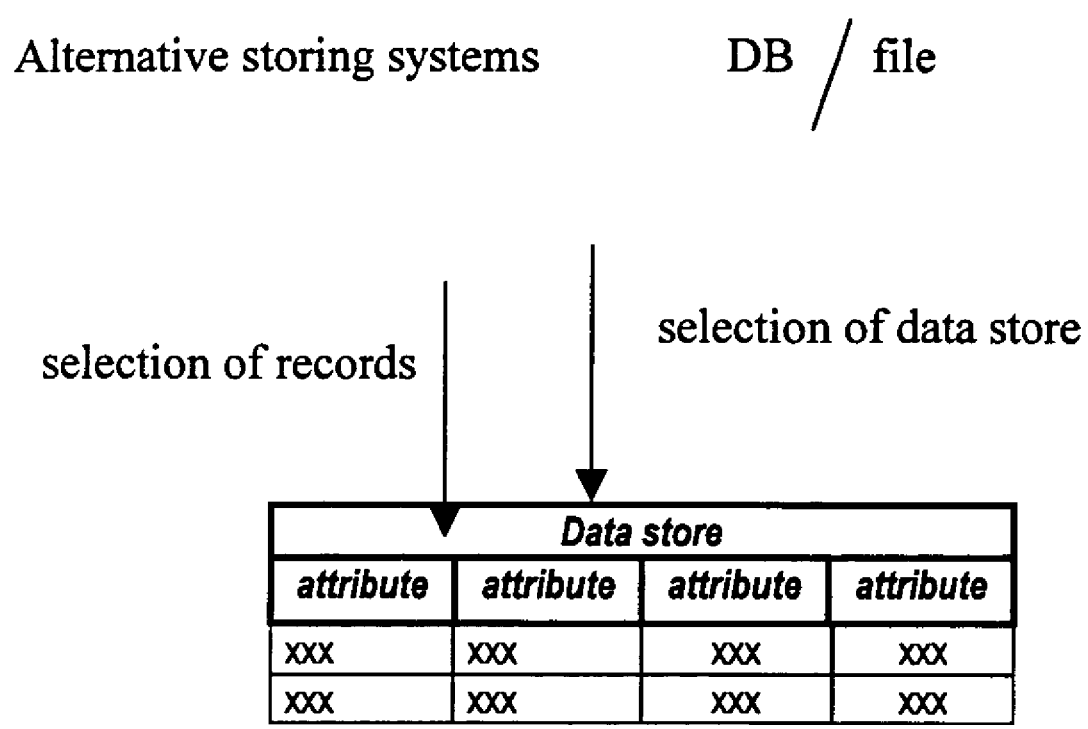
FIG. 81 legend for FIGS. 73 to 80.

FIG. 72 depicts a process model of preselection,

FIG. 73 the process model of search list update,

FIG. 74 the process model of search list selection,

FIG. 75 the process model of action "limitate",

FIG. 76 the process model of actions "combine", "include" and "exclude",

FIG. 77 the process model of main selection (corresponding to steps 2.2 to 2.9 of overview chart of FIG. 71), FIG. 78 the process model of main selection (corresponding to step 2.10 of overview chart of FIG. 71), FIG. 79 the process model of final selection FIG. 80 the process model of archiving FIG. 81 explains these figures as a legend.

Dashed elements are related to search for external information. At transfer of a document the system interface records the [Dok_ID]. It supports mapping search objects on the internal persistent data store at archiving.

In the following the process specification is illustrated even more detailed marking the actions of the system by "S::" and the actions of the user by "U::".

1.1 preselection
1.1.1 U:: defines search status, interest_area in limitation view
   S:: initiation of search list update, if search status=external
1.1.2 U:: defines Doc_cl in limitation view 1.2 search list update
1.2.1 U:: selection of records(create_date(external)>create_date(internal)) from search list update file(interest_area)
1.2.2 S:: transferring records to search list file(interest_area)
   Instead of single records, a update file containing records to be updated for a certain time slot can be transferred.

1.3 search list selection
1.3.1 S:: opens search view, loads search list (search status, interest_area), selects records (selection qualifier: [Doc_cl]) from search list file (interest_area).
1.3.2 transfers rendered attribute sets to search view, displays visible attribute sets line by line in output field.
1.3.3 U:: inputs string,
   S:: scrolls visible attribute sets, until input string=[ST_Name]

Basic search process of main selection
x.1 S:: reads selection attributes of all search terms displayed in search view line by line, selects from thesaurus database/-file (search status) records
   selection qualifiers: selection attributes, [Doc_cl]
   distribution parameter: [interest_area] (=facultative selection qualifier)
x.2 deletes content of output field, transfers rendered attribute sets in read order to search view, displays visible attribute sets in read order line by line in output field; deletes selection attributes apart from [ST_ID].

2.1. limitate
2.2.1 U:: defines Doc_cl in limitation view
2.2.2=x.1
2.2.4=x.2

2.2*
2.2.0 combine 2.2.0.1 S:: reads selection attributes [ST_ID](a) of chosen search terms displayed in search view line by line, selects from resource database/-file (search status) records.
   selection qualifiers: selection attributes [ST_ID](a), [Doc_cl]
2.2.0.2 queries ST_IDs of search words (W) and compounds (K) in selected
   records, defines found ST_IDs=selection attribute [ST_ID](b) and transfers ST_IDs to search view
2.2.0.3 reads selection attributes [ST_ID](b) of all search terms, selects from thesaurus database/-file (search status) records.
   selection qualifiers: selection attributes [ST_ID](b), [Doc_cl].
2.2.0.4 deletes content of output field, transfers rendered attribute sets in read order to search view, displays visible attribute sets in read order line by line in output field;
2.2.1 include
2.2.1.1 S:: reads selection attributes [STID](b) of chosen search terms displayed in search view line by line, selects from resource database/-file (search status) records.
   selection qualifiers: at least 1 of selection attributes [ST_ID](a) and all selection attributes [ST_ID](b) in combination, [Doc_cl]
2.2.1.2 queries ST_IDs of search sentences in selected records, defines found ST_IDs=selection attribute [ST_ID](c) and transfers ST_IDs to search view
2.2.1.3 reads selection attributes [ST_ID](b) of all search terms, selects from thesaurus database/-file (search status) records.
   selection qualifiers: selection attributes [ST_ID](c), [Doc_cl].
2.2.1.4 deletes content of output field, transfers rendered attribute sets in read order to search view, displays visible attribute sets in read order line by line in output field;
2.2.2 exclude
2.2.2.1 S:: reads selection attributes [ST_ID](b) of chosen search terms displayed in search view line by line, selects from resource database/-file (search status) records.
   selection qualifiers: at least 1 of selection attributes [ST_ID](a) and none of selection attributes [ST_ID](b) in combination, [Doc_cl]
2.2.2.2 queries ST_IDs of search sentences in selected records, defines found ST_IDs=selection attribute [ST_ID](c) and transfers ST_IDs to search view
2.2.2.3 reads selection attributes [ST_ID](b) of all search terms, selects from thesaurus database/-file (search status) records.
   selection qualifiers: selection attributes [ST_ID](c), [Doc_cl].
2.2.2.4 deletes content of output field, transfers rendered attribute sets in read order to search view, displays visible attribute sets in read order line by line in output field;

2.3 specialize=basic process
2.3.1=x.1
2.3.2=x.2

2.4 enlarge=basic process
2.4.1=x.1
2.4.2=x.2

2.5 generalize=basic process
2.5.1=x.1
2.5.2=x.2

2.6 detail=basic process
2.6.1=x.1
2.6.2=x.2

2.7 reload=basic process
2.7.1=x.1
2.7.2=x.2

2.8 detail(noun phrases)=basic process
2.8.1=x.1
2.8.2=x.2

2.9 detail(search sentences phrases)=basic process
2.9.1=x.1
2.9.2=x.2

Figure 82:
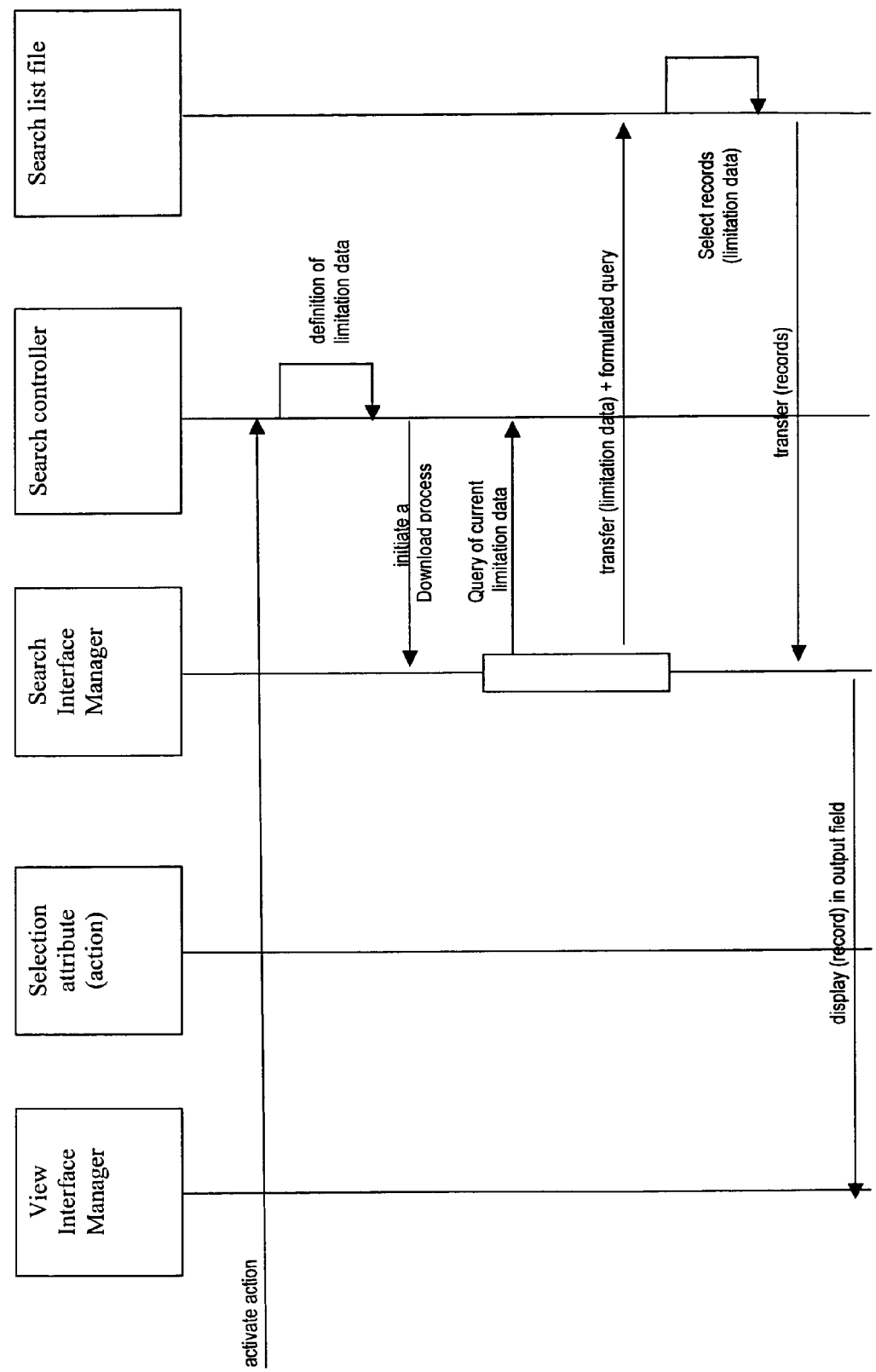
FIG. 82 an interface model for prelimitation according to the invention.

2.10 detail(document profiles)
2.10.1 S:: reads selection attributes of chosen search terms displayed in search view line by line, selects from index database/-file (search status)
    records.(selection qualifier: search attribute)/loads index file
2.10.2 opens doc_profile_viewer, loads index records in doc_profile_viewer/opens index file in doc_profile_viewer 3. final selection detail(documents)
3.1 U:: chooses in doc_profile_viewer document profiles and activates the command "Doc_V".
3.2 S:: selects document file from a document database (search status)/loads document from directory
    opens document file in document_viewer 4. archiving
4.0 S:: selects from resource database/-file (external,client), [ST_DB], [Dok_Prof_ID]
    (Selection qualifier [doc_ID] (obligatory), [Doc_cl] (=facultative)).
4.1 transfers resource records via an interface to resource database/-file (internal),
4.2 selects search list records from search list update file (interest_area)
    (Selection qualifier [ST_ID], [interest_area] (=obligatory)).
4.3 transfers search list records via an interface to search list database/-file (internal, interes_area).
4.4 selects from thesaurus database/-file (external,client),
    (Selection qualifier [ST_ID] (obligatory), [interest_area] (=facultative)).
4.5 transfers thesaurus records via an interface to thesaurus database/-file (internal).
4.6 selects from index database/-file (external,client),
    (Selection qualifier [doc_prof_ID] (=obligatory), [Doc_cl] (=facultative))/loads index files from external client-related resource directory
4.7 transfers index records/-file via an interface to index database (internal)./to the internal client-related resource directory
4.8 selects document from document DB (external,client) with doc_id
    (Selection qualifier [doc_prof_ID] (=obligatory), [Doc_cl] (=facultative))/opens document file (external, client)
4.9 transfers document records/-file via an interface to document database (internal)./to the internal client-related document directory
Finally an example for interfaces of the previously explained given example is illustrated in FIG. 82 by the interface model of the process "prelimitation".

The invention claimed is:

1. A method for automatic searching and synchronous content display of a predefined set of documents in list form in a displaying device, comprising:
    encapsulated text extracts of various length taken from the documents or synonyms of said text extracts in a natural language form, said text extracts or their synonyms stored as data objects in a persistent data store,
    creating detailing relations that define couples of the said objects wherein one object more precisely states a meaning of the other object,
    mapping said detailing relations by attributes of the objects containing references to longer encapsulated text extracts that are more precise and shorter encapsulated text extracts that are less precise,
    creating chains of text extracts from the mapped detailing relations which start with words extracted from said documents and end with headlines,
    assigning each of the text extracts of said chains to a class enabling queries of the persistent data store by a computer displaying a text extract assigned to a longer class after selection of a text extract assigned to a shorter class, and
    gradually displaying an increasing part of the document and representing content of said document with more and more detail.

2. The method according to claim 1, wherein the detailing relations to text extracts belonging to a certain class are represented by certain attributes which are each specific for the class and which represent all detailing relations to objects of that class, and further comprising the steps of:
    enabling the computer to query for each text extract all available detailing relations to extracts of the shortest class,
    reading related text extracts from the persistent data store,
    displaying related text extracts on the displaying device,
    displaying a same link of all said chains of text extracts thereby representing all documents equivalently to the same degree of detail, and
    enabling the search to reach the end of all chains at the same time after a couple of queries.

3. The method according to claim 1, further comprising:
    thesaurus relations defining connections with superordinated, associated, and subordinated text extracts and combining relations defining connections with text extracts appearing and not appearing in the same document, said thesaurus relations and said combining relations each being represented as references by a specific attribute of the data objects to be queried by the computer.

4. The method according to claim 3, wherein a user does not need to formulate the query but only has to choose text extracts and actions in the displaying device, wherein underlying data base queries are generated automatically, and wherein the text extracts which are selected by the queries from the persistent data store are connected with chosen text extracts by any of said relations.

5. The method according to claim 1, wherein a relation between a longest link of the said chain of text extracts and one or more documents or document profiles is mapped so that each text extract is assigned directly or indirectly to a document or document profile by a text extract of the longest class.

6. The method according to claim 1, wherein the same text extracts or their synonyms appearing in said documents are only displayed once and wherein all connections of text extracts include connections of synonyms.

7. The method according to claim 1, wherein text extracts connected by the detailing relation are displayed close together in list form resulting in a perceivable order of the text extracts.

8. The method according to claim 1, wherein a group of documents are classified by document classes which are connected logically with the data objects of the text extracts representing the document so that a connection of a data object with a document class corresponds to a logical relation with the documents contained in said document class or directly assigned by one or more data attributes to data objects representing documents or document profiles of a certain document class.

9. The method according to claim 8, wherein the document classes define non-thematic characteristics in a certain combination thereby providing constraints for the search for documents, document profiles and text extracts.

10. The method according to claim 1, wherein the relations between the data objects are either local or global depending on the assigned document classes, said global relations are valid for all documents, said local relations are only applied to documents assigned to a certain document class so that only text extracts are displayed at a query connected with a chosen text extract by a relation applied to a restriction.

11. The method according to claim 1, wherein parts of retrieved document sets are transferred to other logical or physical data storages together with their logically related data objects so that search features are kept intact.

12. The method according to claim 1, wherein the task of displaying information in list form is performed by document profiles containing text extracts of the document, document-related characteristics, system-related characteristics, and a link to the document (reference) so that the document is only loaded if required by a user.

13. The method according to claim 1, wherein document profiles are retrieved by classification structures comprising directories in form of matrices and network plans being logically related to the document profiles.

* * * * *